US008282959B2

(12) United States Patent
Arthur et al.

(10) Patent No.: US 8,282,959 B2
(45) Date of Patent: Oct. 9, 2012

(54) BRANCHED END REACTANTS AND POLYMERIC HYDROGEL TISSUE ADHESIVES THEREFROM

(75) Inventors: Samuel David Arthur, Wilmington, DE (US); Garret D. Figuly, Wilmington, DE (US)

(73) Assignee: Actamax Surgical Materials, LLC, Berkeley, CA (US)

( * ) Notice: Subject to any disclaimer, the term of this patent is extended or adjusted under 35 U.S.C. 154(b) by 816 days.

(21) Appl. No.: 12/445,470

(22) PCT Filed: Nov. 27, 2007

(86) PCT No.: PCT/US2007/024393
§ 371 (c)(1),
(2), (4) Date: Apr. 14, 2009

(87) PCT Pub. No.: WO2008/066787
PCT Pub. Date: Jun. 5, 2008

(65) Prior Publication Data
US 2010/0086678 A1   Apr. 8, 2010

Related U.S. Application Data

(60) Provisional application No. 60/861,167, filed on Nov. 27, 2006, provisional application No. 60/861,181, filed on Nov. 27, 2006.

(51) Int. Cl.
*A61K 9/14* (2006.01)
*C08G 81/00* (2006.01)
*C08G 81/02* (2006.01)
*C08F 8/06* (2006.01)
*C08B 1/10* (2006.01)

(52) U.S. Cl. ............ 424/486; 424/488; 425/54.21; 425/56; 425/59; 425/91; 425/92 F; 425/92 H; 425/92 J; 425/92 K; 425/108; 425/110; 425/111; 425/112; 425/113; 425/115; 425/118; 425/153; 425/155; 425/157; 425/162; 425/166; 425/189; 536/55.1

(58) Field of Classification Search .............. None
See application file for complete search history.

(56) References Cited

U.S. PATENT DOCUMENTS

| | | |
|---|---|---|
| 4,584,188 A | 4/1986 | Graham |
| 4,703,116 A | 10/1987 | Solarek et al. |
| 4,731,162 A | 3/1988 | Solarek et al. |
| 4,741,804 A | 5/1988 | Solarek et al. |
| 4,749,800 A | 6/1988 | Jobe et al. |
| 4,766,245 A | 8/1988 | Larkin et al. |
| 5,092,883 A | 3/1992 | Eppley et al. |
| 5,116,824 A | 5/1992 | Miyata et al. |
| 5,162,430 A | 11/1992 | Rhee et al. |
| 5,196,441 A | 3/1993 | Kunisch et al. |
| 5,275,838 A | 1/1994 | Merrill |
| 5,283,339 A * | 2/1994 | Arnold et al. ............ 548/104 |
| 5,292,802 A | 3/1994 | Rhee et al. |
| 5,308,889 A | 5/1994 | Rhee et al. |
| 5,324,775 A | 6/1994 | Rhee et al. |
| 5,328,995 A | 7/1994 | Schaulin et al. |
| 5,451,398 A | 9/1995 | Vigh |
| 5,502,042 A | 3/1996 | Gruskin et al. |
| 5,505,952 A | 4/1996 | Jiang et al. |
| 5,514,379 A | 5/1996 | Weissleder et al. |
| 5,567,685 A | 10/1996 | Linden et al. |
| 5,643,575 A | 7/1997 | Martinez et al. |
| 5,733,563 A | 3/1998 | Fortier |
| 5,830,986 A | 11/1998 | Merrill et al. |
| 5,840,698 A | 11/1998 | Campbell et al. |
| 5,843,865 A | 12/1998 | Del Corral et al. |
| 5,874,500 A | 2/1999 | Rhee et al. |
| 6,051,648 A | 4/2000 | Rhee et al. |
| 6,121,375 A | 9/2000 | Eknoian |
| 6,150,472 A | 11/2000 | Engbers |
| 6,165,488 A | 12/2000 | Tardy et al. |
| 6,166,130 A | 12/2000 | Rhee et al. |
| 6,323,278 B2 | 11/2001 | Rhee et al. |
| 6,391,939 B2 | 5/2002 | Tayot et al. |
| 6,410,519 B1 | 6/2002 | Gruskin et al. |
| 6,458,147 B1 | 10/2002 | Cruise et al. |
| 6,458,889 B1 | 10/2002 | Trollsas et al. |
| 6,465,694 B1 | 10/2002 | Baudys et al. |
| 6,514,534 B1 | 2/2003 | Sawhney |
| 6,534,591 B2 | 3/2003 | Rhee et al. |
| 6,602,952 B1 | 8/2003 | Bentley et al. |
| 6,620,125 B1 | 9/2003 | Redl |
| 6,696,089 B2 | 2/2004 | Kabanov et al. |

(Continued)

FOREIGN PATENT DOCUMENTS

EP        0961783        1/2007

(Continued)

OTHER PUBLICATIONS

Halabi et al., J. Org. Chem, 65, Synthesis and Characterization of a Novel Dendritic Acrylic Monomer, pp. 9210-9213 (2000).
Newkome et al., J. Org. Chem, 67, Improved Synthesis of an Ethereal Tetraamine Core for Dendimer Construction, pp. 3957-3960 (2002).
Fishman et al., J. Org. Chem. 68, Synthesis and Investigation of Novel Branched PEG-Based Soluble Polymer Supports, pp. 9843-9846 (2003).
Thome, J., et al., "Ultrathin Antibacterial Polyammonium Coatings on Polymer Surfaces"; Surface and Coatings Technology, 174-175, 2003, pp. 584-587.
Harris, J. Milton, "Laboratory Synthesis of Polyethylene Glycol Derivatives", JMS—Rev., Macromol. Chem. Phys., C25 (3), 1985, pp. 325-373.

(Continued)

*Primary Examiner* — Fereydoun G Sajjadi
*Assistant Examiner* — Alma Pipic
(74) *Attorney, Agent, or Firm* — McCarter & English

(57) ABSTRACT

Branched end reactants having two or three functional groups at the ends are disclosed. The branched end reactants are used to prepare crosslinked hydrogel tissue adhesives, which have a good balance of mechanical properties in an aqueous environment. Kits comprising the branched end reactants and methods for applying a coating to an anatomical site on tissue of a living organism are also disclosed.

25 Claims, No Drawings

U.S. PATENT DOCUMENTS

| | | | |
|---|---|---|---|
| 6,703,047 | B2 | 3/2004 | Sawhney et al. |
| 6,756,518 | B2 | 6/2004 | Gruskin et al. |
| 6,800,278 | B1 | 10/2004 | Perrault et al. |
| 6,833,408 | B2 | 12/2004 | Sehl et al. |
| 6,858,736 | B2 | 2/2005 | Chang-min et al. |
| 7,217,845 | B2 | 5/2007 | Rosen et al. |
| 7,834,065 | B2 | 11/2010 | Nakajima et al. |
| 2002/0151520 | A1 | 10/2002 | Gruskin |
| 2003/0022216 | A1 | 1/2003 | Mao et al. |
| 2003/0027788 | A1 | 2/2003 | Singh et al. |
| 2003/0064502 | A1 | 4/2003 | Illman et al. |
| 2003/0087111 | A1 | 5/2003 | Hubbell et al. |
| 2003/0108511 | A1 | 6/2003 | Sawhney |
| 2003/0119985 | A1 | 6/2003 | Sehl et al. |
| 2004/0086479 | A1 | 5/2004 | Grinstaff et al. |
| 2004/0096507 | A1 | 5/2004 | Kwang et al. |
| 2004/0225097 | A1 | 11/2004 | Nho et al. |
| 2004/0235708 | A1 | 11/2004 | Rhee et al. |
| 2005/0002893 | A1 | 1/2005 | Goldmann |
| 2005/0020805 | A1 | 1/2005 | Sunkara et al. |
| 2005/0288684 | A1 | 12/2005 | Aronson et al. |
| 2006/0078536 | A1 | 4/2006 | Kodokian et al. |
| 2006/0115531 | A1 | 6/2006 | Chenault |
| 2006/0292030 | A1 | 12/2006 | Odermatt et al. |
| 2007/0031467 | A1 | 2/2007 | Abrahams et al. |
| 2007/0048251 | A1 | 3/2007 | Arthur |
| 2007/0249870 | A1 | 10/2007 | Chenault |
| 2008/0220047 | A1 | 9/2008 | Sawhney et al. |
| 2008/0319101 | A1 | 12/2008 | Nakajima et al. |
| 2009/0054535 | A1 | 2/2009 | Figuly et al. |
| 2010/0112063 | A1 | 5/2010 | Figuly et al. |
| 2011/0269916 | A1 | 11/2011 | Chenault et al. |

FOREIGN PATENT DOCUMENTS

| | | |
|---|---|---|
| JP | 1982-102932 | 6/1982 |
| JP | 1988-11167 | 1/1988 |
| WO | WO 87/00836 | 2/1987 |
| WO | WO 90/10441 | 9/1990 |
| WO | WO 91/15368 | 10/1991 |
| WO | WO 97/30103 | 8/1997 |
| WO | WO 99/01143 | 1/1999 |
| WO | WO 00/69925 | 11/2000 |
| WO | WO 01/49268 | 7/2001 |
| WO | WO 01/72280 | 10/2001 |
| WO | WO 01/87986 | 11/2001 |
| WO | WO 02/102864 | 12/2002 |
| WO | WO 03/020818 | 3/2003 |
| WO | 03064502 A1 | 8/2003 |
| WO | WO 03/097759 | 11/2003 |
| WO | WO 2006/031358 | 3/2006 |
| WO | WO 2006/042161 | 4/2006 |
| WO | WO 2006/080523 | 8/2006 |
| WO | WO 2006/086510 | 8/2006 |
| WO | WO 2008/005207 | 1/2008 |
| WO | WO 2008/066787 | 6/2008 |
| WO | WO 2009/064977 | 5/2009 |
| WO | WO 2010/059279 | 5/2010 |
| WO | WO 2010/059280 | 5/2010 |
| WO | WO 2010/111570 | 9/2010 |
| WO | WO 2010/118284 | 10/2010 |

OTHER PUBLICATIONS

Harris, J. Milton, et al., "Synthesis of New Poly(Ethylene Glycol) Derivatives", PolyEthylene Glycol Chemistry: Biotechnical and Biomedical Applications, edited by Milton J. Harris, Plenum Press: New York, 1992, pp. 371-381.

Chen, Nicole, et al., "Mechanisms of Aldehyde-Containing Paper Wet-Strength Resins", Industrial & Engineering Chemistry Research, vol. 41, No. 22, 2002, pp. 5366-5371.

Callant, Dominique, et al., "A New Approach to Dextran Derivatives with Pendent Aldehyde Groups", Reactive Polymers, vol. 8 , 1988, pp. 129-136.

Hollander, Andreas, et al., "Polymer Surface Chemistry for Biologically Active Materials", Applied Surface Science, vol. 235, 2004, pp. 145-150.

Stone, H. Harlan, et al., "Antibiotic Prophylaxis in Gastric, Biliary and Colonic Surgery", Ann. Surg; Oct. 1976, pp. 443-450.

Fishman, Alexander, et al., "Synthesis and Investigation of Novel Branched PEG-Based Soluble Polymer Supports", The Journal of Organic Chemistry, vol. 68, 2003, pp. 9843-9846.

Newkome, George R., "Improved Synthesis of an Ethereal Tetraamine Core for Dendrimer Construction", The Journal of Organic Chemistry, vol. 67, 2002, pp. 3957-3960.

Halabi, A., et al., "Synthesis and Characterization of a Novel Dendritic Acrylic Monomer", The Journal of Organic Chemistry, vol. 65, 2000, pp. 9210-9213.

Harris, J. Milton, et al., "Synthesis and Characterization of Poly(ethylene Glycol) Derivatives", Journal of Polymer Science: Polymer Chemistry Edition, vol. 22, 1984, pp. 341-352.

Merrill, Edward W., "Poly(ethylene oxide) Star Molecules: Synthesis, Characterization, and Applications in Medicine and Biology", Journal of Biomaterials Science Polymer Edition, vol. 5, No. 1/2, 1993, pp. 1-11.

Zhao, Xuan, et al., "Novel Degradable Poly(ethylene glycol) Esters for Drug Delivery", Poly(ethylene glycol) Chemistry and Biological Applications, Oxford University Press, 1998, Chapter 28, pp. 458-472.

Azzam, Tony, et al., "Cationic Polysaccharides for Gene Delivery", Macromolecules, vol. 35, No. 27, 2002, pp. 9947-9953.

Nagasaki, Yukio, et al., "Formyl-Ended Heterobifunctional Poly(ethylene oxide): Synthesis of Poly(ethylene oxide) with a Formyl Group at One End and a Hydroxyl Group at the Other End", Bioconjugate Chemistry, vol. 6, No. 2, 1995, pp. 231-233.

Greenwald, Richard B., et al., "Drug Delivery Systems Employing 1,4- or 1,6-Elimination: Poly(ethylene glycol) Prodrugs of Amine-Containing Compounds", Journal of Medicinal Chemistry, vol. 42, No. 18, 1999, pp. 3657-3667.

Zalipsky, Samuel, et al., "Preparation and Applications of Polyethylene Glycol—Polystyrene Graft Resin Supports for Solid-Phase Peptide Synthesis", Reactive Polymers, vol. 22, 1994, pp. 243-258.

Lara, V.S., et al., "Dentin-Induced in Vivo Inflammatory Response and in Vitro Activation of Murine Macrophages", Journal of Dental Research, vol. 82, No. 6, 2003, pp. 460-465.

Atassi, M.Z., "Immunochemistry of Proteins", vol. 1, Plenum Press, New York, 1977, pp. 59-60.

Sweeney, Thomas, et al., "Intestinal Anastomoses Detected with a Photopolymerized Hydrogel", Surgery, vol. 131, No. 2, Feb. 2002, pp. 185-189.

Kim, Jae Chan, et al., "Evaluation of Tissue Adhesives in Closure of Scleral Tunnel Incisions", Journal of Cataract & Refractive Surgery, vol. 21, May 1995, pp. 320-325.

Sarayba, Melvin A., et al., "Inflow of Ocular Surface Fluid Through Clear Corneal Cataract Incisions: A Laboratory Model", American Journal of Ophthalmology, vol. 138, No. 2, Aug. 2004, pp. 206-210.

Buckmann, Andreas F., et al., "Functionalization of Poly(ethylene glycol) and Monomethoxy-Poly(ethylene glycol)", Makromolecular Chemistry, vol. 182, 1981, pp. 1379-1384.

Bruce, J., et al., "Systematic Review of the Definition and Measurement of Anastomotic Leak after Gastrointestinal Surgery", British Journal of Surgery, vol. 88, 2001, pp. 1157-1168.

Mo, Xiumei, et al "Soft Tissue Adhesive Composed of Modified Gelatin and Polysaccharides", Journal of Biomaterials Science Polymer Edition, vol. 11, No. 4, 2000, pp. 341-351.

Hofreiter, B.T., et al., "Rapid Estimation of Dialdehyde Content of Periodate Oxystarch through Quantitative Alkali Consumption", Analytical Chemistry, vol. 27, No. 12, Dec. 1955, pp. 1930-1931.

Zhao, Huiru, et al., "Determination of Degree of Substitution of Formyl Groups in Polyaldehyde Dextran by the Hydroxylamine Hydrochloride Method", Pharmaceutical Research, vol. 8, No. 3, 1991, pp. 400-402.

Kurisawa, Motoichi, et al., "Double-Stimuli-Responsive Degradation of Hydrogels Consisting of Oligopeptide-Terminated Poly(ethylene glycol) and Dextran with an Interpenetrating Polymer Network", Journal of Biomaterials Science Polymer Edition, vol. 8, No. 9, 1997, pp. 691-708.

Pfannemuller, B., et al., "Chemical Modification of the Surface of the Starch Granules", Starch/Starke, vol. 95, No. 9, 1983, pp. 298-303.

* cited by examiner

BRANCHED END REACTANTS AND POLYMERIC HYDROGEL TISSUE ADHESIVES THEREFROM

CROSS-REFERENCE TO RELATED APPLICATION

This application claims priority under 35 U.S.C. §119 from U.S. Provisional Application Ser. Nos. 60/861,167 and 60/861,181, filed Nov. 27, 2006.

FIELD OF THE INVENTION

The invention relates to the field of medical adhesives. More specifically, the invention relates to branched end reactants that can used to prepare hydrogel tissue adhesives with improved mechanical properties. The invention also relates to kits and methods for applying a coating to an anatomical site on tissue of a living organism using a polymer tissue adhesive formed using at least one branched end reactant.

BACKGROUND OF THE INVENTION

Tissue adhesives have many potential medical applications, including wound closure, supplementing or replacing sutures or staples in internal surgical procedures, adhesion of synthetic onlays or inlays to the cornea, drug delivery devices, and as anti-adhesion barriers to prevent post-surgical adhesions. Conventional tissue adhesives are generally not suitable for a wide range of adhesive applications. For example, cyanoacrylate-based adhesives have been used for topical wound closure, but the release of toxic degradation products limits their use for internal applications. Fibrin-based adhesives are slow curing, have poor mechanical strength, and pose a risk of viral infection. Additionally, the Fibrin-based adhesives do not covalently bind to the underlying tissue.

Several types of hydrogel tissue adhesives have been developed, which have improved adhesive and cohesive properties and are nontoxic. These hydrogels are generally formed by reacting a component having nucleophilic groups with a component having electrophilic groups, which are capable of reacting with the nucleophilic groups of the first component, to form a crosslinked network via covalent bonding. However, these hydrogels typically swell or dissolve away too quickly, or lack sufficient adhesion or mechanical strength, thereby decreasing their effectiveness as surgical adhesives.

Kodokian et al. (copending and commonly owned U.S. Patent Application Publication No. 2006/0078536) describe hydrogel tissue adhesives formed by reacting an oxidized polysaccharide with a water-dispersible, multi-arm polyether amine. These adhesives provide improved adhesion and cohesion properties, crosslink readily at body temperature, maintain dimensional stability initially, do not degrade rapidly, and are nontoxic to cells and non-inflammatory to tissue. However, for certain applications wherein elongational extension of the adhesive is required due to distension of the tissue (e.g., in an intestinal anastomosis), hydrogel tissue adhesives with greater elongation-to-break are needed. The elongation-to-break of the adhesives described by Kodokian et al. can be improved by reducing the crosslink density of the hydrogel by adjusting the concentration of the reactants such that one reactant is in excess or by using a reactant having the same functionality, but a higher molecular weight. However, because it is the crosslinks that resist hydrogel swelling and confer strength to the hydrogel network, a lower crosslink density often results in a greater equilibrium water content, which leads to extreme swelling and rapid loss of mechanical properties in an aqueous environment.

Engbers (U.S. Pat. No. 6,150,472) describes multi-functional site-containing block copolymers and their use to make hydrogels. These multi-functional site-containing block copolymers are made by coupling oligomers or polymers having many reactive groups, such as poly(ethylene imine), to the ends of a linear polymer. The use of these multi-functional site-containing block copolymers provides hydrogels with improved properties relative to the linear 2-functional site polymers with which they are compared. However, the large multiplicity of reactive groups doesn't provide optimum control of crosslinking. Additionally, the hydrogel properties of a block copolymer with a relatively short linear central component is dominated by the multi-functional site polymers on the ends, with the linear portion having little effect on the elongational strength. Furthermore, the presence of a large number of unreacted functional groups, such as amines in a poly(ethylene imine)-ended polymer, contributes to an undesirably high degree of pH sensitivity, water swelling, and loss of modulus of the hydrogel in an aqueous environment.

Grinstaff et al. (U.S. Patent Application Publication No. 2004/0086479) describe dendritic polymers and crosslinked gels made therefrom. The dendritic polymers have reactive groups at the ends of their branches that are capable of crosslinking with other polymers. The dendritic polymers have characteristics that are similar to those of the multi-functional site-containing block copolymers described by Engbers above, in that they also have a large multiplicity of reactive groups on the chain ends.

Therefore, the problem to be solved is to provide a tissue adhesive material with a suitable balance of mechanical properties, specifically, elongation to break, tensile strength, and water swell, for use in surgical procedures as well as other medical applications.

Applicants have addressed the stated problem by discovering branched end reactants comprising a linear or branched polymer having two or three functional groups at each of the ends of the polymer chain or at the end of the polymer arms. The branched end reactants are used to prepare crosslinked hydrogel adhesives having a good balance of mechanical properties in an aqueous environment.

SUMMARY OF THE INVENTION

In various embodiments, the invention provides linear and multi-arm branched end reactants that are useful as crosslinking agents for preparing hydrogels. The hydrogels may be useful as an adhesive for medical and veterinary applications. Kits comprising the branched end reactants and methods of use are also provided.

Accordingly, in one embodiment the invention provides a composition of matter comprising at least one compound of the formula:

$(YR)_zX(PS)X(RY)_z$; or         (a)

$Q[(PA)X(RY)_z]_m$;         (b)

wherein:
(i) PS is a linear polymeric segment terminating with a methylene group at both ends of said segment, wherein said segment is derived from a polymer selected from the group consisting of: polyethylene oxide, poly(trimethyleneoxide), block or random copolymers of polyethylene oxide and polypropylene oxide, and triblock copolymers of polyethylene oxide and polypropylene oxide;

(ii) X is selected from the group consisting of: $CH_{3-z}$, N, N(acetoacetamide)-$CH_{3-z}$, S—$R_2$—N, S—$R_2$—$CH_{3-z}$, NH—$CH_{3-z}$, and NH—$R_2$—N, wherein $R_2$ is an alkylene group having from 1 to 5 carbon atoms;

(iii) R is selected from the group consisting of: a direct bond, an alkylene group having from 1 to 5 carbon atoms, an alkylene ether group having up to a total of 6 backbone atoms, an alkyleneoxy urethane group of the formula $R_4O(CO)NHCH_2$ wherein $R_4$ is a linear or branched alkylene group having 2 to 6 carbon atoms and $R_4$ is the group that is adjacent to X, and a C3 to C8 cycloalkylene group;

(iv) Y is a functional group selected from the group consisting of: —$NH_2$, —SH, —$CONHNH_2$, acetoacetate, and —$COR_1$, wherein $R_1$ is OH or —N-hydroxysuccinimidyl;

(v) Q is a core atom or molecule selected from the group consisting of: N, a polyol with the hydrogens removed from 3 or more of its OH groups, and N—$R_3$—N, wherein $R_3$ is an alkylene group having 2-12 carbon atoms or a C3 to C8 cycloalkylene group;

(vi) PA is a linear polymeric arm terminating with a methylene group at both ends of said arm, wherein said arm is derived from a polymer selected from the group consisting of: polyethylene oxide, poly(trimethyleneoxide), block or random copolymers of polyethylene oxide and polypropylene oxide, and triblock copolymers of polyethylene oxide and polypropylene oxide;

(vii) z is 2 or 3 where X=$CH_{3-z}$, S—$R_2$—$CH_{3-z}$, N(acetoacetamide)-$CH_{3-z}$ or NH—$CH_{3-z}$ and z is 2 where X=N, NH—$R_2$—N, or S—$R_2$—N; and (vii) m is 2 to 16;

provided that if Y is acetoacetate or $COR_1$, wherein $R_1$ is N-hydroxysuccinimidyl, then X is not NH—$CH_{3-z}$, or NH—$R_2$—N.

In another embodiment the invention provides a kit comprising:
a) at least one compound of the formula:

$(YR)_zX(PS)X(RY)_z$; or             (i)

$Q[(PA)X(RY)_z]_m$;             (ii)

wherein:
(A) PS is a linear polymeric segment terminating with a methylene group at both ends of said segment, wherein said segment is derived from a polymer selected from the group consisting of: polyethylene oxide, poly(trimethyleneoxide), block or random copolymers of polyethylene oxide and polypropylene oxide, and triblock copolymers of polyethylene oxide and polypropylene oxide;

(B) X is selected from the group consisting of: $CH_{3-z}$, N, N(acetoacetamide)-$CH_{3-z}$, S—$R_2$—N, S—$R_2$—$CH_{3-z}$, NH—$CH_{3-z}$, and NH—$R_2$—N, wherein $R_2$ is an alkylene group having from 1 to 5 carbon atoms;

(C) R is selected from the group consisting of: a direct bond, an alkylene group having from 1 to 5 carbon atoms, an alkylene ether group having up to a total of 6 backbone atoms, an alkyleneoxy urethane group of the formula $R_4O(CO)NHCH_2$ wherein $R_4$ is a linear or branched alkylene group having 2 to 6 carbon atoms and $R_4$ is the group that is adjacent to X, and a C3 to C8 cycloalkylene group;

(D) Y is a functional group selected from the group consisting of: —$NH_2$, —SH, —$CONHNH_2$, acetoacetate, and —$COR_1$, wherein $R_1$ is OH or —N-hydroxysuccinimidyl;

(E) Q is a core atom or molecule selected from the group consisting of: N, a polyol with the hydrogens removed from 3 or more of its OH groups, and N—$R_3$—N, wherein $R_3$ is an alkylene group having 2-12 carbon atoms or a C3 to C8 cycloalkylene group;

(F) PA is a linear polymeric arm terminating with a methylene group at both ends of said arm, wherein said arm is derived from a polymer selected from the group consisting of: polyethylene oxide, poly(trimethyleneoxide), block or random copolymers of polyethylene oxide and polypropylene oxide, and triblock copolymers of polyethylene oxide and polypropylene oxide;

(G) z is 2 or 3 where X=$CH_{3-z}$, S—$R_2$—$CH_{3-z}$, N(acetoacetamide)-$CH_{3-z}$, or NH—$CH_{3-z}$ and z is 2 where X=N, NH—$R_2$—N, or S—$R_2$—N;

(H) m is 2 to 16; and
b) at least one water-dispersible polymer;
provided that:
(1) if Y is acetoacetate or $COR_1$, wherein $R_1$ is N-hydroxysuccinimidyl, then X is not NH—$CH_{3-z}$, or NH—$R_2$—N;

(2) if the functional group Y is $NH_2$, SH, or $CONHNH_2$, then the at least one water-dispersible polymer is a water-dispersible polymer having 3 or more electrophilic groups which are capable of reacting with Y;

(3) if the functional group Y is SH and the at least one water-dispersible polymer is a water-dispersible polymer having 3 or more thiol groups, then the kit further comprises an oxidizer which is capable of oxidizing the SH groups to disulfide groups;

(4) if the functional group Y is acetoacetate or $COR_1$, wherein $R_1$ is OH or N-hydroxysuccinimidyl, then the at least one water-dispersible polymer is a water-dispersible polymer having 3 or more nucleophilic groups which are capable of reacting with Y;

(5) if the functional group Y is $COR_1$, wherein $R_1$ is OH, then optionally the kit further comprises: (c) a water-soluble carbodiimide.

In another embodiment the invention provides a composition made by a process comprising reacting:
a) at least one compound of the formula:

$(YR)_zX(PS)X(RY)_z$; or             (i)

$Q[(PA)X(RY)_z]_m$;             (ii)

wherein:
(A) PS is a linear polymeric segment terminating with a methylene group at both ends of said segment, wherein said segment is derived from a polymer selected from the group consisting of: polyethylene oxide, poly(trimethyleneoxide), block or random copolymers of polyethylene oxide and polypropylene oxide, and triblock copolymers of polyethylene oxide and polypropylene oxide;

(B) X is selected from the group consisting of: $CH_{3-z}$, N, N(acetoacetamide)-$CH_{3-z}$, S—$R_2$—N, S—$R_2$—$CH_{3-z}$, NH—$CH_{3-z}$, and NH—$R_2$—N, wherein $R_2$ is an alkylene group having from 1 to 5 carbon atoms;

(C) R is selected from the group consisting of: a direct bond, an alkylene group having from 1 to 5 carbon atoms, an alkylene ether group having up to a total of 6 backbone atoms, an alkyleneoxy urethane group of the formula $R_4O(CO)NHCH_2$ wherein $R_4$ is a linear or branched alkylene group having 2 to 6 carbon atoms and $R_4$ is the group that is adjacent to X, and a C3 to C8 cycloalkylene group;

(D) Y is a functional group selected from the group consisting of: —NH$_2$, —SH, —CONHNH$_2$, acetoacetate, and —COR$_1$, wherein R$_1$ is OH or —N-hydroxysuccinimidyl;

(E) Q is a core atom or molecule selected from the group consisting of: N, a polyol with the hydrogens removed from 3 or more of its OH groups, and N—R$_3$—N, wherein R$_3$ is an alkylene group having 2-12 carbon atoms or a C3 to C8 cycloalkylene group;

(F) PA is a linear polymeric arm terminating with a methylene group at both ends of said arm, wherein said arm is derived from a polymer selected from the group consisting of: polyethylene oxide, poly(trimethyleneoxide), block or random copolymers of polyethylene oxide and polypropylene oxide, and triblock copolymers of polyethylene oxide and polypropylene oxide;

(G) z is 2 or 3 where X=CH$_{3-z}$, S—R$_2$—CH$_{3-z}$, N(acetoacetamide)-CH$_{3-z}$, or NH—CH$_{3-z}$ and z is 2 where X=N, NH—R$_2$—N, or S—R$_2$—N;

(H) m is 2 to 16; with b) at least one water-dispersible polymer, optionally in the presence of water;

provided that:

(1) if Y is acetoacetate or COR$_1$, wherein R$_1$ is N-hydroxysuccinimidyl, then X is not NH—CH$_{3-z}$, or NH—R$_2$—N;

(2) if the functional group Y is NH$_2$, SH, or CONHNH$_2$, then the at least one water-dispersible polymer is a water-dispersible polymer having 3 or more electrophilic groups which are capable of reacting with Y;

(3) if the functional group Y is SH and the at least one water-dispersible polymer is a water-dispersible polymer having 3 or more thiol groups, then the reacting is done in the presence of an oxidizer which is capable of oxidizing the SH groups to disulfide groups;

(4) if the functional group Y is acetoacetate or COR$_1$, wherein R$_1$ is OH or N-hydroxysuccinimidyl, then the at least one water-dispersible polymer is a water-dispersible polymer having 3 or more nucleophilic groups which are capable of reacting with Y;

(5) if the functional group Y is COR$_1$, wherein R$_1$ is OH, then optionally said functional group is activated by reaction with a water-soluble carbodiimide to form an activated functional group and the at least one water-dispersible polymer is a water-dispersible polymer having 3 or more nucleophilic groups which are capable of reacting with said activated functional group.

In another embodiment the invention provides a method for applying a coating to an anatomical site on tissue of a living organism comprising:

applying to the site a) a first aqueous solution or dispersion comprising at least one compound of the formula:

  (i)

  (ii)

wherein:

(A) PS is a linear polymeric segment terminating with a methylene group at both ends of said segment, wherein said segment is derived from a polymer selected from the group consisting of: polyethylene oxide, poly(trimethyleneoxide), block or random copolymers of polyethylene oxide and polypropylene oxide, and triblock copolymers of polyethylene oxide and polypropylene oxide;

(B) X is selected from the group consisting of: CH$_{3-z}$, N, N(acetoacetamide)-CH$_{3-z}$, S—R$_2$—N, S—R$_2$—CH$_{3-z}$, NH—CH$_{3-z}$, and NH—R$_2$—N, wherein R$_2$ is an alkylene group having from 1 to 5 carbon atoms;

(C) R is selected from the group consisting of: a direct bond, an alkylene group having from 1 to 5 carbon atoms, an alkylene ether group having up to a total of 6 backbone atoms, an alkyleneoxy urethane group of the formula R$_4$O(CO)NHCH$_2$ wherein R$_4$ is a linear or branched alkylene group having 2 to 6 carbon atoms and R$_4$ is the group that is adjacent to X, and a C3 to C8 cycloalkylene group;

(D) Y is a functional group selected from the group consisting of: —NH$_2$, —SH, —CONHNH$_2$, acetoacetate, and —COR$_1$, wherein R$_1$ is OH or —N-hydroxysuccinimidyl;

(E) Q is a core atom or molecule selected from the group consisting of: N, a polyol with the hydrogens removed from 3 or more of its OH groups, and N—R$_3$—N, wherein R$_3$ is an alkylene group having 2-12 carbon atoms or a C3 to C8 cycloalkylene group;

(F) PA is a linear polymeric arm terminating with a methylene group at both ends of said arm, wherein said arm is derived from a polymer selected from the group consisting of: polyethylene oxide, poly(trimethyleneoxide), block or random copolymers of polyethylene oxide and polypropylene oxide, and triblock copolymers of polyethylene oxide and polypropylene oxide;

(G) z is 2 or 3 where X=CH$_{3-z}$, S—R$_2$—CH$_{3-z}$, N(acetoacetamide)-CH$_{3-z}$, or NH—CH$_{3-z}$ and z is 2 where X=N, NH—R$_2$—N, or S—R$_2$—N;

(H) m is 2 to 16;

(I) said first aqueous solution or dispersion contains from about 5% to about 70% by weight of said compound relative to the total weight of the solution or dispersion;

followed by b) a second aqueous solution or dispersion comprising at least one water-dispersible polymer, said solution or dispersion containing from about 5% to about 70% by weight of said water-dispersible polymer relative to the total weight of the solution or dispersion, or applying the second aqueous solution or dispersion followed by the first aqueous solution or dispersion and mixing the first and second aqueous solutions or dispersions on the site, or premixing the first and second aqueous solutions or dispersions and applying the resulting mixture to the site before the resulting mixture completely cures;

provided that:

(1) if Y is acetoacetate or COR$_1$, wherein R$_1$ is N-hydroxysuccinimidyl, then X is not NH—CH$_{3-z}$, or NH—R$_2$—N;

(2) if the functional group Y is NH$_2$, SH, or CONHNH$_2$, then the at least one water-dispersible polymer in the second aqueous solution or dispersion is a water-dispersible polymer having 3 or more electrophilic groups which are capable of reacting with Y;

(3) if the functional group Y is SH and the at least one water-dispersible polymer in the second aqueous solution or dispersion is a water-dispersible polymer having 3 or more thiol groups, then at least one of the first or second aqueous solution or dispersion further comprises an oxidizer which is capable of oxidizing the SH groups to disulfide groups;

(4) if the functional group Y is acetoacetate or $COR_1$, wherein $R_1$ is OH or N-hydroxysuccinimidyl, then the at least one water-dispersible polymer in the second aqueous solution or dispersion is a water-dispersible polymer having 3 or more nucleophilic groups which are capable of reacting with Y;

(5) if the functional group Y is $COR_1$, wherein $R_1$ is OH, then optionally said functional group is activated by reaction with a water-soluble carbodiimide to form an activated functional group and the at least one water-dispersible polymer in the second aqueous solution or dispersion is a water-dispersible polymer having 3 or more nucleophilic groups which are capable of reacting with said activated functional group.

DETAILED DESCRIPTION OF THE INVENTION

In various embodiments, the invention provides branched end reactants that are useful as crosslinking agents for preparing hydrogels having a good balance of mechanical properties (i.e., elongation to break, tensile strength, and water swell) in an aqueous environment. The branched end reactants can be linear or branched polymers having two or three functional groups at each of the ends of the polymer chain or at the end of the polymer arms. The multiplicity of functional groups increases the statistical probability of reaction at a given chain end and allows more efficient incorporation of the linear or branched molecules into a polymer network. As a result, hydrogels formed using the branched end reactants disclosed herein have a reduced degree of swelling and a slower rate of hydrolytic degradation compared to hydrogels prepared with similar crosslinking molecules having only a single functional group at each end. Therefore, linear or branched crosslinking molecules which promote better elongation can be employed in the hydrogel without also incurring high water swelling and fast degradation. Additionally, branched end reactants having a limited number of two or three functional groups at the ends of the polymer chain or at the end of the polymer arms provide better control of crosslinking than multi-functional site containing polymers, which are known in the art, that have polymeric end blocks with a large multiplicity of functional groups.

The hydrogels formed using the branched end reactants disclosed herein may be useful as an adhesive for medical and veterinary applications including, but not limited to, wound closure, supplementing or replacing sutures or staples in internal surgical procedures such as intestinal anastomosis and vascular anastomosis, tissue repair, ophthalmic procedures, and as a plug to seal a fistula or the punctum. Additionally, the hydrogels may have utility in drug delivery, and in anti-adhesive applications.

The following definitions are used herein and should be referred to for interpretation of the claims and the specification.

The term "crosslink" refers to a bond or chain attached between and linking two different polymer chains.

The term "crosslink density" is herein defined as the reciprocal of the average number of chain atoms between crosslink connection sites.

The term "oxidized polysaccharide" refers to a polysaccharide which has been reacted with an oxidizing agent to introduce aldehyde groups into the molecule.

The terms "equivalent weight per acetoacetate group", "equivalent weight per amino group", and "equivalent weight per aldehyde group" refer to the molecular weight of the compound divided by the number of acetoacetate, amino or aldehyde groups, respectively, in the molecule.

The term "water-dispersible polymer having three or more nucleophilic groups" refers to a natural, synthetic, or semi-synthetic polymer containing three or more nucleophilic groups (i.e., electron donating groups), such as amine, thiol, or carboxyhydrazide, and which is water soluble or able to be dispersed in water to form a colloidal suspension capable of reacting with a second reactant containing electrophilic groups in an aqueous solution or dispersion. The water-dispersible polymer can also be a branched end reactant having nucleophilic groups, as disclosed herein.

The term "water-dispersible polymer having three or more electrophilic groups" refers to a natural, synthetic, or semi-synthetic polymer containing three or more electrophilic groups (i.e., electron accepting groups) such as aldehyde, acetoacetate, N-hydroxysuccinimidyl ester, or isocyanate, and which is water soluble or able to be dispersed in water to form a colloidal suspension capable of reacting with a second reactant containing nucleophilic groups in an aqueous solution or dispersion. Additionally as defined herein, water-dispersible polymers having three or more electrophilic groups include natural, synthetic, or semi-synthetic polymers containing three or more carboxylic acid groups which can be activated, for example using a water-soluble carbodiimide, to react with nucleophilic groups. The water-dispersible polymer can also be a branched end reactant having electrophilic groups, as disclosed herein. It can be appreciated by one skilled in the art, that not all possible nucleophiles will form a usefully stable crosslink in combination with all possible electrophiles. For instance, it is well known that a thiol will not form a particularly stable bond with an aldehyde or an acetoacetate under the conditions of hydrogel formation detailed herein. However, a thiol will form a reasonably stable thioester bond upon reaction with an N-hydroxysuccinimidyl ester under these conditions.

The term "semi-synthetic polymer" refers to a naturally occurring polymer that has been chemically modified, as for example to introduce reactive groups into the molecule.

The term "water-dispersible polymer" refers to a natural, synthetic, or semi-synthetic polymer which is water soluble or able to be dispersed in water to form a colloidal dispersion capable of reacting with a second reactant in aqueous solution or dispersion.

The term "water-dispersible, multi-arm polyether amine" refers to a branched polyether, wherein at least three of the branches ("arms") are terminated by a primary amine group, which is water soluble or able to be dispersed in water to form a colloidal dispersion capable of reacting with a second reactant in aqueous solution or dispersion.

The term "polyether" refers to a polymer having the repeat unit [—O—R]—, wherein R is a hydrocarbyl group having 2 to 5 carbon atoms.

The term "branched polyether" refers to a polyether having one or more branch points ("arms"), including star, dendritic, comb, and hyperbranched polyethers.

The term "dendritic polyether" refers to a highly branched polyether having a tree-like structure.

The term "comb polyether" refers to a polyether having a main chain with multiple trifunctional branch points from each of which a linear arm emanates.

The term "star polyether" refers to polyether having a central branch point, which may be a single atom or a chemical group, from which linear arms emanate.

The term "hyperbranched polyether" refers to a highly branched polyether having fewer branches and less regular branching than a dendritic polyether.

The term "multi-functional amine" refers to a chemical compound comprising at least two functional groups, at least one of which is a primary amine group.

The term "% by weight" as used herein refers to the weight percent relative to the total weight of the solution or dispersion, unless otherwise specified.

The term "anatomical site" refers to any external or internal part of the body of humans or animals.

The term "tissue" refers to any tissue, both living and dead, in humans or animals.

The term "hydrogel" refers to a water-swellable polymeric matrix, consisting of a three-dimensional network of macromolecules held together by covalent or non-covalent crosslinks, that can absorb a substantial amount of water to form an elastic gel.

The term "polyol" refers to a chemical compound having three or more OH groups.

By medical application is meant medical applications as related to humans and animals.

The branched end reactants disclosed herein are water-dispersible polymers that are useful as crosslinking molecules for preparing hydrogel tissue adhesives. The branched end reactants disclosed herein are not dendrimers. Dendrimers are characterized by a fractal structure with rigorously repeating subunits at each branch point such that the terminal branch functionality will always be the same length as all the other branches in the molecule. As a result, dendritic crosslinking agents do not confer the same properties to the resulting hydrogels as do the branched end reactants disclosed herein. In general, such dendrimerically-crosslinked hydrogels are rather brittle with short elongation-to-break due to the high density of crosslinks and relatively short branch lengths.

In one embodiment of the present invention, the branched end reactants are linear polymers having the general formula:

$$(YR)_zX(PS)X(RY)_z \quad (1)$$

In the formula, "PS" is a linear polymeric segment terminating with a methylene group at both ends of said segment, wherein said segment is derived from a polymer selected from polyethylene oxide, poly(trimethyleneoxide), block or random copolymers of polyethylene oxide and polypropylene oxide, and triblock copolymers of polyethylene oxide and polypropylene oxide. Preferably, PS has a weight-average molecular weight of about 200 to about 20,000 Daltons. "R" is selected from a direct bond, an alkylene group having from 1 to 5 carbon atoms, an alkylene ether group having up to a total of 6 backbone atoms, an alkyleneoxy urethane group of the formula $R_4O(CO)NHCH_2$ wherein $R_4$ is a linear or branched alkylene group having 2 to 6 carbon atoms and $R_4$ is the group that is adjacent to X, and a C3 to C8 cycloalkylene group. "Y" is a functional group selected from —$NH_2$, —SH, —$CONHNH_2$, acetoacetate, and —$COR_1$, wherein $R_1$ is OH or N-hydroxysuccinimidyl. "X" is a connecting group selected from $CH_{3-z}$, N, N(acetoacetamide)-$CH_{3-z}$, S—$R_2$—N, S—$R_2$—$CH_{3-z}$, NH—$CH_{3-z}$ and NH—$R_2$—N, wherein $R_2$ is an alkylene group having from 1 to 5 carbon atoms. Acetoacetates or N-hydroxysuccinimidyl esters are not compatible with free NH groups in the same molecule. Therefore, if Y is acetoacetate or $COR_1$, wherein $R_1$ is N-hydroxysuccinimidyl, then X is not NH—$CH_{3-z}$ or NH—$R_2$—N. The number of branches at each end "z" is 2 or 3 where X=$CH_{3-z}$, N(acetoacetamide)-$CH_{3-z}$, S—$R_2$—$CH_{3-z}$, or NH—$CH_{3-z}$ and z is 2 when X=N, NH—$R_2$—N, or S—$R_2$—N.

The starting materials used to prepare the linear, branched end reactants disclosed herein may be linear polymers such as polyethylene oxide, poly(trimethyleneoxide), block or random copolymers of polyethylene oxide and polypropylene oxide or triblock copolymers of polyethylene oxide and polypropylene oxide, having terminal hydroxyl groups. These compounds are available from commercial sources such as Sigma-Aldrich (St Louis, Mo.), SunBio Inc. (Anyang City, S. Korea), and NOF Corp. (Tokyo, Japan). It should be recognized that these polymers are generally a heterogeneous mixture having a distribution of different molecular weights, and are characterized by an average molecular weight, for example, the weight-average molecular weight ($M_w$), or the number average molecular weight ($M_n$), as is known in the art. Consequently, the linear, branched end reactants derived from these polymers are compositions comprising a heterogeneous mixture having a distribution of different molecular weights.

The linear, branched end reactants can be prepared by attaching multiple functional groups to the ends of the linear polymer by reaction with the hydroxyl groups using methods well known in the art. For example, to prepare a linear, branched end reactant having two amine functional groups on each end, the linear polymer can be first reacted with methanesulfonyl chloride in a suitable solvent, such as dichloromethane, in the presence of a base such as tripentylamine, to form the dimesylate derivative, as illustrated in the following reaction using linear polyethylene glycol (PEG) having a molecular weight of 1500 Daltons (see Example 1 for details):

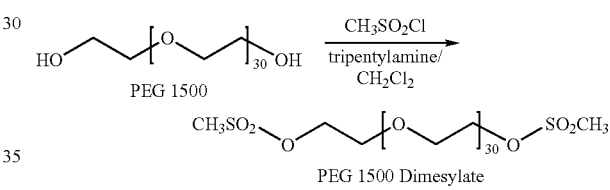

The dimesylate derivative may be isolated and purified using methods known in the art, for example, solvent extraction, precipitation, recrystallization, and the like and then reacted with an excess of tris(2-aminoethyl)amine to give the branched end reactant, e.g.,

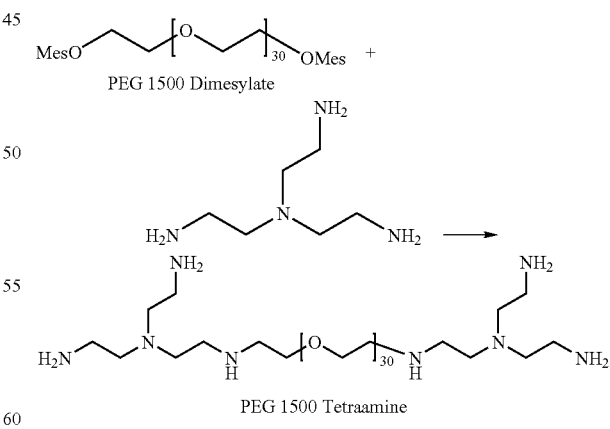

The branched end reactant may be isolated and purified using methods known in the art, for example, solvent extraction, precipitation, recrystallization, and the like.

In the reaction with tris(2-aminoethyl)amine a large excess of the amine is used to prevent oligomerization. Additionally, care is taken to protect aqueous or wet organic solutions of these branched-end amines from atmospheric carbon dioxide, as carbamate formation is very facile.

Alternatively, the linear polymer may be reacted with thionyl chloride to give the chloride derivative, which is subsequently reacted with tris(2-aminoethyl)amine to give the branched end reactant having two amino groups at each end. Other methods include, but are not limited to, conversion of the linear polymer ends to bromides or iodides or other sulfonate esters, followed by reaction with tris(2-aminoethyl)amine.

The "X" and "R" groups that are incorporated into the branched end reactants depend on the reactants used to attach the multiple functional groups.

Other linear, branched end reactants encompassed by general formula (1) may be prepared using methods that are well known in the art. Typically, the hydroxyl end groups of the polymer precursor to PS are converted to chloride or mesylate ends, as described above, and the resulting compound is further reacted to attach the multiple functional groups. Several nonlimiting examples of methods to prepare other linear, branched end reactants are provided below.

The reaction of a PEG bearing chloride or mesylate ends with an excess of tris(3-aminopropyl)amine (BASF Corp., Ludwigshafen, Germany) will give a branched amine end. In this case the linker X is $NHCH_2CH_2CH_2N$, R is $CH_2CH_2CH_2$, and Y is $NH_2$.

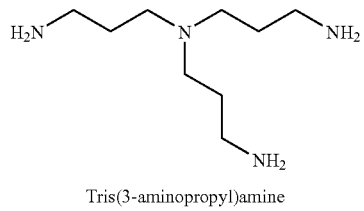

Tris(3-aminopropyl)amine

The reaction of a PEG bearing chloride or mesylate ends with malonate ester carbanion will give a branched bis(carboxylic ester) end which when hydrolyzed will give the branched end bis(carboxylic acid) end; in this case the linker X is $CH_{3-z}$ with z=2; R is a direct bond and Y is COOH.

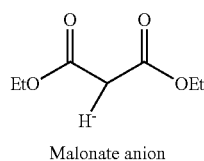

Malonate anion

The reaction of a PEG bearing chloride or mesylate ends with iminobispropionitrile will give a branched biscyanoethyl end capable of reduction by diborane to give the branched end bis(propylamine); in this case the linker X is N, R is $CH_2CH_2CH_2$, Y is $NH_2$ and z is 2. Acidic or basic hydrolysis of the biscyanoethyl adduct will give the branched end COOH; in this case the linker X is N, R is $CH_2CH_2$, Y is COOH and z is 2.

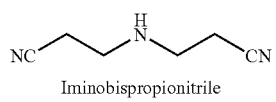

Iminobispropionitrile

The reaction of a PEG bearing chloride or mesylate ends with diethanolamine will give branched hydroxyethyl ends; subsequent reaction with diketene will give bis(ethyl acetoacetate) ends in which the linker X is N, R is $CH_2CH_2$, Y is acetoacetate, and z is 2.

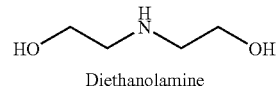

Diethanolamine

Reaction of 1,1,1-tris(hydroxymethyl)aminomethane ("TRIS") with a chloride- or mesylate-ended PEG will give branched tris(hydroxymethyl) ends in which X is NH—$CH_{3-z}$ with z=3. Reaction of the PEG-TRIS triol intermediate with diketene will give a useful polyacetoacetate derivative; however, acetoacetamidation of the imino NH linkage will also occur, such that the product will actually possess tetraacetoacetate ends in which X is N(acetoacetamide)-$CH_{3-z}$ with z=3; R is $CH_2$ and Y is acetoacetate.

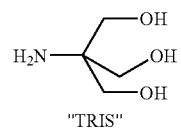

"TRIS"

Reaction of 1,1,1-tris(2-cyanoethyl)aminomethane (made by reduction of the commercially-available 1,1,1-tris(2-cyanoethyl)nitromethane) with a chloride- or mesylate-ended PEG will give a branched tris(cyanoethyl) end capable of reduction by diborane to give the branched end tris(propylamine); in this case the linker X is NH—$CH_{3-z}$ with z=3; R is $CH_2CH_2CH_2$ and Y is $NH_2$. Acidic or basic hydrolysis of the triscyanoethyl adduct will give the branched end COOH; in this case the linker X is NH—$CH_{3-z}$ with z=3; R is $CH_2CH_2$ and Y is COOH.

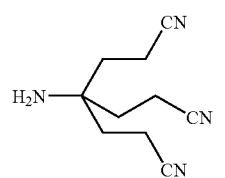

1,1,1-Tris(cyanoethyl)aminomethane

The reaction of a PEG bearing chloride or mesylate ends with N-(thioethyl)iminobisacetonitrile will give branched cyanomethyl ends capable of reduction by diborane to give the branched end bis(ethylamine); in this case X is S—$R_2$—N wherein $R_2$=$CH_2CH_2$; R is $CH_2CH_2$, z=2, and Y is $NH_2$.

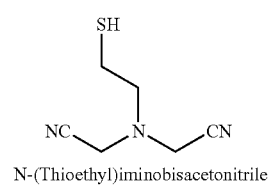

N-(Thioethyl)iminobisacetonitrile

The reaction of a PEG bearing chloride or mesylate ends with diethanolamine will give branched hydroxyethyl ends;

subsequent reaction with ethyl isocyanatoacetate will give bis(ethyl acetourethane) ends; reaction of these urethane ester ends with hydrazine will give bis(carboxyhydrazide) ends in which the linker X=N, R=CH$_2$CH$_2$OCONHCH$_2$ and Y=CONHNH$_2$.

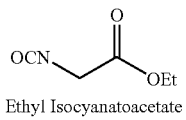
Ethyl Isocyanatoacetate

The reaction of a PEG bearing chloride or mesylate ends with iminobispropionitrile will give a branched biscyanoethyl end capable of acidic or basic hydrolysis of the cyano ends to give carboxylic acid ends; reaction of this product with a mixture of N-hydroxysuccinimide and 1-(3-dimethylaminopropyl)-3-ethylcarbodiimide HCl (EDC) will give N-hydroxysuccinimidyl ester ends where the linker X=N, R=CH$_2$CH$_2$ and Y=COON-(hydroxysuccinimidyl).

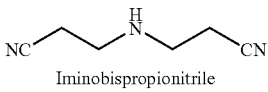
Iminobispropionitrile

The reaction of a PEG bearing chloride or mesylate ends with diethanolamine will give branched hydroxyethyl ends; conversion to toluenesulfonate ends and reaction with sodium hydrosulfide gives thiol ends (Harris et al., *ACS Polymer Preprints* 32:154 (1991)), where X=N, R=CH$_2$CH$_2$ and Y=SH.

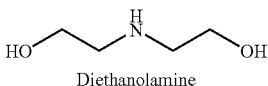
Diethanolamine

The reaction of a PEG bearing chloride or mesylate ends with an excess of pentaerythrithiol (Japanese Patent Application JP92-226960) will give branched tristhiol ends, where X is S—R$_2$—CH$_{3-z}$ wherein R$_2$=CH$_2$; R is CH$_2$, z=3, and Y is SH.

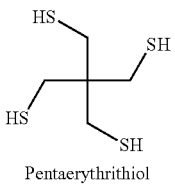
Pentaerythrithiol

In one embodiment, the linear, branched end reactant is a linear poly(ethylene glycol) (PEG) tetraamine according to formula (1), wherein PS is derived from polyethylene oxide, X is NHCH$_2$CH$_2$N, R is CH$_2$CH$_2$, Y is NH$_2$, and z=2. In one embodiment, PS in the linear poly(ethylene glycol) (PEG) tetraamine has a weight-average molecular weight of about 1500 Daltons.

In another embodiment, the linear, branched end reactant is a linear poly(ethylene glycol) (PEG) tetraamine according to formula (1), wherein PS is derived from polyethylene oxide, X is NHCH$_2$CH$_2$CH$_2$N, R is CH$_2$CH$_2$CH$_2$, Y is NH$_2$, and z=2.

In another embodiment, the branched end reactants are multi-arm polymers having the general formula:

$$Q[(PA)X(RY)_z]_m \qquad (2)$$

In the formula, "Q" is a core atom or molecule selected from N, a polyol with the hydrogens removed from 3 or more of its OH groups, and N—R$_3$—N, wherein R$_3$ is an alkylene group having 2-12 carbon atoms or a C3 to C8 cycloalkylene group. Suitable polyols with 3 or more OH groups include, but are not limited to, glycerol, pentaerythritol, dipentaerythritol, and polyglycerols, such as hexaglycerol or tetraglycerol. "PA" is a linear polymeric arm terminating with a methylene group at both ends of said arm, wherein said arm is derived from a polymer selected from polyethylene oxide, poly(trimethyleneoxide), block or random copolymers of polyethylene oxide and polypropylene oxide, and triblock copolymers of polyethylene oxide and polypropylene oxide. Preferably, PA has a weight-average molecular weight of about 100 to about 10,000 Daltons. "R" is selected from a direct bond, an alkylene group having from 1 to 5 carbon atoms, an alkylene ether group having up to a total of 6 backbone atoms, an alkyleneoxy urethane group of the formula R$_4$O(CO)NHCH$_2$ wherein R$_4$ is a linear or branched alkylene group having 2 to 6 carbon atoms and R$_4$ is the group that is adjacent to X, and a C3 to C8 cycloalkylene group. "Y" is a functional group selected from —NH$_2$, —SH, —CONHNH$_2$, acetoacetate, and —COR$_1$, wherein R$_1$ is OH or N-hydroxysuccinimidyl. "X" is a connecting group selected from CH$_{3-z}$, N, N(acetoacetamide)-CH$_{3-z}$, S—R$_2$—N, S—R$_2$—CH$_{3-z}$, NH—CH$_{3-z}$ and NH—R$_2$—N, wherein R$_2$ is an alkylene group having from 1 to 5 carbon atoms. Acetoacetates or N-hydroxysuccinimidyl esters are not compatible with free NH groups in the same molecule. Therefore, if Y is acetoacetate or COR$_1$, wherein R$_1$ is N-hydroxysuccinimidyl, then X is not NH—CH$_{3-z}$ or NH—R$_2$—N. The number of branches on each arm "z" is 2 or 3 where X=CH$_{3-z}$, S—R$_2$—CH$_{3-z}$, N(acetoacetamide)-CH$_{3-z}$ or NH—CH$_{3-z}$ and z is 2 where X=N, NH—R$_2$—N, or S—R$_2$—N. The number of arms "m" is from 2 to 16.

The starting materials used to prepare the multi-arm, branched end reactants may be multi-arm polyether polyols including, but not limited to, comb and star polyether polyols. It should be recognized that the multi-arm polyether polyols are generally a somewhat heterogeneous mixture having a distribution of arm lengths and in some cases, a distribution of species with different numbers of arms. When a polyether polyol has a distribution of species having different numbers of arms, it can be referred to based on the average number of arms in the distribution. For example, in one embodiment the multi-arm polyol is an 8-arm star PEG polyol, available from Nektar Transforming Therapeutics (Huntsville, Ala.), which comprises a mixture of multi-arm star PEG polyols, some having less than and some having more than 8 arms; however, the multi-arm star PEG polyols in the mixture have an average of 8 arms. Consequently, the multi-arm, branched end reactants derived from these polymers are compositions comprising a heterogeneous mixture. Therefore, the terms "8-arm", "6-arm", "4-arm" and "3-arm" as used herein to refer to multi-arm polyethers and derivatives thereof, should be construed as referring to a heterogeneous mixture having a distribution of arm lengths and in some cases, a distribution of species with different numbers of arms, in which case the number of arms recited refers to the average number of arms in the mixture.

Multi-arm polyether polyols are available commercially from companies such as Nektar Transforming Therapeutics, SunBio Corp. (Anyang City, S. Korea), and NOF Corp. (Tokyo, Japan). Alternatively, multi-arm polyether polyols may be synthesized using methods known in the art (see for example, Merrill et. al., U.S. Pat. No. 5,830,986; Hamann et al., EP 540823; and Nho et al., U.S. Patent Application Publication No. 2004/096507). Typically, multi-arm polyether polyols are made by condensing ethylene oxide, propylene oxide or mixtures thereof with a polyol core, such as glycerol, polyglycerol, or triethanolamine, or with a polyamine core such as ethylenediamine, under basic conditions.

The multi-arm, branched end reactants can be prepared by attaching multiple functional groups to the ends of the polymer arms by reaction with the hydroxyl groups using the methods described above for the linear, branched end reactants. For example, a multi-arm, branched end reactant having 8 arms and two amino groups on each arm can be prepared from an 8-arm star PEG polyol. The 8-arm PEG polyol can be first reacted with thionyl chloride to produce an 8-arm PEG chloride, as illustrated in the following reaction using an 8-arm PEG having a molecular weight of 40,000 Daltons (see Example 5 for details):

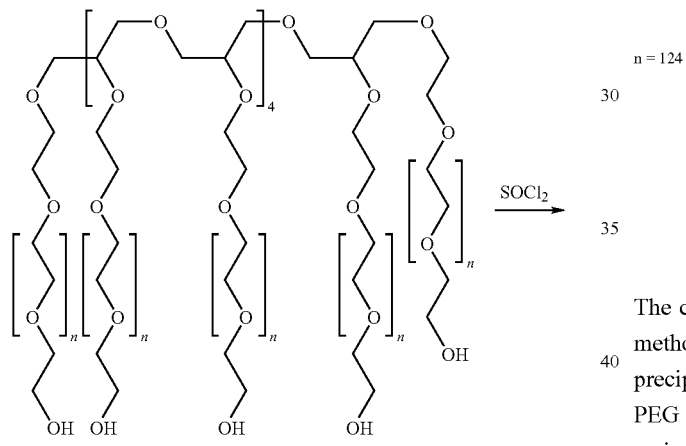

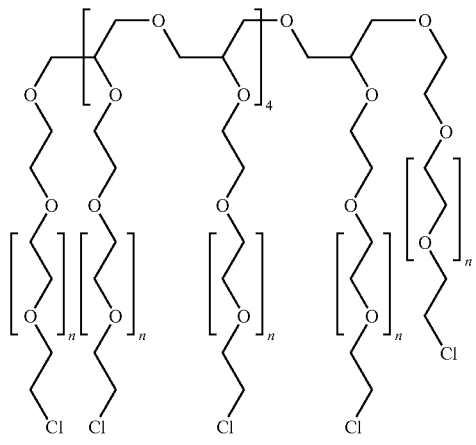

8-Arm PEG 40K Chloride $n = 124$

The chloride derivative may be isolated and purified using methods known in the art, for example solvent extraction, precipitation, recrystallization and the like. Then, the 8-arm PEG chloride can be reacted with excess tris(2-aminoethyl) amine to give the multi-arm, branched end reactant, e.g.,

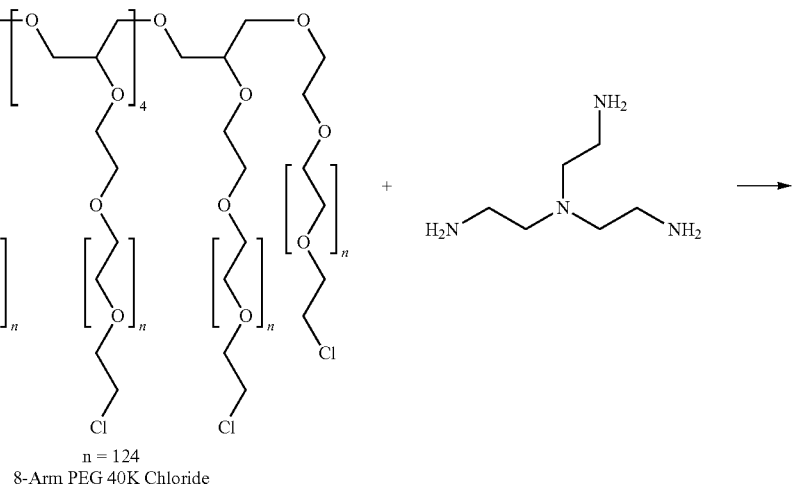

$n = 124$
8-Arm PEG 40K Chloride

-continued

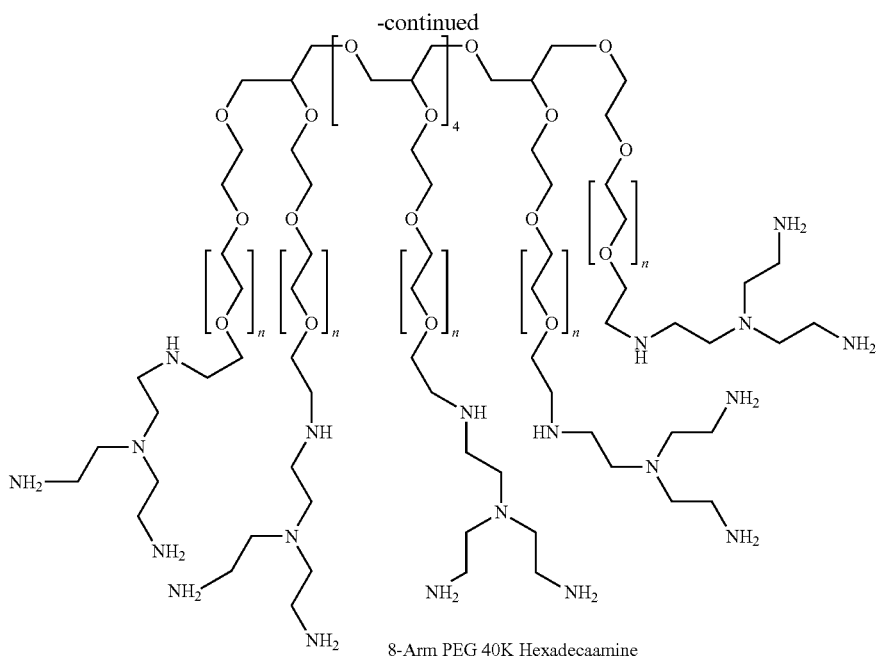

8-Arm PEG 40K Hexadecaamine

The branched end reactant product may be isolated and purified using methods known in the art, as described above.

Alternatively, the multi-arm polyether polyol can be first reacted with methanesulfonyl chloride to form the mesylate derivative, which is then reacted with excess tris(2-aminoethyl)amine to give the multi-arm, branched end reactant (see Example 7 for details).

Other multi-arm, branched end reactants encompassed by general formula (2) may be prepared using methods that are well known in the art. Typically, the hydroxyl end groups of the precursor polymer to PA are converted to chloride or mesylate ends, as described above, and the resulting compound is further reacted to attach the multiple functional groups, as described above for the linear, branched end reactants.

In one embodiment, the multi-arm, branched end reactant is an 8-arm poly(ethylene glycol) hexadecaamine according to formula (2), wherein Q is hexaglycerol with the hydrogens removed from 8 of its OH groups, PA is derived from polyethylene oxide, X is $NHCH_2CH_2N$, R is $CH_2CH_2$, Y is $NH_2$, z=2, and m=8.

In another embodiment, the multi-arm, branched end reactant is an 8-arm poly(ethylene glycol) hexadecaamine according to formula (2), wherein Q is hexaglycerol with the hydrogens removed from 8 of its OH groups, PA is derived from polyethylene oxide, X is $NHCH_2CH_2CH_2N$, R is $CH_2CH_2CH_2$, Y is $NH_2$, z=2, and m=8.

In another embodiment, the multi-arm, branched end reactant is a 4-arm poly(ethylene glycol) octaamine according to formula (2), wherein Q is pentaerythritol with the hydrogens removed from 4 of its OH groups, PA is derived from polyethylene oxide, X is $NHCH_2CH_2N$, R is $CH_2CH_2$, Y is $NH_2$, z=2, and m=4.

In another embodiment, the multi-arm, branched end reactant is a 4-arm poly(ethylene glycol) octaamine according to formula (2), wherein Q is pentaerythritol with the hydrogens removed from 4 of its OH groups, PA is derived from polyethylene oxide, X is $NHCH_2CH_2CH_2N$, R is $CH_2CH_2CH_2$, Y is $NH_2$, z=2, and m=4.

In another embodiment, the multi-arm, branched end reactant is a 6-arm poly(ethylene glycol) dodecaamine according to formula (2), wherein Q is tetraglycerol with the hydrogens removed from 6 of its OH groups, PA is derived from polyethylene oxide, X is $NHCH_2CH_2N$, R is $CH_2CH_2$, Y is $NH_2$, z=2, and m=6.

In another embodiment, the multi-arm, branched end reactant is a 6-arm poly(ethylene glycol) dodecaamine according to formula (2), wherein Q is tetraglycerol with the hydrogens removed from 6 of its OH groups, PA is derived from polyethylene oxide, X is $NHCH_2CH_2CH_2N$, R is $CH_2CH_2CH_2$, Y is $NH_2$, z=2, and m=6.

In another embodiment, the multi-arm, branched end reactant is a 4-arm ethylenediamine poly(ethylene oxide-propylene oxide) octaamine according to formula (2), wherein Q is $NCH_2CH_2N$, PA is derived from poly(ethylene oxide-propylene oxide), X is $NHCH_2CH_2N$, R is $CH_2CH_2$, Y is $NH_2$, z=2, and m=4.

In another embodiment, the multi-arm, branched end reactant is a 4-arm ethylenediamine poly(ethylene oxide-propylene oxide) octaamine according to formula (2), wherein Q is $NCH_2CH_2N$, PA is derived from poly(ethylene oxide-propylene oxide), X is $NHCH_2CH_2CH_2N$, R is $CH_2CH_2CH_2$, Y is $NH_2$, z=2, and m=4.

Hydrogels

The branched end reactants disclosed herein may be used as crosslinking agents to form polymeric hydrogels that are useful for various medical and veterinary applications. The branched end reactants may be used in combination with a variety of molecules to form crosslinked hydrogels. Typically, a branched end reactant having multiple nucleophilic end groups is reacted with a water-dispersible polymer having 3 or more electrophilic groups that are capable of reacting with the nucleophilic groups on the branched end reactant. For example, a branched end reactant having multiple amine ($NH_2$) or carboxyhydrazide ($CONHNH_2$) groups may be reacted with a water-dispersible polymer having 3 or more aldehyde groups. Alternatively, a branched end reactant having multiple electrophilic end groups may be reacted with a water-dispersible polymer having 3 or more nucleophilic groups that are capable of reacting with the electrophilic groups on the branched end reactant. For example, a branched end reactant having multiple acetoacetate or N-hydroxysuccinimidyl ester groups may be reacted with a water-dispersible polymer having 3 or more amine groups. Additionally, a branched end reactant having multiple carboxylic acid groups may be reacted with a water-dispersible polymer having 3 or more nucleophilic groups using carbodiimide crosslinking, which is well known in the art.

The water-dispersible polymer having 3 or more electrophilic groups or the water-dispersible polymer having 3 or more nucleophilic groups may be a naturally occurring polymer, such as a polysaccharide, protein, or chitosan; a synthetic polymer, such as polyethylene glycol or polyvinyl alcohol; or a semi-synthetic polymer (i.e., a naturally occurring polymer that has been chemically modified), such as an oxidized polysaccharide. The synthetic polymers may be linear or branched. The water dispersible polymers may be derivatized to introduce the desired reactive groups using methods known in the art. Additionally, the water-dispersible polymer may be a branched end reactant disclosed herein, specifically, a compound of formula (1) or (2). For example, a branched end reactant having multiple electrophilic end groups may be reacted with a branched end reactant having multiple nucleophilic groups that are capable of reacting to form stable bonds with the electrophilic groups on the first branched end reactant.

Non-limiting examples of combinations of reactants that may be used to prepare hydrogels include, but are not limited to, branched end reactants having multiple $NH_2$ or $CONHNH_2$ groups reacted with: oxidized polysaccharides containing aldehyde groups, such as oxidized dextran; poly(vinyl alcohol) or poly(vinyl alcohol) copolymers derivatized with acetoacetate groups, linear or branched polyethers derivatized with acetoacetate groups; or linear or branched polyethers derivatized with aldehyde groups. Branched end reactants having multiple thiol (SH) groups may be reacted with linear or branched polyethers derivatized with N-hydroxysuccinimidyl ester groups. Branched end reactants having multiple thiol groups may also be reacted with themselves, or with linear or branched polyethers possessing single thiols on the chain ends, in the presence of an oxidizer that is capable of oxidizing the thiol groups to disulfide groups (e.g., dilute hydrogen peroxide) to form inter-molecular disulfide bonds. Additionally, branched end reactants having multiple acetoacetate, or $COR_1$ groups, wherein $R_1$ is OH or N-hydroxysuccinimidyl, may be used in combination with linear or branched polyethers derivatized with primary amine or carboxyhydrazide groups. In the case of $R_1$=OH, in the absence of any additional condensing agent, the amines react with the COOH groups to form salt-bridged gels rather than covalent crosslinks; in the presence of a condensing agent such as a carbodiimide, covalent amide crosslinks are formed. Branched end reactants having multiple $COR_1$ groups, wherein $R_1$ is N-hydroxysuccinimidyl, may be used in combination with linear or branched polyethers derivatized with SH groups. Additionally, branched end reactants having multiple acetoacetate, or $COR_1$ groups, wherein $R_1$ is OH or N-hydroxysuccinimidyl, may be used in combination with branched end reactants having multiple amine groups.

Hydrogels prepared using some exemplary reactants are described below. Similar procedures may be used to prepare hydrogels using the branched end reactants having various functional groups in combination with a variety of other water-dispersible polymers having 3 or more electrophilic or nucleophilic groups, such as those described by Rhee et al. in U.S. Pat. No. 5,874,500 (in particular column 6, line 22 to column 9, line 6), which is incorporated herein by reference. It should be recognized that these other combinations of reactants are within the scope of the invention.

Water-dispersible Polymers Having 3 or More Electrophilic Groups

Oxidized Polysaccharides:

Polysaccharides useful in the invention include, but are not limited to, dextran, starch, agar, cellulose, hydroxyethylcellulose, pullulan, and hyaluronic acid. These polysaccharides are available commercially from sources such as Sigma Chemical Co. (St Louis, Mo.). Suitable polysaccharides have a weight-average molecular weight from about 1,000 to about 1,000,000 Daltons, and in addition from about 3,000 to about 250,000 Daltons.

The polysaccharide is oxidized to introduce aldehyde groups using any suitable oxidizing agent, including but not limited to, periodates, hypochlorites, ozone, peroxides, hydroperoxides, persulfates, and percarbonates. In one embodiment, the polysaccharide is oxidized by reaction with sodium periodate, for example as described by Mo et al. (*J. Biomater. Sci. Polymer Edn.* 11:341-351, 2000). The polysaccharide is reacted with different amounts of periodate to give polysaccharides with different degrees of oxidation and therefore, different amounts of aldehyde groups, as described in detail in the General Methods Section of the Examples below. The aldehyde content of the oxidized polysaccharide may be determined using methods known in the art. For example, the dialdehyde content of the oxidized polysaccharide may be determined using the method described by Hofreiter et al. (*Anal Chem.* 27:1930-1931, 1955), as described in detail in the General Methods Section of the Examples below. In that method, the amount of alkali consumed per mole of dialdehyde in the oxidized polysaccharide, under specific reaction conditions, is determined by a pH titration. In one embodiment, the equivalent weight per aldehyde group of the oxidized polysaccharide is from about 90 to about 1500 Daltons. In one embodiment, the polysaccharide is oxidized dextran having aldehyde groups.

Poly(vinyl alcohol) and Poly(vinyl alcohol) Copolymers Derivatized with Acetoacetate Groups:

Poly(vinyl alcohols) having different weight-average molecular weights and varying degrees of hydrolysis are available commercially from companies such as Sigma-Aldrich (St. Louis, Mo.). Poly(vinyl alcohols) suitable for use in the invention have a weight-average molecular weight of from about 1,000 Daltons to about 100,000 Daltons. Preferably, the weight-average molecular weight is from about 10,000 Daltons to about 50,000 Daltons, more preferably, from about 30,000 Daltons to about 50,000 Daltons. Useful poly(vinyl alcohols) have a degree of hydrolysis of from about 50% to about 100% —OH groups; the remainder of the groups are acetates. Preferably the degree of hydrolysis is from about 60% to about 100%, more preferably from about 80% to about 100%, most preferably from about 95% to about 99%.

Additionally, copolymers of poly(vinyl alcohol), comprising poly(vinyl alcohol) units and comonomer units, may be used. Suitable comonomer units for the poly(vinyl alcohol) copolymers include, but are not limited to, ethylene, methyl acrylate, methyl methacrylate, acrylic acid, itaconic acid, maleic acid, fumaric acid, methyl vinyl ether, propylene, 1-butene, and mixtures thereof. Preferably, the copolymer comprises between about 1 mole percent and about 25 mole percent of the comonomer relative to the vinyl alcohol units.

The poly(vinyl alcohols) and the poly(vinyl alcohol) copolymers can be derivatized with acetoacetate groups by reaction with diketene, as described by Arthur in U.S. Patent Application Publication No. 2006/0079599, which is incorporated wherein by reference (in particular, paragraphs 112-113 and Examples 1-3). Alternative methods of synthesis, such as ester exchange with t-butyl acetoacetate, are also available. Preferably, the acetoacetate derivatives have an equivalent weight per acetoacetate group of about 100 Daltons to about 2,000 Daltons.

Linear and Branched Polyethers Derivatized with Acetoacetate Groups:

Useful linear or branched polyethers have a weight-average molecular weight of about 500 Daltons to about 200,000 Daltons, preferably from about 500 Daltons to about 20,000 Daltons. Suitable examples of linear or branched polyethers include, but are not limited to, linear or branched poly(ethylene oxide), linear or branched poly(propylene oxide), linear or branched copolymers of poly(ethylene oxide) and poly(propylene oxide), linear or branched poly(1,3-trimethylene oxide), linear or branched poly(1,4-tetramethylene oxide), star poly(ethylene oxide), comb poly(ethylene oxide), star poly(propylene oxide), comb poly(propylene oxide), and mixtures thereof. Many linear polyethers are available commercially from companies such as Sigma-Aldrich (St Louis, Mo.). Many branched polyethers are available from NOF Corp. The linear and branched polyethers can be derivatized with acetoacetate groups, as described above. Preferably, the acetoacetate derivatives have an equivalent weight per acetoacetate group of about 100 Daltons to about 2,000 Daltons.

Linear or Branched Polyethers Derivatized with Aldehyde Groups:

The linear and branched polyethers described above may also be derivatized with aldehyde groups using methods known in the art. For example, the primary hydroxy-ended linear and branched polyethers may be converted to toluenesulfonate ends, reacted with sodium hydrosulfide to give thiol ends and subsequently reacted with 3-chloropropionaldehyde diethyl acetal followed by hydrolysis to give thiol-linked aldehyde ends (Harris et al., *ACS Polymer Preprints* 32:154 (1991)). Another polyether aldehyde synthesis is described by Harris (*Poly(Ethylene Glycol) Chemistry: Biotechnical and Biomedical Applications*, J. Milton Harris, Ed., Plenum Press, NY, 1992, Chapter 22). Additionally, polyethylene glycols derivatized with aldehyde groups are available from commercial sources, such as Nektar Transforming Therapeutics. Preferably, the aldehyde derivatives have an equivalent weight per aldehyde group of about 100 Daltons to about 2,000 Daltons.

Linear or Branched Polyethers Derivatized with N-Hydroxysuccinimidyl Ester Groups:

The linear and branched polyethers described above may also be derivatized with N-hydroxysuccinimidyl ester groups using methods known in the art involving conversion of the polyether hydroxy ends to carboxylic acids by carboxymethylation followed by reaction with a combination of N-hydroxysuccinimide and 1-(3-dimethylaminopropyl)-3-ethylcarbodiimide HCl (EDC) (see for example, *Poly(Ethylene Glycol) Chemistry: Biotechnical and Biomedical Applications*, J. Milton Harris, Ed., Plenum Press, NY, 1992, Chapter 21), Preferably, the N-hydroxysuccinimidyl ester derivatives have an equivalent weight per N-hydroxysuccinimidyl ester group of about 100 Daltons to about 2,000 Daltons.

In one embodiment, the water dispersible polymer having 3 or more electrophilic groups is a multi-arm polyether N-hydroxysuccinimidyl ester. The multi-arm polyether N-hydroxysuccinimidyl esters are water-dispersible polyethers having the repeat unit [—O—R]—, wherein R is an hydrocarbylene group having 2 to 5 carbon atoms. The term "hydrocarbylene group" refers to a divalent group formed by removing two hydrogen atoms, one from each of two different carbon atoms, from a hydrocarbon. The multi-arm polyether N-hydroxysuccinimidyl esters of the invention include, but are not limited to, dendritic, comb, and star polyethers wherein at least three of the arms are terminated by a N-hydroxysuccinimidyl ester group. The multi-arm polyether N-hydroxysuccinimidyl esters have a weight average molecular weight of about 450 to about 200,000 Daltons, in addition from about 2,000 to about 40,000 Daltons. The multi-arm polyether N-hydroxysuccinimidyl esters may be prepared from multi-arm polyether polyols using the methods described above.

Water-Dispersible Polymers Having 3 or More Nucleophilic Groups Linear or Branched Polyethers Derivatized with Primary Amine Groups:

The linear and branched polyethers described above may also be derivatized with primary amine groups using methods known in the art (see for example, *Poly(Ethylene Glycol) Chemistry: Biotechnical and Biomedical Applications*, J. Milton Harris, Ed., Plenum Press, NY, 1992, Chapter 22). Preferably, the amine derivatives have an equivalent weight per amine group of about 100 Daltons to about 2,000 Daltons.

In one embodiment, the water-dispersible polymer having 3 or more nucleophilic groups is a multi-arm polyether amine. The multi-arm polyether amines are water-dispersible polyethers having the repeat unit [—O—R]—, wherein R is an hydrocarbylene group having 2 to 5 carbon atoms. The term "hydrocarbylene group" refers to a divalent group formed by removing two hydrogen atoms, one from each of two different carbon atoms, from a hydrocarbon. The multi-arm polyether amines of the invention include, but are not limited to, dendritic, comb, and star polyethers wherein at least three of the arms are terminated by a primary amine group. The multi-arm polyether amines have a weight-average molecular weight of about 450 to about 200,000 Daltons, in addition from about 2,000 to about 40,000 Daltons. Suitable examples of water-dispersible, multi-arm polyether amines include, but are not limited to, amino-terminated star, dendritic, or comb polyethylene oxides; amino-terminated star, dendritic or comb polypropylene oxides; amino-terminated star, dendritic or comb polyethylene oxide-polypropylene oxide copolymers; and polyoxyalkylene triamines, sold under the trade name Jeffamine® triamines, by Huntsman LLC. (Houston, Tex.). Examples of star polyethylene oxide amines, include, but are not limited to, various multi-arm polyethylene glycol amines, available from Nektar Transforming Therapeutics, and star polyethylene glycols having 3, 4, 6, or 8 arms terminated with primary amines (referred to herein as 3, 4, 6 or 8-arm star PEG amines, respectively). The 8-arm star PEG amine is available from Nektar Transforming Therapeutics. Examples of suitable Jeffamine® triamines include, but are not limited to, Jeffamine® T-403 (CAS No. 39423-51-3), Jeffamine® T-3000 (CAS No. 64852-22-8), and Jeffamine® T-5000 (CAS No. 64852-22-8). In one embodiment, the water-dispersible multi-arm polyether amine is an 8-arm polyethylene glycol having eight arms terminated by a primary amine group and having a weight-average molecular weight of 10,000 Daltons (available from Nektar Transforming Therapeutics).

These multi-arm polyether amines are either available commercially, as noted above, or may be prepared using methods known in the art. For example, multi-arm polyethylene glycols, wherein at least three of the arms are terminated by a primary amine group, may be prepared by putting amine ends on multi-arm polyethylene glycols (e.g., 4 and 8-arm star polyethylene glycols, available from Nektar Transforming Therapeutics, SunBio Corp., and NOF Corp.) using the method described by Buckmann et al. (*Makromol. Chem.* 182:1379-1384, 1981). In that method, the multi-arm polyethylene glycol is reacted with thionyl bromide to convert the hydroxyl groups to bromines, which are then converted to amines by reaction with ammonia at 100° C. The method is broadly applicable to the preparation of other multi-arm polyether amines. Additionally, multi-arm polyether amines may be prepared from multi-arm polyols using the method described by Chenault (copending and commonly owned U.S. patent application Ser. No. 11/732,952). In that method, the multi-arm polyether is reacted with thionyl chloride to convert the hydroxyl groups to chlorine groups, which are then converted to amines by reaction with aqueous or anhydrous ammonia. Other methods that may used for preparing multi-arm polyether amines are described by Merrill et al. in U.S. Pat. No. 5,830,986, and by Chang et al. in WO 97/30103.

Additionally, other multi-arm amines, such as amino-terminated dendritic polyamidoamines, sold under the trade name Starburst®Dendrimers (available from Sigma-Aldrich, St Louis, Mo.), may be used as water-dispersible polymers having three or more nucleophilic groups.

Linear or Branched Polyethers Derivatized with Thiol Groups:

The linear and branched polyethers described above may also be derivatized with thiol groups using methods known in the art involving conversion of the polyether hydroxy ends to toluenesulfonate ends and reaction with sodium hydrosulfide to give thiol ends (see for example, Harris et al, *ACS Polymer Preprints* 32:154, (1991)), Preferably, the thiol derivatives have an equivalent weight per thiol group of about 100 Daltons to about 2,000 Daltons.

In one embodiment, the water dispersible polymer having 3 or more nucleophilic groups is a multi-arm polyether thiol. The multi-arm polyether amines are water-dispersible polyethers having the repeat unit [—O—R]—, wherein R is an hydrocarbylene group having 2 to 5 carbon atoms. The term "hydrocarbylene group" refers to a divalent group formed by removing two hydrogen atoms, one from each of two different carbon atoms, from a hydrocarbon. The multi-arm polyether thiols of the invention include, but are not limited to, dendritic, comb, and star polyethers wherein at least three of the arms are terminated by a thiol group. The multi-arm polyether thiols have a weight-average molecular weight of about 450 to about 200,000 Daltons, in addition from about 2,000 to about 40,000 Daltons. The multi-arm polyether thiols may be prepared from multi-arm polyether polyols using the methods described above.

Linear or Branched Polyethers Derivatized with Carboxyhydrazide Groups:

The linear and branched polyethers described above may also be derivatized with carboxyhydrazide groups using methods known in the art involving conversion of the polyether hydroxy ends to ethyl acetourethane ends via reaction with ethyl isocyanatoacetate followed by reaction with hydrazine to give carboxyhydrazide ends (see for example, *Poly(Ethylene Glycol): Chemistry and Biological Applications*, J. Milton Harris et al, Eds., ACS Symposium Series 680, NY, 1997, Chapter 21), Preferably, the carboxyhydrazide derivatives have an equivalent weight per carboxyhydrazide group of about 100 Daltons to about 2,000 Daltons.

In one embodiment, the water dispersible polymer having 3 or more nucleophilic groups is a multi-arm polyether carboxyhydrazide. The multi-arm polyether carboxyhydrazides are water-dispersible polyethers having the repeat unit [—O—R]—, wherein R is a hydrocarbylene group having 2 to 5 carbon atoms. The term "hydrocarbylene group" refers to a divalent group formed by removing two hydrogen atoms, one from each of two different carbon atoms, from a hydrocarbon. The multi-arm polyether carboxyhydrazides of the invention include, but are not limited to, dendritic, comb, and star polyethers wherein at least three of the arms are terminated by a carboxyhydrazide group. The multi-arm polyether carboxyhydrazides have a weight-average molecular weight of about 450 to about 200,000 Daltons, in addition from about 2,000 to about 40,000 Daltons. The multi-arm polyether carboxyhydrazides may be prepared from multi-arm polyether polyols using the methods described above.

Preparation of Hydrogels

To prepare the hydrogels disclosed herein, the reactants are typically used in the form of aqueous solutions or dispersions which are mixed together to form the hydrogel; however, the reactants need not be used in the form of aqueous solutions or dispersions. The presence of water is optional. For example, some of the reactants are liquids, which may be used neat. Additionally, one or more of the reactants may be used in dry form in the presence of water or an aqueous body fluid, as described by Sawney et al. (U.S. Pat. No. 6,703,047) and Odermatt et al. (U.S. Patent Application Publication No. 2006/0134185), both of which are incorporated herein by reference.

In one embodiment, the reactants are used in the form of aqueous solutions or dispersions. One aqueous solution or dispersion, referred to herein as the "first aqueous solution or dispersion", comprises at least one branched end reactant of formula (1) or (2). A second solution or dispersion, referred to herein as the "second aqueous solution or dispersion", comprises at least one water-dispersible polymer having 3 or more electrophilic or nucleophilic groups that are capable of reacting with the functional groups on the branched end reactant in the first aqueous solution or dispersion. The water-dispersible polymer having 3 or more electrophilic or nucleophilic groups in the second aqueous solution or dispersion may also be a branched end reactant.

In one embodiment wherein the first aqueous solution or dispersion comprises at least one branched end reactant comprising nucleophilic groups, such as $NH_2$, $SH$, or $CONHNH_2$, the second aqueous solution or dispersion comprises a water-dispersible polymer having 3 or more electrophilic groups, for example, oxidized polysaccharides containing aldehyde groups, such as oxidized dextran; poly(vinyl alcohol) or poly (vinyl alcohol) copolymers derivatized with acetoacetate groups, linear or branched polyethers derivatized with acetoacetate groups; linear or branched polyethers derivatized with aldehyde groups; or linear or branched polyethers derivatized with N-hydroxysuccinimidyl ester groups.

In another embodiment wherein the first aqueous solution or dispersion comprises at least one branched end reactant comprising electrophilic groups, such as acetoacetate or $COR_1$ groups, wherein $R_1$ is OH or N-hydroxysuccinimidyl, the second aqueous solution or dispersion comprises at least one water-dispersible polymer having 3 or more nucleophilic groups, such linear or branched poly(ethers) derivatized with amine groups, linear or branched poly(ethers) derivatized with thiol groups, or linear or branched poly(ethers) derivatized with N-hydroxysuccinimidyl ester groups.

In another embodiment wherein the branched end reactant comprises thiol functional groups (i.e., Y=SH) and the water dispersible polymer in the second aqueous solution or dispersion is a water dispersible polymer having 3 or more thiol groups, at least one of the first or second aqueous solution or dispersion further comprises an oxidizer, such as dilute hydrogen peroxide, which is capable of oxidizing the thiol groups to disulfide groups to form intermolecular disulfide bonds.

In another embodiment wherein the branched end reactant comprises $COR_1$ functional groups wherein $R_1$ is OH (i.e., carboxylic acid groups), the functional groups are activated with a water-soluble carbodiimide to enable reaction with the nucleophilic groups. Suitable water-soluble carbodiimide reagents, such as of 1-ethyl-3-(3-dimethylaminopropyl)carbodiimide, 1-[3-(dimethylamino)propyl]-3-ethylcarbodiimide methiodide, and 1-cyclohexyl-3-(2-morpholinoethyl)carbodiimide metho-p-toluenesulfonate, are well known in the art and are available from commercial sources such as Sigma-Aldrich (St Louis, Mo.) and Advanced ChemTech Inc. (Louisville, Ky.). Generally, carbodiimides are not stable in aqueous solution because they are subject to hydrolysis. Therefore, they are provided in dry form (i.e., undissolved) and may be hydrated at the time of use by adding water. Preferably, distilled or deionized water is used. The concentration of water-soluble carbodiimide in the resulting aqueous solution is from about 5% to about 50% by weight relative to the total weight of the solution.

In one embodiment, the first aqueous solution or dispersion comprises at least one linear poly(ethylene glycol) tetraamine according to formula (1), wherein PS is derived from polyethylene oxide, X is $NHCH_2CH_2N$, R is $CH_2CH_2$, Y is $NH_2$, and z=2, and the second aqueous solution or dispersion comprises an oxidized dextran containing aldehyde groups.

In another embodiment, the first aqueous solution or dispersion comprises at least one linear poly(ethylene glycol) tetraamine according to formula (1), wherein PS is derived from polyethylene oxide, X is $NHCH_2CH_2CH_2N$, R is $CH_2CH_2CH_2$, Y is $NH_2$, and z=2, and the second aqueous solution or dispersion comprises an oxidized dextran containing aldehyde groups.

In another embodiment, the first aqueous solution or dispersion comprises at least one 8-arm poly(ethylene glycol) hexadecaamine according to formula (2) wherein Q is hexaglycerol with the hydrogens removed from 8 of its OH groups, PA is derived from polyethylene oxide, X is $NHCH_2CH_2N$, R is $CH_2CH_2$, Y is $NH_2$, z=2, and m=8, and the second aqueous solution or dispersion comprises an oxidized dextran containing aldehyde groups.

In another embodiment, the first aqueous solution or dispersion comprises at least one 8-arm poly(ethylene glycol) hexadecaamine according to formula (2) wherein Q is hexaglycerol with the hydrogens removed from 8 of its OH groups, PA is derived from polyethylene oxide, X is $NHCH_2CH_2CH_2N$, R is $CH_2CH_2CH_2$, Y is $NH_2$, z=2, and m=8, and the second aqueous solution or dispersion comprises an oxidized dextran containing aldehyde groups.

In another embodiment, the first aqueous solution or dispersion comprises at least one 4-arm PEG octaamine according to formula (2), wherein Q is pentaerythritol with the hydrogens removed from 4 of its OH groups, PA is derived from polyethylene oxide, X is $NHCH_2CH_2N$, R is $CH_2CH_2$, $Y=NH_2$, z=2, and m=4, and the second aqueous solution or dispersion comprises an oxidized dextran containing aldehyde groups.

In another embodiment, the first aqueous solution or dispersion comprises at least one 4-arm PEG octaamine according to formula (2), wherein Q is pentaerythritol with the hydrogens removed from 4 of its OH groups, PA is derived from polyethylene oxide, X is $NHCH_2CH_2CH_2N$, R is $CH_2CH_2CH_2$, $Y=NH_2$, z=2, and m=4, and the second aqueous solution or dispersion comprises an oxidized dextran containing aldehyde groups.

In another embodiment, the first aqueous solution or dispersion comprises at least one 6-arm poly(ethyleneglycol) dodecaamine according to formula (2), wherein Q is tetraglycerol with the hydrogens removed from 6 of its OH groups, PA is derived from polyethylene oxide, X is $NHCH_2CH_2N$, R is $CH_2CH_2$, Y is $NH_2$, z=2, and m=6, and the second aqueous solution or dispersion comprises an oxidized dextran containing aldehyde groups.

In another embodiment, the first aqueous solution or dispersion comprises at least one 6-arm poly(ethyleneglycol) dodecaamine according to formula (2), wherein Q is tetraglycerol with the hydrogens removed from 6 of its OH groups, PA is derived from polyethylene oxide, X is $NHCH_2CH_2CH_2N$, R is $CH_2CH_2CH_2$, Y is $NH_2$, z=2, and m=6, and the second aqueous solution or dispersion comprises an oxidized dextran containing aldehyde groups.

In another embodiment, the first aqueous solution or dispersion comprises at least one 4-arm ethylenediamine poly(ethylene oxide-propylene oxide) octaamine according to formula (2), wherein Q is $NCH_2CH_2N$, PA is derived from poly(ethylene oxide-propylene oxide), X is $NHCH_2CH_2N$, R is $CH_2CH_2$, Y is $NH_2$, z=2, and m=4, and the second aqueous solution or dispersion comprises an oxidized dextran containing aldehyde groups.

In another embodiment, the first aqueous solution or dispersion comprises at least one 4-arm ethylenediamine poly(ethylene oxide-propylene oxide) octaamine according to formula (2), wherein Q is $NCH_2CH_2N$, PA is derived from poly(ethylene oxide-propylene oxide), X is $NHCH_2CH_2CH_2N$, R is $CH_2CH_2CH_2$, Y is $NH_2$, z=2, and m=4, and the second aqueous solution or dispersion comprises an oxidized dextran containing aldehyde groups.

In another embodiment, the first aqueous solution or dispersion comprises at least one compound of formula (1) or (2) and the second aqueous solution or dispersion comprises at least one compound of formula (1) or (2) having a functional group Y that is the same as or different from, but capable of reacting with the functional group Y of the compound of formula (1) or (2) in the first aqueous solution or dispersion.

To prepare the first aqueous solution or dispersion, the at least one branched end reactant is added to water to give a concentration of about 5% to about 70% by weight, in addition from about 15% to about 35% by weight relative to the total weight of the solution or dispersion. The optimal concentration to be used depends on the application and on the concentration of the second reactant used. A mixture of two or more branched end reactants may also be used in the first aqueous solution or dispersion. If a mixture is used, the total concentration of branched end reactants in the solution or dispersion is from about 5% to about 70% by weight, in addition from about 15% to about 35% by weight relative to the total weight of the solution or dispersion.

The mechanical properties of the hydrogel depend on a number of factors. For example, the stoichiometry of the reactive groups affects the crosslink density. The highest crosslink density is obtained with a ratio of complementary reactive groups of about 1:1. For most applications, the ratio of reactive groups will be from about 1:10 to about 10:1. The mechanical properties are also determined by the length of the polymer segment or polymer arm, the nature of the polymer segment or polymer arm (e.g., hydrophilic or hydrophobic), the hydrolytic stability of the bond formed between the reactive groups, and the initial level of water. These variables may be adjusted to fine-tune the properties of the hydrogel for particular applications.

For use on living tissue, it is preferred that the first aqueous solution or dispersion be sterilized to prevent infection. Any suitable sterilization method known in the art that does not degrade the branched end reactant may be used, including, but not limited to, electron beam irradiation, gamma irradiation, steam sterilization, or ultra-filtration through a 0.2 μm pore membrane.

The first aqueous solution or dispersion may further comprise various additives depending on the intended application. Preferably, the additive is compatible with the branched end reactant. Specifically, the additive does not contain any functional groups that would interfere with effective gelation of the hydrogel. The amount of the additive used depends on the particular application and may be readily determined by one skilled in the art using routine experimentation. For example, the first aqueous solution or dispersion may comprise at least one additive selected from pH modifiers, viscosity modifiers, antimicrobials, colorants, healing promoters, surfactants, anti-inflammatory agents, thrombogenic agents, and radio-opaque compounds.

The first aqueous solution or dispersion may optionally include at least one pH modifier to adjust the pH of the solution or dispersion. Suitable pH modifiers are well known in the art. The pH modifier may be an acidic or basic compound. Examples of acidic pH modifiers include, but are not limited to, carboxylic acids, inorganic acids, and sulfonic acids. Examples of basic pH modifiers include, but are not limited to, hydroxides, alkoxides, nitrogen-containing compounds other than primary and secondary amines, and basic carbonates and phosphates.

The first aqueous solution or dispersion may optionally include at least one thickener. The thickener may be selected from among known viscosity modifiers, including, but not limited to, polysaccharides and derivatives thereof, such as starch or hydroxyethyl cellulose.

The first aqueous solution or dispersion may optionally include at least one antimicrobial agent. Suitable antimicrobial preservatives are well known in the art. Examples of suitable antimicrobials include, but are not limited to, alkyl parabens, such as methylparaben, ethylparaben, propylparaben, and butylparaben; triclosan; chlorhexidine; cresol; chlorocresol; hydroquinone; sodium benzoate; and potassium benzoate. In one embodiment, the antimicrobial is triclosan.

The first aqueous solution or dispersion may also optionally include at least one colorant to enhance the visibility of the solution or dispersion. Suitable colorants include dyes, pigments, and natural coloring agents. Examples of suitable colorants include, but are not limited to, FD&C and D&C colorants, such as FD&C Violet No. 2, D&C Green No. 6, D&C Green No. 5, D&C Violet No. 2; and natural colorants such as beetroot red, canthaxanthin, chlorophyll, eosin, saffron, and carmine.

The first aqueous solution or dispersion may also optionally include at least one surfactant. Surfactant, as used herein, refers to a compound that lowers the surface tension of water. The surfactant may be an ionic surfactant, such as sodium lauryl sulfate, or a neutral surfactant, such as polyoxyethylene ethers, polyoxyethylene esters, and polyoxyethylene sorbitan.

Additionally, the first aqueous solution or dispersion may optionally include anti-inflammatory agents, such as indomethacin, salicylic acid acetate, ibuprofen, sulindac, piroxicam, and naproxen; thrombogenic agents, such as thrombin, fibrinogen, homocysteine, and estramustine; and radio-opaque compounds, such as barium sulfate and gold particles. Additionally, the first aqueous solution or dispersion may comprise a healing promoter, such as chitosan.

Additionally, where the first aqueous solution or dispersion comprises a branched end reactant having multiple nucleophilic groups (i.e., Y is $NH_2$, SH or $CONHNH_2$), the solution or dispersion may further comprise at least one multi-functional amine having one or more primary amine groups to provide other beneficial properties to the hydrogel (e.g., hydrophobicity, elasticity, adhesive strength, and the like). The multi-functional amine may be a water-dispersible multi-arm polyether amine (described above) or another type of multi-functional amine, including, but not limited to, linear and branched diamines, such as diaminoalkanes, polyaminoalkanes, and spermine; branched polyamines, such as polyethylenimine; cyclic diamines, such as N,N'-bis(3-aminopropyl)piperazine, 5-amino-1,3,3-trimethylcyclohexanemethylamine, 1,3-bis(aminomethyl)cyclohexane, 1,4-diaminocyclohexane, and p-xylylenediamine; aminoalkyltrialkoxysilanes, such as 3-aminopropyltrimethoxysilane and 3-aminopropyltriethoxysilane; aminoalkyldialkoxyalkylsilanes, such as 3-aminopropyldiethoxymethylsilane, dihydrazides, such as adipic dihydrazide; linear polymeric diamines, such as linear polyethylenimine, α,ω-amino-terminated polyethers, α,ω-bis(3-aminopropyl)polybutanediol, β,(ω-1)-amino-terminated polyethers (linear Jeffamines®); comb polyamines, such as chitosan, polyallylamine, and polylysine, and di- and polyhydrazides, such as bis(carboxyhydrazido)polyethers and poly(carboxyhydrazido) star polyethers. Many of these compounds are commercially available from companies such as Sigma-Aldrich and Huntsman LLC. Typically, if present, the multi-functional amine is used at a concentration of about 5% by weight to about 1000% by weight relative to the weight of the branched end reactant having nucleophilic groups in the aqueous solution or dispersion.

In one specific embodiment, the first aqueous solution or dispersion comprises an 8-arm poly(ethylene glycol) hexadecaamine according to formula (2) having a weight-average molecular weight of about 10,000, wherein Q is hexaglycerol with the hydrogens removed from 8 of its OH groups, PA is derived from polyethylene oxide, X is $NHCH_2CH_2N$, R is $CH_2CH_2$, Y is $NH_2$, z=2, and m=8, and an 8-arm polyethylene glycol having eight arms terminated by a primary amine group and having a weight-average molecular weight of about 10,000 Daltons.

In another specific embodiment, the first aqueous solution or dispersion comprises an 8-arm poly(ethylene glycol) hexadecaamine according to formula (2) having a weight-average molecular weight of about 10,000 Daltons, wherein Q is hexaglycerol with the hydrogens removed from 8 of its OH groups, PA is derived from polyethylene oxide, X is $NHCH_2CH_2CH_2N$, R is $CH_2CH_2CH_2$, Y is $NH_2$, z=2, and m=8, and an 8-arm polyethylene glycol having eight arms terminated by a primary amine group and having a weight-average molecular weight of about 10,000 Daltons.

In another specific embodiment, the first aqueous solution or dispersion comprises an 8-arm poly(ethylene glycol) hexadecaamine according to formula (2) having a weight-average molecular weight of about 10,000 Daltons, wherein Q is hexaglycerol with the hydrogens removed from 8 of its OH groups, PA is derived from polyethylene oxide, X is $NHCH_2CH_2N$, R is $CH_2CH_2$, Y is $NH_2$, z=2, and m=8, and a 4-arm polyethylene glycol having four arms terminated by a primary amine group and having a weight-average molecular weight of about 2,000 Daltons.

In another specific embodiment, the first aqueous solution or dispersion comprises an 8-arm poly(ethylene glycol) hexadecaamine according to formula (2) having a weight-average molecular weight of about 10,000 Daltons, wherein Q is hexaglycerol with the hydrogens removed from 8 of its OH groups, PA is derived from polyethylene oxide, X is NHCH$_2$CH$_2$CH$_2$N, R is CH$_2$CH$_2$CH$_2$, Y is NH$_2$, z=2, and m=8, and a 4-arm polyethylene glycol having four arms terminated by a primary amine group and having a weight-average molecular weight of about 2,000 Daltons.

In another specific embodiment, the first aqueous solution or dispersion comprises an 8-arm poly(ethylene glycol) hexadecaamine according to formula (2) having a weight-average molecular weight of about 40,000 Daltons, wherein Q is hexaglycerol with the hydrogens removed from 8 of its OH groups, PA is derived from polyethylene oxide, X is NHCH$_2$CH$_2$N, R is CH$_2$CH$_2$, Y is NH$_2$, z=2, and m=8, and a 4-arm polyethylene glycol having four arms terminated by a primary amine group and having a weight-average molecular weight of about 2,000 Daltons.

In another specific embodiment, the first aqueous solution or dispersion comprises an 8-arm poly(ethylene glycol) hexadecaamine according to formula (2) having a weight-average molecular weight of about 40,000 Daltons, wherein Q is hexaglycerol with the hydrogens removed from 8 of its OH groups, PA is derived from polyethylene oxide, X is NHCH$_2$CH$_2$N, R is CH$_2$CH$_2$CH$_2$, Y is NH$_2$, z=2, and m=8, and a 4-arm polyethylene glycol having four arms terminated by a primary amine group and having a weight-average molecular weight of about 2,000 Daltons.

In another specific embodiment, the first aqueous solution or dispersion comprises an 8-arm poly(ethylene glycol) hexadecaamine according to formula (2) having a weight-average molecular weight of about 40,000 Daltons, wherein Q is hexaglycerol with the hydrogens removed from 8 of its OH groups, PA is derived from polyethylene oxide, X is NHCH$_2$CH$_2$N, R is CH$_2$CH$_2$, Y is NH$_2$, z=2, and m=8, and an 8-arm polyethylene glycol having eight arms terminated by a primary amine group and having a weight-average molecular weight of about 10,000 Daltons.

In another specific embodiment, the first aqueous solution or dispersion comprises an 8-arm poly(ethylene glycol) hexadecaamine according to formula (2) having a weight-average molecular weight of about 40,000 Daltons, wherein Q is hexaglycerol with the hydrogens removed from 8 of its OH groups, PA is derived from polyethylene oxide, X is NHCH$_2$CH$_2$N, R is CH$_2$CH$_2$CH$_2$, Y is NH$_2$, z=2, and m=8, and an 8-arm polyethylene glycol having eight arms terminated by a primary amine group and having a weight-average molecular weight of about 10,000 Daltons.

In another embodiment, the multi-functional amine is provided in a separate solution or dispersion, referred to herein as "the third solution or dispersion", at a concentration of about 5% by weight to about 100% by weight relative to the total weight of the solution or dispersion. If the multi-functional amine is not used neat (i.e., 100% by weight), it may be used in the form of an aqueous solution or dispersion. For use on living tissue, it is preferred that the solution or dispersion comprising the multi-functional amine be sterilized. Any of the methods described above for sterilizing the first aqueous solution or dispersion may be used.

In one specific embodiment, the first aqueous solution or dispersion comprises an 8-arm poly(ethylene glycol) hexadecaamine according to formula (2) having a weight-average molecular weight of about 10,000, wherein Q is hexaglycerol with the hydrogens removed from 8 of its OH groups, PA is derived from polyethylene oxide, X is NHCH$_2$CH$_2$N, R is CH$_2$CH$_2$, Y is NH$_2$, z=2, and m=8, and the third solution or dispersion comprises an 8-arm polyethylene glycol having eight arms terminated by a primary amine group and having a weight-average molecular weight of about 10,000 Daltons.

In another specific embodiment, the first aqueous solution or dispersion comprises an 8-arm poly(ethylene glycol) hexadecaamine according to formula (2) having a weight-average molecular weight of about 10,000, wherein Q is hexaglycerol with the hydrogens removed from 8 of its OH groups, PA is derived from polyethylene oxide, X is NHCH$_2$CH$_2$CH$_2$N, R is CH$_2$CH$_2$CH$_2$, Y is NH$_2$, z=2, and m=8, and the third solution or dispersion comprises an 8-arm polyethylene glycol having eight arms terminated by a primary amine group and having a weight-average molecular weight of about 10,000 Daltons.

In another specific embodiment, the first aqueous solution or dispersion comprises an 8-arm poly(ethylene glycol) hexadecaamine according to formula (2) having a weight-average molecular weight of about 10,000 Daltons, wherein Q is hexaglycerol with the hydrogens removed from 8 of its OH groups, PA is derived from polyethylene oxide, X is NHCH$_2$CH$_2$N, R is CH$_2$CH$_2$, Y is NH$_2$, z=2, and m=8, and the third solution or dispersion comprises a 4-arm polyethylene glycol having four arms terminated by a primary amine group and having a weight-average molecular weight of about 2,000 Daltons.

In another specific embodiment, the first aqueous solution or dispersion comprises an 8-arm poly(ethylene glycol) hexadecaamine according to formula (2) having a weight-average molecular weight of about 10,000 Daltons, wherein Q is hexaglycerol with the hydrogens removed from 8 of its OH groups, PA is derived from polyethylene oxide, X is NHCH$_2$CH$_2$CH$_2$N, R is CH$_2$CH$_2$CH$_2$, Y is NH$_2$, z=2, and m=8, and the third solution or dispersion comprises a 4-arm polyethylene glycol having four arms terminated by a primary amine group and having a weight-average molecular weight of about 2,000 Daltons.

In another specific embodiment, the first aqueous solution or dispersion comprises an 8-arm poly(ethylene glycol) hexadecaamine according to formula (2) having a weight-average molecular weight of about 40,000 Daltons, wherein Q is hexaglycerol with the hydrogens removed from 8 of its OH groups, PA is derived from polyethylene oxide, X is NHCH$_2$CH$_2$N, R is CH$_2$CH$_2$, Y is NH$_2$, z=2, and m=8, and the third solution or dispersion comprises a 4-arm polyethylene glycol having four arms terminated by a primary amine group and having a weight-average molecular weight of about 2,000 Daltons.

In another specific embodiment, the first aqueous solution or dispersion comprises an 8-arm poly(ethylene glycol) hexadecaamine according to formula (2) having a weight-average molecular weight of about 40,000 Daltons, wherein Q is hexaglycerol with the hydrogens removed from 8 of its OH groups, PA is derived from polyethylene oxide, X is NHCH$_2$CH$_2$N, R is CH$_2$CH$_2$CH$_2$, Y is NH$_2$, z=2, and m=8, and the third solution or dispersion comprises a 4-arm polyethylene glycol having four arms terminated by a primary amine group and having a weight-average molecular weight of about 2,000 Daltons.

In another specific embodiment, the first aqueous solution or dispersion comprises an 8-arm poly(ethylene glycol) hexadecaamine according to formula (2) having a weight-average molecular weight of about 40,000 Daltons, wherein Q is hexaglycerol with the hydrogens removed from 8 of its OH groups, PA is derived from polyethylene oxide, X is NHCH$_2$CH$_2$N, R is CH$_2$CH$_2$, Y is NH$_2$, z=2, and m=8, and the third solution or dispersion comprises an 8-arm polyethylene glycol having eight arms terminated by a primary amine group and having a weight-average molecular weight of about 10,000 Daltons.

In another specific embodiment, the first aqueous solution or dispersion comprises an 8-arm poly(ethylene glycol) hexadecaamine according to formula (2) having a weight-average molecular weight of about 40,000 Daltons, wherein Q is hexaglycerol with the hydrogens removed from 8 of its OH groups, PA is derived from polyethylene oxide, X is $NHCH_2CH_2CH_2N$, R is $CH_2CH_2CH_2$, Y is $NH_2$, z=2, and m=8, and the third solution or dispersion comprises an 8-arm polyethylene glycol having eight arms terminated by a primary amine group and having a weight-average molecular weight of about 10,000 Daltons.

The aqueous solution or dispersion comprising the multifunctional amine may further comprise various additives. Any of the additives described above for the first aqueous solution or dispersion may be used.

The second aqueous solution or dispersion comprising at least one water-dispersible polymer having 3 or more electrophilic or nucleophilic groups is prepared by adding the water-dispersible polymer to water to give a concentration of about 5% to about 70% by weight, in addition from about 15% to about 35% by weight relative to the total weight of the solution or dispersion. The optimal concentration to be used depends on the application and on the concentration of the branched end reactant used in the first aqueous solution or dispersion, as described above, and can be readily determined by one skilled in the art using routine experimentation. Additionally, the second aqueous solution or dispersion may comprise a mixture of at least two different water-dispersible polymers having 3 or more electrophilic or nucleophilic groups to provide beneficial properties to the hydrogel (e.g., adhesive strength). For example, a mixture of at least two oxidized dextrans, also referred to herein as dextran aldehydes, having different weight-average molecular weights, different degrees of oxidation, or different weight-average molecular weights and different degrees of oxidation may be used. Specifically, an oxidized dextran having a weight-average molecular weight of about 10,000 and a degree of oxidation of about 50% may be used in combination with an oxidized dextran having a weight-average molecular weight of about 60,000 and a degree of oxidation of about 20%, as described in Examples 35 and 36 herein. If a mixture of water dispersible polymers is used in the second aqueous solution or dispersion, the total concentration of the water dispersible polymers is about 5% to about 70% by weight, in addition from about 15% to about 35% by weight relative to the total weight of the solution or dispersion.

For use on living tissue, it is preferred that the second aqueous solution or dispersion be sterilized to prevent infection. Any of the methods described above for sterilizing the first aqueous solution or dispersion may be used.

The second aqueous solution or dispersion may further comprise various additives depending on the intended application. Preferably, the additive is compatible with the water-dispersible polymer used. Specifically, the additive does not contain reactive groups that would interfere with effective gelation of the hydrogel. For example, the second aqueous solution or dispersion may comprise at least one additive selected from pH modifiers, viscosity modifiers, antimicrobials, colorants, healing promoters, surfactants, anti-inflammatory agents, thrombogenic agents, and radio-opaque compounds, as described above for the first aqueous solution or dispersion.

Additionally, where the water-dispersible polymer in the second aqueous solution or dispersion comprises 3 or more nucleophilic groups, the solution or dispersion may optionally comprise at least one multi-functional amine having one or more primary amine groups, as described above, to provide other beneficial properties to the hydrogel (e.g., hydrophobicity, elasticity, adhesive strength, and the like). Typically, if present, the multi-functional amine is used at a concentration of about 5% to about 1000% by weight relative to the amount of the at least one water dispersible polymer having 3 or more nucleophilic groups in the solution or dispersion. In one embodiment, the multi-functional amine is a multi-arm polyether amine, as described above.

In one embodiment, the invention provides a kit comprising at least one branched end reactant of formula (1) or (2) and at least one water-dispersible polymer having 3 or more electrophilic or nucleophilic groups that are capable of reacting with the functional groups on the branched end reactant.

In one embodiment, the reactants in the kit are provided in the form of aqueous solutions or dispersions. Specifically, the kit comprises a first aqueous solution or dispersion comprising at least one branched end reactant of formula (1) or (2) and a second aqueous solution or dispersion comprising at least one water-dispersible polymer having 3 or more electrophilic or nucleophilic groups that are capable of reacting with the functional groups on the branched end reactant in the first aqueous solution or dispersion. Where the first aqueous solution or dispersion comprises at least one branched end reactant comprising nucleophilic groups, such as $NH_2$, SH, or $CONHNH_2$, the second aqueous solution or dispersion comprises a water-dispersible polymer having 3 or more electrophilic groups, for example, oxidized polysaccharides containing aldehyde groups, such as oxidized dextran; poly(vinyl alcohol) or poly(vinyl alcohol) copolymers derivatized with acetoacetate groups, linear or branched polyethers derivatized with acetoacetate groups; or linear or branched polyethers derivatized with aldehyde groups. Where the first aqueous solution or dispersion comprises at least one branched end reactant comprising electrophilic groups, such as acetoacetate, $COR_1$ groups, wherein $R_1$ is OH or N-hydroxysuccinimidyl, the second aqueous solution or dispersion comprises a least one water-dispersible polymer having 3 or more nucleophilic groups, such as multi-arm polyether amines. Where the branched end reactant comprises $COR_1$ functional groups wherein $R_1$ is OH (i.e., carboxylic acid groups), the kit optionally further comprises an undissolved water-soluble carbodiimide and a vessel, the contents of which comprise water to hydrate the carbodiimide. Each of the aqueous solutions or dispersions may be contained in any suitable vessel, such as a vial or a syringe barrel.

In another embodiment, the invention provides a kit comprising a first aqueous solution or dispersion comprising at least one branched end reactant of formula (1) or (2), a second aqueous solution or dispersion comprising at least one water-dispersible polymer having 3 or more electrophilic or nucleophilic groups that are capable of reacting with the functional groups on the branched end reactant in the first aqueous solution or dispersion, and a third solution or dispersion comprising a multi-functional amine, as described above. Each of the solutions or dispersions may be contained in any suitable vessel, such as a vial or a syringe barrel.

Method of Application:

The first aqueous solution or dispersion comprising at least one branched end reactant of formula (1) or (2) and a second aqueous solution or dispersion comprising at least one water-dispersible polymer having 3 or more electrophilic or nucleophilic groups may be applied to an anatomical site on tissue of a living organism in any number of ways. Once both solutions or dispersions are applied to a site, they crosslink to form a hydrogel, a process referred to herein as curing, typically in about 2 seconds to about 2 minutes. Alternatively, the branched end reactant and/or the water-dispersible polymer may be applied to the anatomical site as a neat liquid where the reagent exits as a liquid at room temperature or in dry form in the presence of water or an aqueous body fluid, as described above.

In one embodiment, the two aqueous solutions or dispersions are applied to the site sequentially using any suitable means including, but not limited to, spraying, brushing with a cotton swab or brush, or extrusion using a pipette, or a syringe. The solutions or dispersions may be applied in any order. Then, the solutions or dispersions are mixed on the site using any suitable device, such as a cotton swab, a spatula, or the tip of the pipette or syringe.

In another embodiment, the two aqueous solutions or dispersions are mixed manually before application to the site. The resulting mixture is then applied to the site before it completely cures using a suitable applicator, as described above.

In another embodiment, the two aqueous solutions or dispersions are contained in a double-barrel syringe. In this way the two aqueous solutions or dispersions are applied simultaneously to the site with the syringe. Suitable double-barrel syringe applicators are known in the art. For example, Redl describes several suitable applicators for use in the invention in U.S. Pat. No. 6,620,125, (particularly FIGS. 1, 5, and 6, which are described in Columns 4, line 10 through column 6, line 47) which is incorporated herein by reference. Additionally, the double barrel syringe may contain a motionless mixer, such as that available from ConProtec, Inc. (Salem, N.H.) or Mixpac Systems AG (Rotkreuz, Switzerland), at the tip to effect mixing of the two aqueous solutions or dispersions prior to application.

In another embodiment wherein the optional third solution or dispersion comprising a multi-functional amine is used, the three solutions or dispersions are applied to the anatomical site in any order using any of the methods described above. In this embodiment, the double-barrel syringe may be modified to have three barrels, one for each of the or dispersions.

In another embodiment, the hydrogel tissue adhesive of the invention is used to bond at least two anatomical sites together. In this embodiment, the first aqueous solution or dispersion is applied to at least one anatomical site, and the second aqueous solution or dispersion is applied to at least one of either the same site or one other site. The two or more sites are contacted and held together manually or using some other means, such as a surgical clamp, for a time sufficient for the mixture to cure, typically from about 2 seconds to about 2 minutes. Alternatively, a mixture of the two aqueous solutions or dispersions either premixed manually or using a double-barrel syringe applicator, is applied to at least one of the anatomical sites to be bonded. The two or more sites are contacted and held together manually or using some other means, such as a surgical clamp, for a time sufficient for the mixture to cure.

In another embodiment wherein the optional third solution or dispersion comprising a multi-functional amine is used along with the first aqueous solution or dispersion and the second aqueous solution or dispersion to bond at least two anatomical sites together, each of the three solutions or dispersions is applied to at least one anatomical site in any order. The solutions or dispersions may be applied to the same site or to different sites. Alternatively, the three solutions or dispersions are premixed using any of the methods described above, and the resulting mixture is applied to at least one of the anatomical sites to be bonded before the mixture completely cures. The two or more sites are then contacted and held together manually or using some other means, such as a surgical clamp, for a time sufficient for the mixture to cure.

Medical and Veterinary Applications:

The hydrogel tissue adhesive of the invention has many potential medical and veterinary applications, including, but not limited to, wound closure, supplementing or replacing sutures or staples in internal surgical procedures such as intestinal anastomosis and vascular anastomosis, ophthalmic procedures, drug delivery, anti-adhesive applications, and as a plug to seal a fistula or the punctum. For these uses, procedures involving the application of the first aqueous solution or dispersion and the second aqueous solution or dispersion, as defined above, are described below. The application of three solutions or dispersions, wherein the third solution or dispersion comprises an additional multi-functional amine, may also be used for these purposes using the procedures described above.

The hydrogel tissue adhesive of the invention may be used for treatment of wounds, including but not limited to, minor cuts, scrapes, irritations, abrasions, lacerations, burns, sores, punctures, and surgical wounds. For wound closure, the first aqueous solution or dispersion and the second aqueous solution or dispersion are applied to the wound using the methods described above, and the mixture is allowed to cure. For example, the hydrogel tissue adhesive of the invention may be used to seal a wound on the skin or a puncture or incision in an organ, such as a lung. Additionally, the hydrogel tissue adhesive of the invention may applied to a punctured blood vessel to achieve hemostasis. Similarly, the hydrogel tissue adhesive of the invention may be used as a dural seal.

Intestinal anastomosis is a surgical procedure that is well known to skilled surgeons. The procedure, which involves joining two segments of the intestine together after a resection, is described by Sweeney et al. (*Surgery* 131:185-189, 2002). The two segments of the intestine are joined together using sutures or staples. A problem encountered with this procedure is leakage around the sutures or staples. Leakage rates of 5-8% have been reported (Bruce et al. *Br. J. Surg.* 88:1157-1168, 2001). The tissue adhesive of the invention may be used to supplement the sutures or staples used in intestinal anastomoses, providing a better seal that reduces leakage. In this application, the first aqueous solution or dispersion and the second aqueous solution or dispersion are applied to the intestine around the sutures or staples, using the methods described above, and the mixture is allowed to cure.

Additionally, the hydrogel tissue adhesive of the invention may be used in vascular anastomosis procedures. This procedure is similar to intestinal anastomosis, described above, and is used for vascular grafts. The two segments of the blood vessel are joined together using sutures or staples. The tissue adhesive of the invention may be used to supplement the sutures or staples, providing a better seal that reduces leakage. In this application, the first aqueous and the second aqueous solution or dispersion are applied to the blood vessel around the sutures or staples, using the methods described above, and the mixture is allowed to cure.

Temporal clear corneal incisions and scleral tunnel incisions are used during cataract surgery. These procedures are well known to the skilled cataract surgeon. Although these incisions can be sealed with sutures, many surgeons prefer sutureless, self-sealing incisions. However, problems arise with leakage through the sutureless incisions, causing endophthalmitis (Sarayba et al. Amer. *J. Opthamol.* 138:206-210, 2004, and Kim et al. *J. Cataract Refract. Surg.* 21:320-325, 1995). The hydrogel tissue adhesive of the invention may be used to seal both clear corneal incisions and scleral tunnel incisions to prevent leakage. In this application, the first aqueous solution or dispersion and the second aqueous solution or dispersion are applied to the site of the incision in the eye, using the methods described above, and the mixture is allowed to cure. Additionally, the two aqueous solutions or dispersions may be coated on the sides of the scalpel blade used to make the incision, one solution or dispersion on each side of the blade, to apply them to the site when the site is ready for closure.

The hydrogel tissue adhesive of the invention may also be used to prevent adhesions between adjacent anatomical sites following surgery or injury to internal organs. The first aqueous solution or dispersion and the second aqueous solution or dispersion are applied to one anatomical site using the methods described above. The first site is prevented from contacting any adjacent site manually or using some other means, such as a surgical clamp, until the mixture cures, typically from about 2 seconds to about 2 minutes. After curing, the hydrogel is no longer adhesive, and serves as a barrier preventing adhesions of adjacent sites.

The hydrogel tissue adhesive of the invention may also be used for drug delivery to a selected anatomical site. In this application, at least one of the aqueous solutions or dispersions further comprises a pharmaceutical drug or therapeutic agent. Suitable pharmaceutical drugs and therapeutic agents are well known in the art. An extensive list is given by Kabonov et al. in U.S. Pat. No. 6,696,089, which is incorporated herein by reference (in particular, columns 16 to 18). Examples include, but are not limited to, antibacterial agents, antiviral agents, antifungal agents, anti-cancer agents, vaccines, radiolabels, anti-inflammatories, anti-glaucomic agents, local anesthetics, anti-neoplastic agents, antibodies, hormones, and the like. In this application, the first aqueous solution or dispersion and the second aqueous solution or dispersion, at least one of which further comprises the pharmaceutical drug or therapeutic agent of interest, are applied to the desired anatomical site using the methods described above. After the hydrogel cures, the drug or therapeutic agent is released to the desired anatomical site. The rate of release depends on the crosslink density of the hydrogel, which can be controlled by the extent of crosslinking, which in turn is determined by the concentrations of the reactants used, as well as the relative levels of functional groups present on these respective reactants. The concentration of reagents needed to obtain the proper rate of drug release for any particular application can be readily determined by one skilled in the art using routine experimentation.

The hydrogel tissue adhesive of the invention may also be used as a plug to seal a fistula in a tissue. In this application, the first aqueous solution or dispersion and the second aqueous solution or dispersion are applied to the cavity using the methods described above, preferably using a double barrel syringe, and the mixture is allowed to cure. Additionally, the hydrogel tissue adhesive of the invention may also be used as plug to occlude the punctum (i.e., tear drainage duct) for the treatment of dry eye syndrome. Dry eye syndrome results from an inflammation of the lacrimal gland and the surface of the eye. The result is reduced tear production or excessive tear drainage. One treatment is to occlude the punctum in order to conserve tears. To seal the punctum, the first aqueous solution or dispersion and the second aqueous solution or dispersion are injected into the punctum by a skilled surgeon using a double barrel syringe fitted with a fine needle.

Additionally, the hydrogel tissue adhesive of the invention may be useful for other medical applications. These applications include, but are not limited to, an adhesive to hold an implant in place, an adhesive used on tissue to block air, moisture, fluid or microbial migration, and an adhesive to replace or supplement sutures or staples in other surgical procedures, such as cholecystectomy, ostomy port, appendectomy, bariatrics, retinal reattachment, Cesarean closure, abdominal hysterectomy, and the closure of trauma punctures, and ruptured membranes.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

The meaning of abbreviations used is as follows: the designation "10K" means that a polymer molecule possesses a weight-average molecular weight of 10 kiloDaltons, a designation of "60K" indicates a weight-average molecular weight of 60 kiloDaltons, etc, "min" means minute(s), "h" means hour(s), "sec" means second(s), "d" means day(s), "mL" means milliliter(s), "L" means liter(s), "µL" means microliter(s), "cm" means centimeter(s), "mm" means millimeter(s), "µm" means micrometer(s), "mol" means mole(s), "mmol" means millimole(s), "g" means gram(s), "mg" means milligram(s), "meq" means milliequivalent(s), "EW" means equivalent weight, "$M_w$" means weight-average molecular weight, "$M_n$" means number-average molecular weight, "wt %" means percent by weight, "mol %" means mole percent, "Vol" means volume, "v/v" means volume per volume, "EO" means ethylene oxide, "PO" means propylene oxide, "PEG" means polyethylene glycol, "Da" means Daltons, "kDa" means kiloDaltons, "MWCO" means molecular weight cut-off, "kPa" means kilopascals, "$^1$H NMR" means proton nuclear magnetic resonance spectroscopy, "ppm" means parts per million, "D" means density in g/mL, "PBS" means phosphate-buffered saline, "psi" means pounds per square inch, and "psig" means pounds per square inch gauge.

A reference to "Aldrich" or a reference to "Sigma" means the said chemical or ingredient was obtained from Sigma-Aldrich, St. Louis, Mo. A reference to "Shearwater" or "Nektar" means the said chemical or ingredient was obtained from Nektar, Huntsville, Ala. A reference to "SunBio" means the said chemical or ingredient was obtained from SunBio Inc., Anyang City, S. Korea. A reference to "NOF" means the said chemical or ingredient was obtained from NOF Corp, Tokyo, Japan. A reference to "TCI America" means the said chemical or ingredient was obtained from TCI America, Portland, Oreg. A reference to "BASF" means the said chemical or ingredient was obtained from BASF Corp, Ludwigshafen, Germany.

General Methods:
Preparation of Oxidized Dextran:

The following procedure was used to prepare an oxidized dextran, also referred to herein as dextran aldehyde, with about 50% aldehyde content conversion from dextran having a weight-average molecular weight of 10,000 Daltons. Other aldehyde conversions were obtained by varying the concentration of the periodate solution used. Likewise dextrans of other molecular weights were oxidized to provide the analogous oxidized dextran.

Dextran (19.0 g; 0.12 mol saccharide rings; $M_w$=10,000; Sigma # D9260) was added to 170 g of distilled water in a 500 mL round bottom flask. The mixture was stirred for 15 to 30 min to produce a solution; then a solution of 17.7 g (0.083 mol; mw=213.9) sodium periodate in 160 g of distilled water was added to the dextran solution all at once. The mixture was stirred at room temperature for 5 h. After this time, the solution was removed from the round bottom flask, divided into four equal volumes and dispensed into 4 dialysis membrane tubes (MWCO=3500 Daltons). The tubes were dialyzed in deionized water for 4 days, during which time the water was changed twice daily. The aqueous solutions were removed from the dialysis tubes, placed in wide-mouth polyethylene containers and frozen using liquid nitrogen, and lyophilized to afford white, fluffy oxidized dextran.

The dialdehyde content in the resulting oxidized dextran was determined using the following procedure. The oxidized dextran (0.1250 g) was added to 10 mL of 0.25 M NaOH in a 250 mL Erlenmeyer flask. The mixture was gently swirled and then placed in a temperature-controlled sonicator bath at 40° C. for 5 min until all the material dissolved, giving a dark yellow solution. The sample was removed from the bath and the flask was cooled under cold tap water for 5 min. Then 15.00 mL of 0.25 M HCl was added to the solution, followed by the addition of 50 mL of distilled water and 1 mL of 0.2% phenolphthalein solution. This solution was titrated with 0.25 M NaOH to an endpoint determined by a color change from yellow to purple/violet. The same titration was carried out on a sample of the starting dextran to afford a background aldehyde content. The dialdehyde content, also referred to herein as the oxidation conversion or the degree of oxidation, in the oxidized dextran sample was calculated using the following formula:

$$\text{Dialdehyde Content} = \frac{(Vb - Va)_s}{W_s / M} - \frac{(Vb - Va)_p}{W_p / M} \times 100\%$$

Vb=total meq of base
Va=total meq of acid
W=dry sample weight (mg)
M=weight-average molecular weight of polysaccharide repeat unit (=162 for dextran)
s=oxidized sample
p=original sample Method of Tensile Test Strip Fabrication and Testing of Dextran Aldehyde/PEG Amine Hydrogels:

A 1:1 v/v double-barrel syringe (MixPac Systems AG, Rotkreuz, Switzerland) was loaded with the two reactive solutions, dextran aldehyde solution in one side and PEG amine (i.e., a branched amine-ended or monoamine-ended reactant) solution in the other. The syringe was fitted with a 2.5-mm diameter mixing tip having 12 static mixing elements (Mixpac #2.5-12-DM) to dispense sealant. Two 1 inch×3 inch (2.5 cm×7.5 cm) microscope slides were laid parallel to one another, exactly 0.68 cm apart using a spacer, on a sheet of silicone rubber which had been lightly rubbed with silicone stopcock grease as a release agent. A bead of mixed sealant solution was quickly delivered onto the silicone rubber surface between the two slides and promptly covered with a 5 cm×7.5 cm microscope slide to compress the still-fluid sealant to a flat strip between the two slides. The strip was allowed to cure for 10 min; then the silicone sheet was carefully peeled away, leaving the hydrogel strip on the glass slide. The two 1 inch×3 inch (2.5 cm×7.5 cm) slides were carefully removed and finally the adhering hydrogel strip was carefully peeled off the 5 cm×7.5 cm microscope slide. The strip was stored in a sealed plastic bag with a few drops of water to keep it from drying out. If there were no flaws or bubbles, the strip could be cut in the center to give two test pieces, each approximately 3 cm long. Samples were generally tested within 3 h.

Tensile strength was determined using an Exceed Texture Analyzer (Stable Microsystems, Surrey, England) with clamps for pulling films. Pieces of smooth silicone rubber sheet were taped with double-sided tape onto the clamp faces to lightly grip the hydrogels without squashing them. The hydrogel strips were clamped with a gauge length of 1.00 cm (about 1 cm of each end of the 3-cm hydrogel strip was in each clamp) and pulled at a rate of 1 cm/min for 10 cm or until break. After break, the thickness of the hydrogel strip at the break point was measured with a micrometer to calculate tensile strength.

Method of Water Swell Testing of Dextran Aldehyde/PEG Amine Hydrogels:

After the hydrogel strips were broken by tensile testing, pieces were weighed and placed in scintillation vials with 15 mL of phosphate buffer solution (PBS; pH 7.4). The vials were placed on a platform shaker in a 37° C. oven and the hydrogels were periodically removed, patted dry, weighed and placed back in the PBS until they had dissolved or had become so weak and flabby that they could not be handled. Flabby, swollen hydrogels with some integrity could be weighed by pouring the PBS and hydrogel onto a piece of tared metal screen which was then blotted dry from the back with a paper towel and weighed.

Method of Sealing Incisions in Pig Intestines with Dextran Aldehyde/PEG Amine Hydrogels:

A 0.8-cm to 1.0-cm lateral cut (parallel to the length) was made in a 2-inch (5 cm) section of pig intestine, which was obtained from a local abattoir. One end of the intestine section was fastened using a nylon cable tie to a nozzle leading to a water-filled syringe pump with a pressure gauge; the other end was clamped with a hemostat. Sealant was applied over the incision via a 1:1 v/v double-barrel syringe (MixPac Systems) fitted with a 2.5-mm diameter mixing tip having 12 static mixing elements (Mixpac #2.5-12-DM). A syringe gun was used to deliver the sealant. Cure time before testing was 2 to 8 min. Water was then fed to the sealed intestine and pressure was monitored until a leak was observed.

Example 1

Synthesis of Polyethylene Glycol 1500 Branched-End Tetraamine

The purpose of this Example was to prepare polyethylene glycol 1500 branched-end tetraamine using a two step process. In the first step, PEG 1500 was reacted with methanesulfonyl chloride in dichloromethane in the presence of tripentylamine to produce PEG 1500 dimesylate. Then in the second step, the PEG 1500 dimesylate was reacted with tris(2-aminoethyl)amine in water to yield the polyethylene glycol 1500 branched-end tetraamine.

Preparation of PEG 1500 Dimesylate

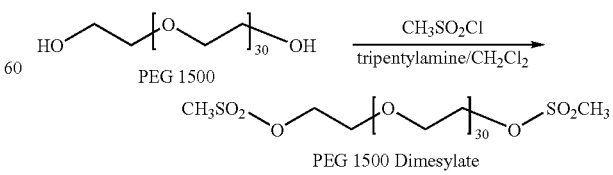

A solution of 15.0 g (22 mmol OH) of polyethylene glycol 1500 ($M_w$=1500; Aldrich #202436) and 10.5 g (13.5 mL; 46 mmol) tripentylamine in 100 mL of dichloromethane was stirred under nitrogen as 6.0 g (4.0 mL; 52 mmol) of methanesulfonyl chloride was added. The solution became warm. The dark red solution was allowed to stand at room temperature for 68 h. Then, the reaction mixture was evaporated to about half its volume using a rotary evaporator and was poured into 750 mL of diethyl ether with stirring in an ice bath. The suspension was stirred for 10 min and then was vacuum-filtered under a nitrogen blanket. The solids were washed three times with 100 mL portions of ether and vacuum dried to yield 17.3 g of tan solids, which were redissolved in 40 mL of dichloromethane and reprecipitated into 600 mL of chilled ether with stirring. Filtration under nitrogen and washing three times with 100 mL portions of ether, followed by vacuum drying yielded 15.0 g of PEG 1500 dimesylate.

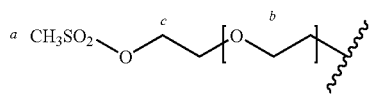

$^1$H NMR (CDCl$_3$): 3.08 ppm (s, a); 3.64 (s, b); 4.38 (t, c).

Preparation of PEG 1500 Branched-End Tetraamine

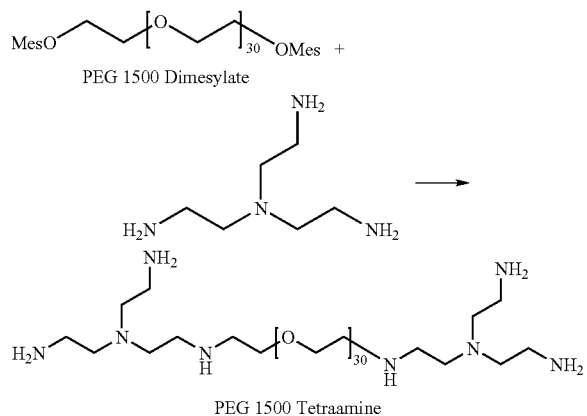

A solution of 1.0 g (1.4 mmol OMes) of PEG 1500 dimesylate, prepared as described above, in 10 mL of water was combined with 5.0 mL (5.0 g, 34 mmol; D=0.98; NH$_2$:Cl=57) tris(2-aminoethyl)amine (Aldrich #225630), and the mixture was allowed to stand at room temperature for 90 h. The water was removed by rotary evaporation and the concentrate was poured into 100 mL of diethyl ether. The suspension was stirred in an ice bath and then allowed to settle, and the ether was decanted off the white tacky powder. The white solids were melted in a hot water bath; then 100 mL more of ether was added and the mixture was stirred and then chilled in an ice bath. The ether was again decanted and the solids were taken up in 10 mL of dichloromethane, filtered to remove insolubles, and added to 100 mL of ether with stirring in an ice bath. The ether suspension of white powder was vacuum-filtered under nitrogen; 0.17 g of gummy solids, presumably polymeric PEG amine, remained on the bottom of the flask. Drying the white powder under nitrogen yielded 0.58 g PEG 1500 branched-end tetraamine.

The $^1$H NMR spectrum (CDCl$_3$) of this branched-end amine group was very characteristic:

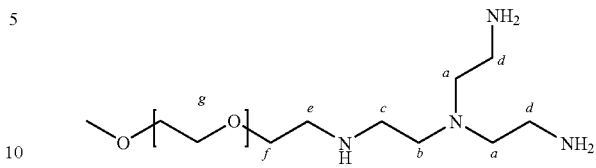

$^1$H NMR (CDCl$_3$): 2.55 ppm (t, J=6.0 Hz, a); 2.60 (t, J=6.1 Hz, b); 2.72 (t, J=6.1 Hz, c); 2.76 (t, J=5.2 Hz, d); 2.80 (t, J=5.2 Hz, e); 3.59 (t, J=5.3 Hz, f); 3.64 (s, g); 4.38 CH2OMes (gone).

Tris(2-aminoethyl)amine $^1$H NMR (CDCl$_3$): 1.25 ppm (s, NH$_2$); 2.51 (t, J=6.0 Hz, a); 2.76 (t, J=6.0 Hz, d).

Examples 2-4

Comparison of Properties of Dextran Aldehyde/PEG Amine Hydrogels

The purpose of these Examples was to compare the mechanical properties of a dextran aldehyde hydrogel based on a branched-end PEG amine with those of hydrogels based on monoamine-ended PEGs. The properties of a dextran aldehyde hydrogel made with PEG 1500 branched-end amine were compared with dextran aldehyde hydrogels made from two monoamine-ended PEGs: linear PEG 1500 diamine and 4-arm star PEG 2000 tetraamine. The first comparison is between two linear PEGs of the same molecular weight, one of which has single amine ends and the other of which has branched diamine ends. The second comparison is between a 4-arm star PEG with a single amine on each end with a linear PEG of approximately the same molecular weight having two amines on each end, and thus having the same total number of amines as the star PEG but having them arrayed differently Synthesis of Linear PEG 1500 Diamine:

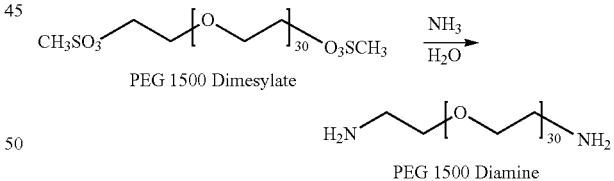

A solution of 10.0 g (14 mmol mesylate) of PEG 1500 dimesylate, prepared as described in Example 1, and 100 mL (1480 mmol) of concentrated aqueous ammonia was allowed to stand at room temperature for 50 h. The solution was filtered to remove a small amount of brown precipitate and was sparged with nitrogen for 20 h to remove ammonia and reduce the solution volume to about 50 mL; then, 1.5 g (15 mmol) of sodium carbonate was added. The solution was extracted three times with 50 mL portions of dichloromethane by stirring gently to avoid emulsion formation. The dichloromethane layers were combined and dried with magnesium sulfate followed by rotary evaporation down to a volume of 20 mL. The concentrated dichloromethane solution was added to 500 mL of ether with stirring and chilling in an ice bath. Vacuum filtration of the resulting suspension and drying under nitrogen yielded 7.7 g of PEG 1500 diamine.

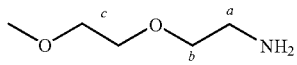

$^1$H NMR (CDCl$_3$): 2.88 (br s, a); 3.52 (t, J=5.25 Hz, b); 3.64 (s, c).

Synthesis of 4-Arm Star PEG 2000 Tetraamine:

The 4-arm star PEG tetraamine was synthesized using a two-step procedure. First, a 4-arm star PEG was reacted with thionyl chloride to produce a 4-arm PEG tetrachloride. In the second step, the 4-arm PEG tetrachloride was reacted with concentrated aqueous ammonia to give the 4-arm star PEG tetraamine.

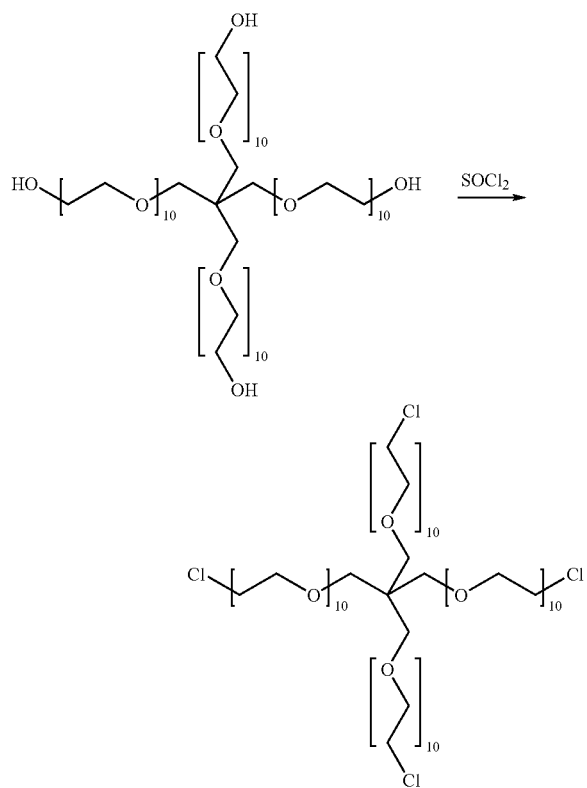

A mixture of 100 g (0.4 mol OH) of 4-arm PEG 2K (M$_n$=2000; NOF Corp) and 90 mL of thionyl chloride (1.5 mol) was stirred under nitrogen in a 100-mL round bottom flask at room temperature for 24 h. The thionyl chloride was removed by rotary evaporation from a 60° C. water bath and two 50-mL portions of toluene were added and removed by rotary evaporation to help complete the removal of thionyl chloride, yielding 98 g of 4-arm PEG 2K tetrachloride.

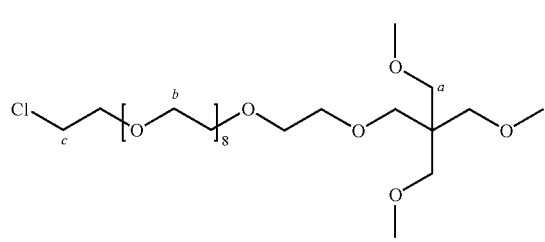

$^1$H NMR (CDCl$_3$): 3.41 ppm (s, a); 3.64 (s, b); 3.75 (t, J=5.9 Hz, 3H, c).

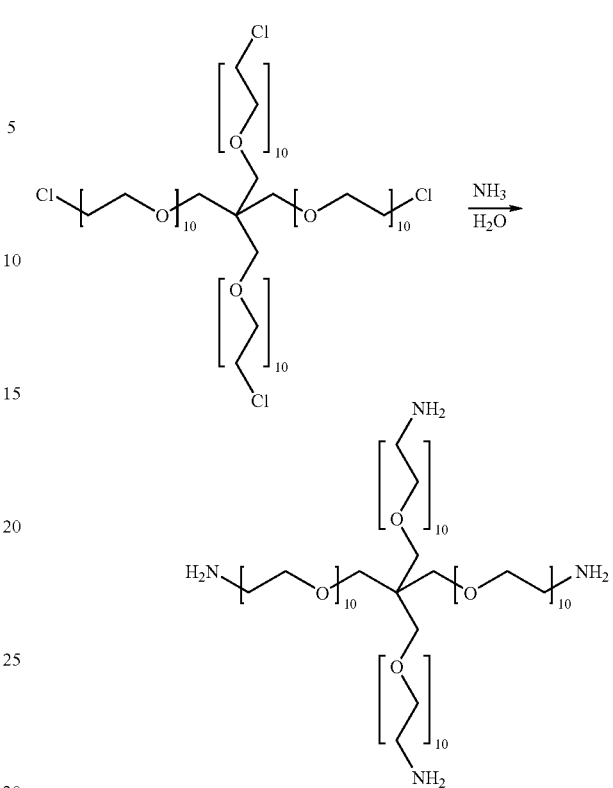

A solution of 50 g (0.1 mol chloride) of 4-arm PEG 2K tetrachloride and 770 mL (11 mol) concentrated aqueous ammonia was heated in an autoclave at 60° C. for 48 h. The solution was cooled to room temperature and sparged with nitrogen for 2 h to remove excess ammonia and reduce the solution volume somewhat. The solution was then rotary evaporated from a 60° C. water bath down to a volume of about 150 mL; then, 10.5 g (76 mmol) of potassium carbonate was added. The solution was extracted with 400 mL chloroform in 3 portions. The chloroform extracts were combined and dried with magnesium sulfate followed by rotary evaporation at 40° C. The product was taken up in 200 mL of dichloromethane and the solution was filtered to remove insolubles and rotary evaporated at 40° C. to yield 52 g of 4-arm PEG 2K tetraamine.

Hydrogel Compositions and Testing:

Hydrogels were prepared using the following reactant solutions:
  1A: 25 wt % dextran aldehyde (50% oxidative conversion; EW=146; Mw=10K);
  1B: 25 wt % dextran aldehyde (44% oxidative conversion; EW=168; Mw=10K);
  1C: 30 wt % PEG 1500 diamine (EW=700);
  1D: 30 wt % PEG 1500 branched-end tetraamine (EW=350), prepared as described in Example 1;
  1E: 30 wt % 4-arm PEG 2000 tetraamine (EW=500).

Pairs of solutions, as indicated in Table 1, were combined in 1:1 volume ratio using a MixPac double-barrel syringe with a 12-step static mixing tip. Hydrogel strips for tensile testing were molded and tested as described in the General Methods Section. The propensity of the hydrogels to swell in water and their ability to seal an incision in a pig intestine against internal water pressure were tested as described in the General Methods section. Gel times were determined by combining 0.1 mL of each reactant solution in a small vial and quickly stirring until the mixture became viscous enough to hold its shape, which was considered to be the gel time. Test data are shown in Table 1. The values in the table are given as the mean and standard deviation of the measurements.

TABLE 1

Dextran Aldehyde/PEG Amine Hydrogel Properties

| Example | Dext Ald | PEG amine | Gel Time (s) | Tensile Strength (g/cm²) | Elongation to Break (%) | 1-week 37° C. PBS Water % Swell | Pig Intestine Burst Pressure |
|---|---|---|---|---|---|---|---|
| 2, Comparative | 1A | 1C | 15 | 1032 ± 180 (n = 8) | 120 ± 36 | dissolved | 0.70 ± 0.50 psi (4.8 ± 3.4 kPa) |
| 3 | 1A | 1D | 10 | 2304 ± 42 (n = 3) | 79 ± 9 | 220 | 1.75 ± 0.53 psi (12.0 ± 3.6 kPa) |
| 4, Comparative | 1B | 1E | 27 | 648 ± 118 (n = 6) | 46 ± 10 | 35 | not measured |

The linear PEG 1500 diamine hydrogel (Comparative Example 2) had the highest elongation-to-break, but it quickly swelled and dissolved in water. The 4-arm PEG 2000 hydrogel (Comparative Example 4) had the lowest water swell, but also had the lowest tensile strength and elongation-to-break.

The linear PEG 1500 branched-end amine hydrogel (Example 3) was far stronger and had nearly twice the elongation-to-break compared to the hydrogel based on the 4-arm star PEG 2000 (Comparative Example 4) having the same number of amines and a slightly higher molecular weight.

The linear PEG 1500 branched-end amine hydrogel (Example 3) was also far stronger than the monoamine-ended linear PEG 1500 diamine hydrogel (Comparative Example 2) of the same molecular weight, while maintaining about ⅔ of the elongation-to-break of the linear PEG 1500 diamine. The PEG 1500 branched-end diamine hydrogel was also much better at resisting swelling and degradation in water. The linear PEG 1500 diamine hydrogel quickly swelled and dissolved while the PEG 1500 branched-end amine hydrogel maintained its integrity with modest swelling over a week. Furthermore, the PEG 1500 branched-end amine hydrogel demonstrated superior burst pressure compared to the monoamine-ended PEG 1500 diamine, possibly due to the higher concentration of free amine groups (which are thought to mediate tissue adhesion) in the hydrogel. These results demonstrate the advantageous balance of properties conferred by the branched-end amine.

Example 5

Synthesis of 8-Arm Polyethylene Glycol 40000 Hexadecaamine

The purpose of this Example was to prepare 8-arm polyethylene glycol 40000 hexadecaamine. The hexadecaamine was prepared using a two step procedure in which 8-arm PEG 40K was reacted with thionyl chloride to produce 8-arm PEG 40K chloride, which was subsequently reacted with tris(2-aminoethyl)amine to give the 8-arm PEG 40K hexadecaamine.

Preparation of 8-Arm PEG 40K Chloride

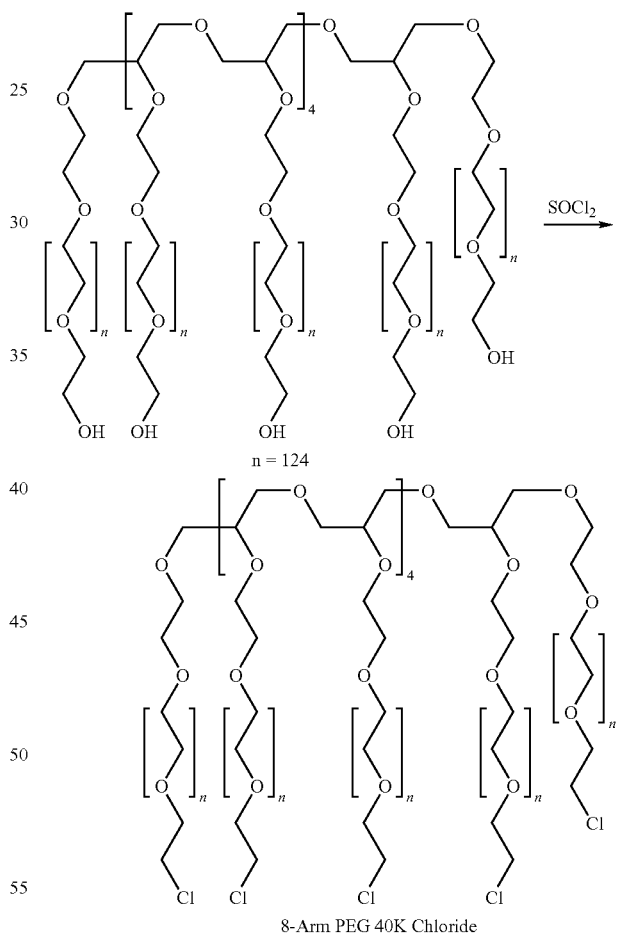

A solution of 100 g (20 mmol OH) of 8-arm PEG 40K ($M_n$=40,000; NOF SunBright HGEO-40000) in 200 mL of toluene was heated to 70° C. and stirred under nitrogen as 6 mL of thionyl chloride (10 g; 80 mmol) was quickly added. The mixture was stirred at 60° C. under nitrogen for 20 h. After 20 h the solution was bubbled with nitrogen for 1 h while still warm to remove thionyl chloride and then 2 mL (50 mmol) of methanol was added to scavenge remaining thionyl chloride. The resulting solution was added with stirring to 300 mL of hexane to initially make a gelatinous precipitate which soon became friable and powdery as the toluene extracted from the product. The white suspension was stirred for an hour and then vacuum-filtered, washed once with 100 mL of hexane and vacuum-dried under a nitrogen blanket to yield 99.0 g of 8-arm PEG 40K chloride.

Preparation of 8-Arm PEG 40K Hexadecaamine sodium sulfate, evaporated to a volume of 120 mL using rotary evaporation, and precipitated into 850 mL of ether with stirring. The ether was then stirred in an ice bath and the resulting white precipitate was vacuum-filtered under nitrogen, washed with 100 mL of diethyl ether and dried under nitrogen to yield 27.7 g (92% yield) of 8-arm star PEG 40K hexadecaamine.

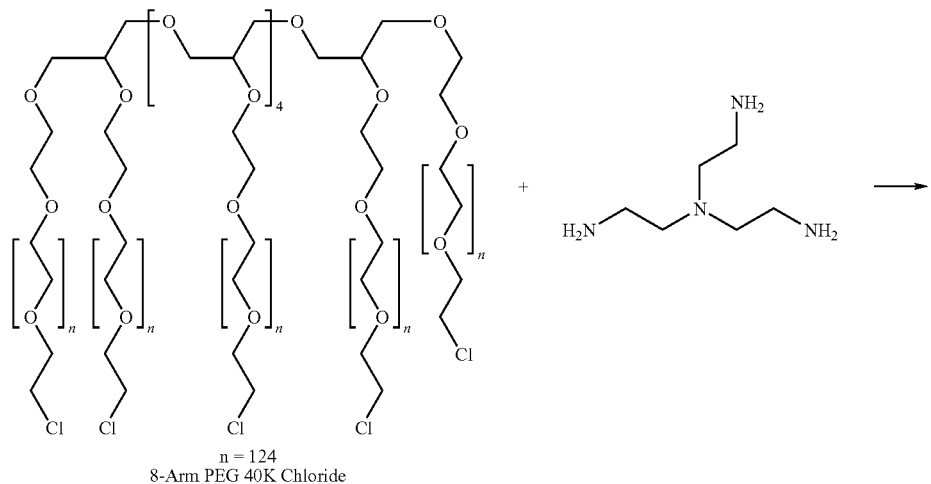

n = 124
8-Arm PEG 40K Chloride

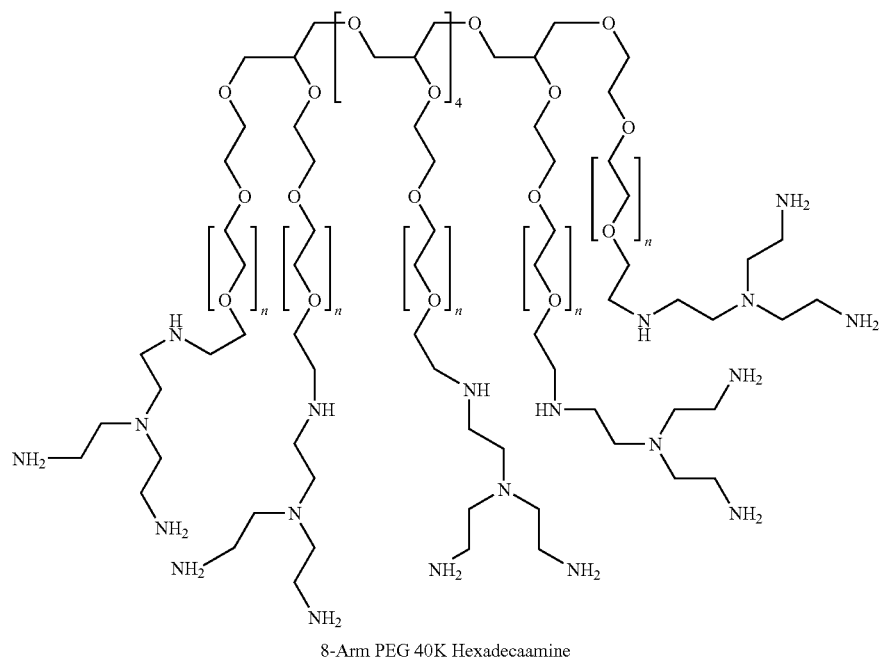

8-Arm PEG 40K Hexadecaamine

A solution of 30.0 g (6.0 mmol Cl) of 8-arm star PEG 40K chloride in 60 mL of water was rapidly stirred as 36 mL (35.3 g; 240 mmol) of tris(2-aminoethyl)amine (TCI America #T1243) was added. The resulting solution was stirred in a 100° C. oil bath under nitrogen for 25 h. Then, 0.5 mL (9 mmol) of 50% sodium hydroxide was added and the mixture was cooled and extracted with 150 mL of dichloromethane followed by 2 extractions with 100 mL portions of dichloromethane. Separation was somewhat slow but eventually complete overnight. The combined extracts were dried with

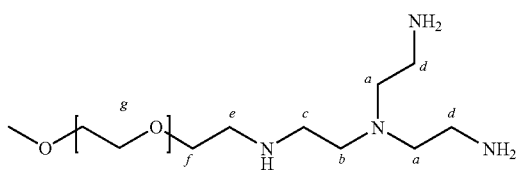

$^1$H NMR (CDCl$_3$): 2.53 ppm (t, J=6.0 Hz, a); 2.60 (t, J=6.1 Hz, b); 2.71 (t, J=6.1 Hz, c); 2.76 (t, J=5.9 Hz, d); 2.80 (t, J=5.2 Hz, e); 3.59 (t, J=5.3 Hz, f); 3.64 (s, g); 3.76 CH$_2$Cl (t, J=6.0 Hz; h; gone). Integrate groups of peaks: 2.5-2.8 ppm (a-e; 14.3H; theory 14H); 3.5-3.8 ppm (f-g, PEG backbone, 500H). There was no remaining tris(2-aminoethyl)amine by NMR.

By substituting tris(3-aminopropyl)amine (available from BASF) for tris(2-aminoethyl)amine in this synthesis, an 8-arm star PEG 40K hexadecaamine having three CH$_2$ groups between each nitrogen atom in the end-chain branch can be produced with no other alterations to the procedure. This is generally true of the following Examples as well.

Care must be taken to protect aqueous or wet organic solutions of these branched-end amines from atmospheric carbon dioxide, as carbamate formation is very facile. These carbamates will complex with divalent ions such as magnesium. When attempting to dry a dichloromethane solution of the PEG carbamate with magnesium sulfate, a clear, viscoelastic rubber was produced. The viscoelastic nature of the PEG solution in the presence of MgSO$_4$ is apparently due to Mg$^{+2}$ bridging the carbamate end groups.

Example 6

Synthesis of 4-Arm Polyethylene Glycol 10000 Octaamine

The purpose of this Example was to prepare 4-arm polyethylene glycol 10000 octaamine. The octaamine was prepared using a two step procedure in which 4-arm PEG 10K was reacted with thionyl chloride to produce 4-arm PEG 10K chloride, which was subsequently reacted with tris(2-aminoethyl)amine to give the 4-arm PEG 10K octaamine.

Preparation of 4-Arm PEG 10K Chloride

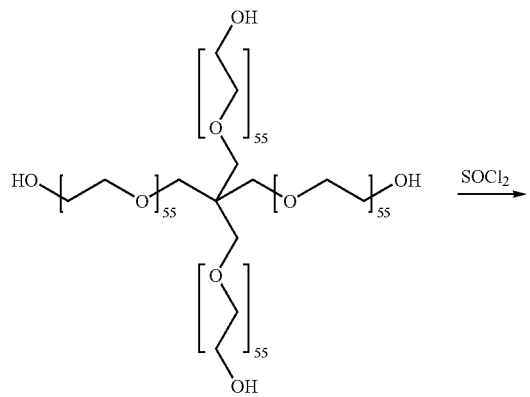

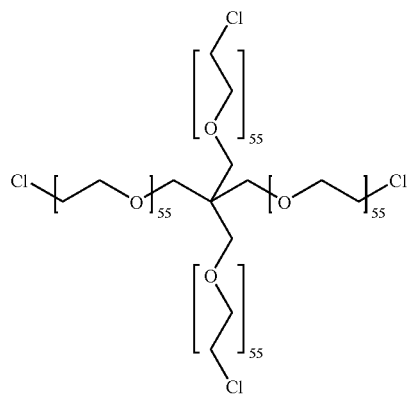

4-Arm PEG 10K Chloride

A mixture of 5 g (2.0 mmol OH) of 4-arm PEG 10K (M$_n$=10,000; Shearwater Polymers Inc.), 5 mL of thionyl chloride (70 mmol) and 5 mL of toluene was stirred under nitrogen in a 100-mL round bottom flask in a 60° C. oil bath for 16 h. The thionyl chloride was removed by rotary evaporation of the clear solution from a hot water bath and two 20-mL portions of toluene were added and removed by rotary evaporation to help complete the removal of thionyl chloride. The product was taken up in 20 mL of dichloromethane and syringe-filtered to remove haze. The solution was concentrated to a volume of 5-10 mL and was added to 300 mL of diethyl ether with stirring. The ether was then stirred in an ice bath for 30 min and the precipitate was vacuum filtered under nitrogen until dry to yield 4.4 g of 4-arm PEG 10K chloride.

Preparation of 4-Arm PEG 10K Octaamine

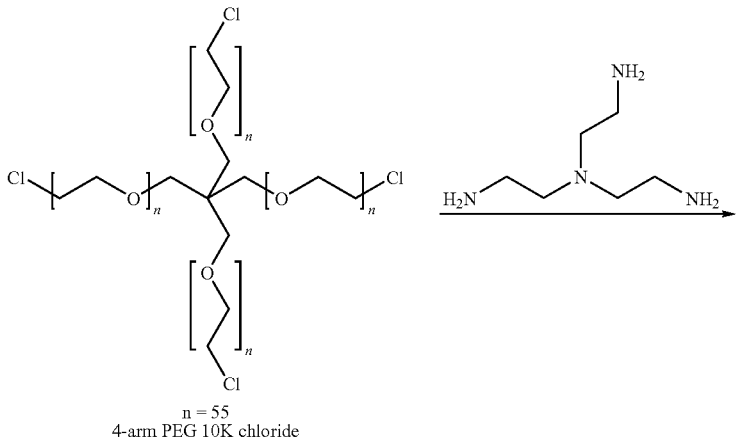

n = 55
4-arm PEG 10K chloride

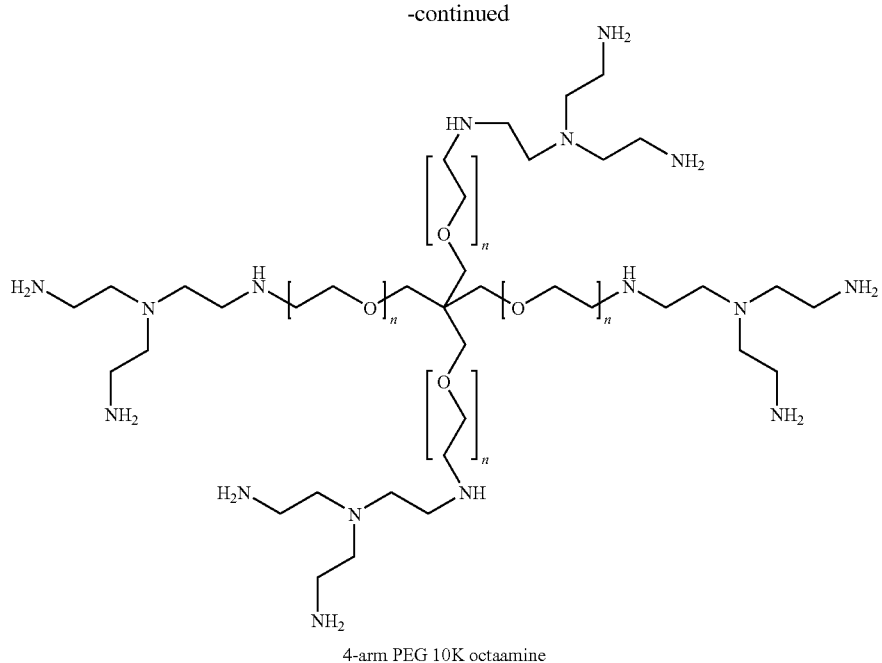

4-arm PEG 10K octaamine

A solution of 1.0 g (0.57 mmol Cl) of the 4-arm star PEG 10K chloride in 5 mL of water was stirred in a 100° C. oil bath with 5 mL (5 g; 34 mmol) of tris(2-aminoethyl)amine (Aldrich #225630) for 2 h and then 0.1 g of sodium carbonate was added and the mixture was cooled and extracted with two 20-mL portions of dichloromethane with gentle stirring for 5 min. The dichloromethane layers were separated and dried with sodium sulfate, filtered and concentrated to about 5-10 mL. The concentrate was added with stirring to 200 mL of diethyl ether and the ether was stirred in an ice bath for 20 min. The resulting white precipitate was vacuum filtered dry under nitrogen. The product was dissolved in 5 mL of dichloromethane and reprecipitated from 200 mL more ether followed by chilling in ice and vacuum filtration under nitrogen to yield 0.60 g of the 4-arm PEG 10K octaamine.

Example 7

Synthesis of 8-Arm Polyethylene Glycol 10000 Hexadecaamine

The purpose of this Example was to prepare 8-arm polyethylene glycol 10000 hexadecaamine. The hexadecaamine was prepared using a two step procedure in which 8-arm PEG 10K was reacted with methanesulfonyl chloride in dichloromethane in the presence of triethylamine to produce 8-arm PEG 10K mesylate, which was subsequently reacted with tris(2-aminoethyl)amine to give the 8-arm PEG 10K hexadecaamine.

Preparation of 8-Arm PEG 10K Mesylate

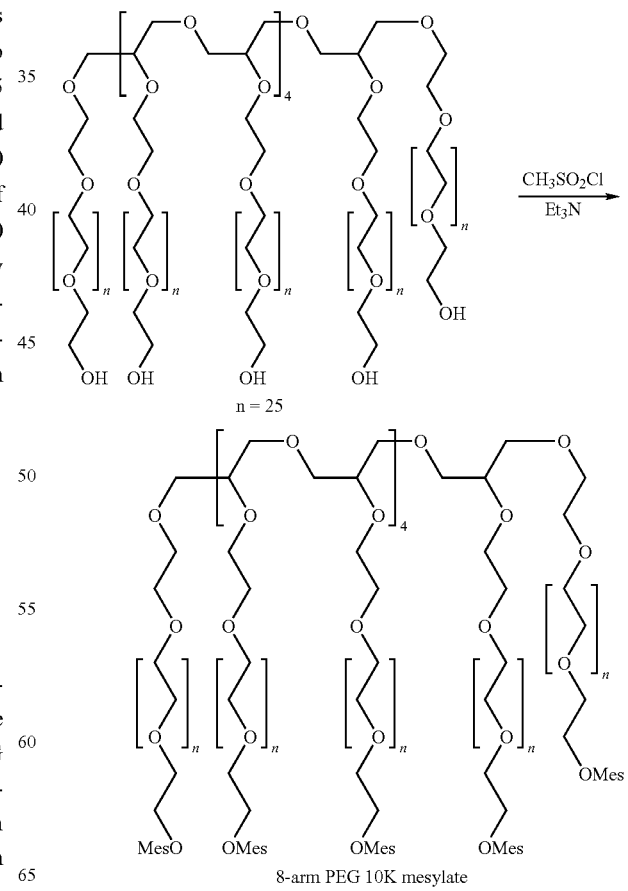

8-arm PEG 10K mesylate

A solution of 10 g (8.0 mmol OH) of 8-arm PEG 10K ($M_n$=10,000; Shearwater Polymers Inc.) in 140 mL of dichloromethane was stirred under nitrogen as 4 mL (28 mmol) of triethylamine ($Et_3N$) was added, followed by 2.6 g (1.8 mL; 24 mmol) of methanesulfonyl chloride. The mixture was stirred at room temperature over the weekend.

Then, the solution was gently stirred with three 25-mL portions of 10% sodium carbonate for 15 min each. However, separation was difficult, so the whole mixture was placed in dry Ice to freeze the water and allow the dichloromethane to be decanted away. The dichloromethane was dried with magnesium sulfate, filtered through Celite® diatomaceous earth (World Minerals, Lompoc, Calif.), concentrated to about 15 mL and added to 600 mL of diethyl ether with stirring. The ether was stirred in an ice bath for 20 min and the suspension was vacuum filtered under nitrogen, taken up in dichloromethane and reprecipitated into 600 mL of fresh ether. The suspension was chilled and vacuum filtered under nitrogen followed by three ether washings of 20 mL each under nitrogen with careful exclusion of air to yield 7.94 g of 8-arm PEG 10K mesylate.

Preparation of 8-Arm PEG 10K Hexadecaamine

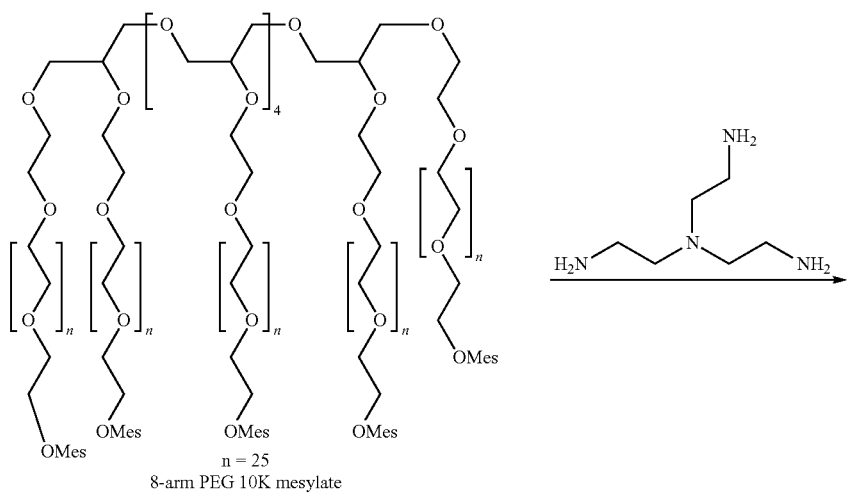
8-arm PEG 10K mesylate

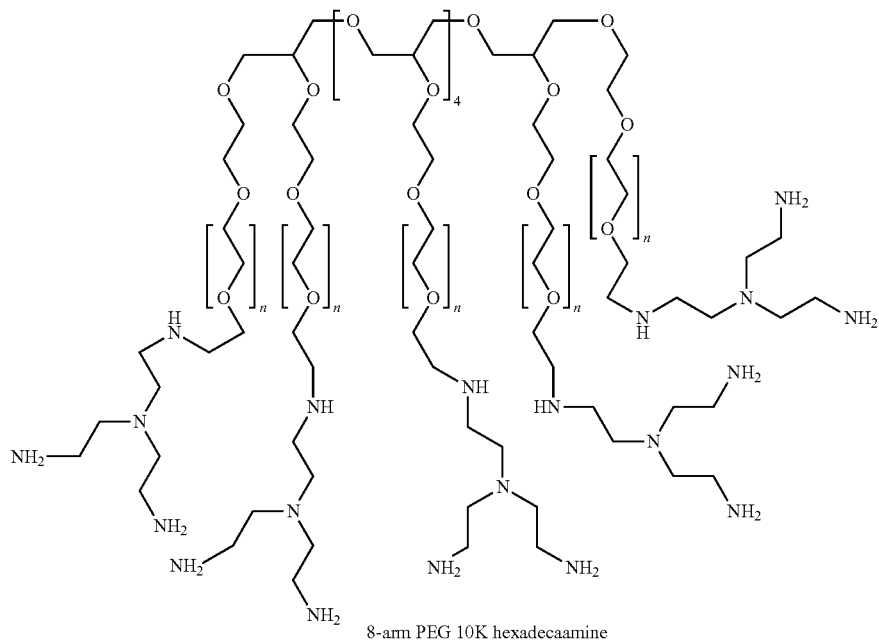
8-arm PEG 10K hexadecaamine

A solution of 2.0 g (2.2 mmol OMes) of 8-arm star PEG 10K mesylate in 10 mL of water was chilled in an ice bath and 10 mL (68 mmol) of tris(2-aminoethyl)amine (Aldrich #225630) was added. The solution was stirred at room temperature for 96 h. Then 1 mL of 10% sodium carbonate was added and the mixture was extracted with three 25-mL portions of dichloromethane with gentle stirring for 5 min. The dichloromethane layers were combined, dried with sodium sulfate, filtered and concentrated to about 15 mL. The concentrate was added with stirring to 250 mL of diethyl ether at room temperature. The ether was then stirred in an ice bath for 20 min and the resulting white precipitate was vacuum filtered under nitrogen. The product was dissolved on the funnel in 10 mL of dichloromethane in 3 portions and the solution was passed through into a 50-mL round bottom flask using vacuum. The solution was reprecipitated from 200 mL of more ether followed by chilling in ice and vacuum filtration under nitrogen to yield 1.55 g of 8-arm PEG 10K hexadecaamine.

Example 8
Synthesis of 6-Arm Polyethylene Glycol 10000 Dodecaamine

The purpose of this Example was to prepare 6-arm polyethylene glycol 10000 dodecaamine. The dodecaamine was prepared using a two step procedure in which 6-arm PEG 10K was reacted with methanesulfonyl chloride in dichloromethane in the presence of triethylamine to produce 6-arm PEG 10K mesylate, which was subsequently reacted with tris(2-aminoethyl)amine to give the 6-arm PEG 10K dodecaamine.

Preparation of 6-Arm PEG 10K Mesylate

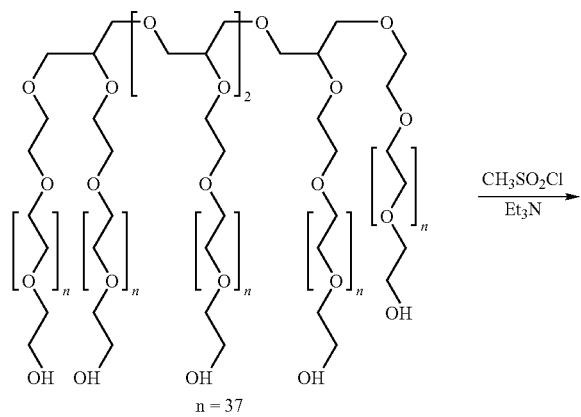

n = 37

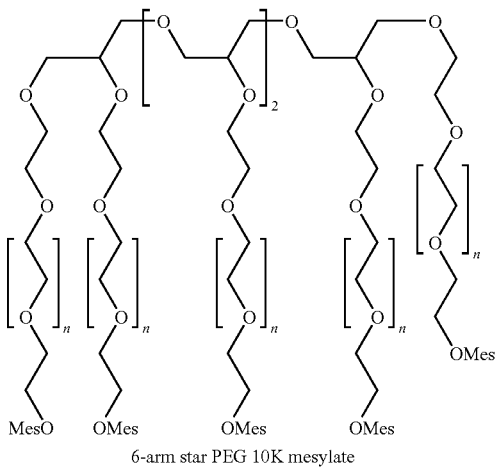

6-arm star PEG 10K mesylate

A solution of 10.0 g (6.0 mmol OH) of 6-arm PEG 10K ($M_n$=10,000; SunBio, Inc.) in 100 mL of dichloromethane was stirred under nitrogen as 3 mL (21 mmol) of triethylamine was added, followed by 1.5 mL (2.2 g; 19 mmol) of methanesulfonyl chloride. The mixture was allowed to stand stoppered at room temperature for 6 days. Then, the solution was extracted with thee 50-mL portion of 15 wt % monobasic potassium phosphate ($KH_2PO_4$) followed by 50 mL of 50 wt % potassium carbonate. The dichloromethane solution was dried with magnesium sulfate, filtered through Celite® diatomaceous earth, concentrated to about 20 mL and added to 600 mL of diethyl ether with stirring. The ether was stirred in an ice bath for 20 min and the suspension was vacuum filtered under nitrogen, taken up in dichloromethane and reprecipitated into 600 mL of fresh ether. The suspension was chilled and vacuum filtered under nitrogen followed by ether washing (three times with 20-mL portions) under nitrogen with careful exclusion of air to yield 9.55 g of 6-arm PEG 10K mesylate.

Preparation of 6-Arm PEG 10K Dodecaamine

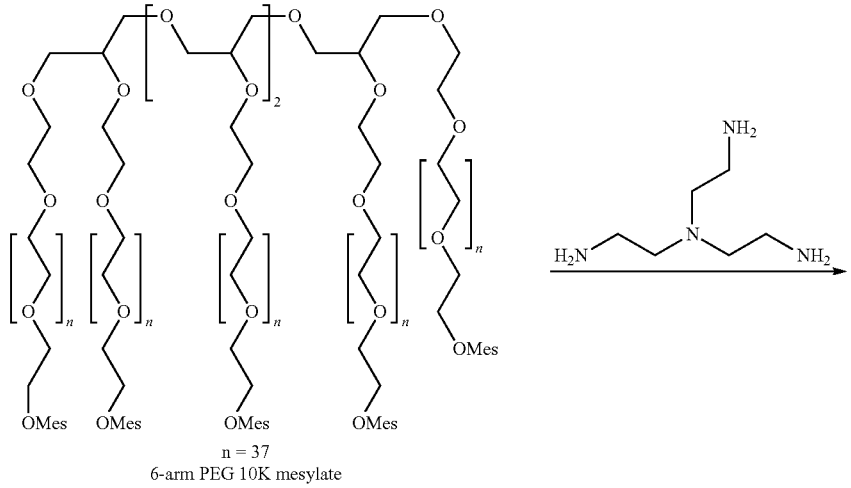

n = 37
6-arm PEG 10K mesylate

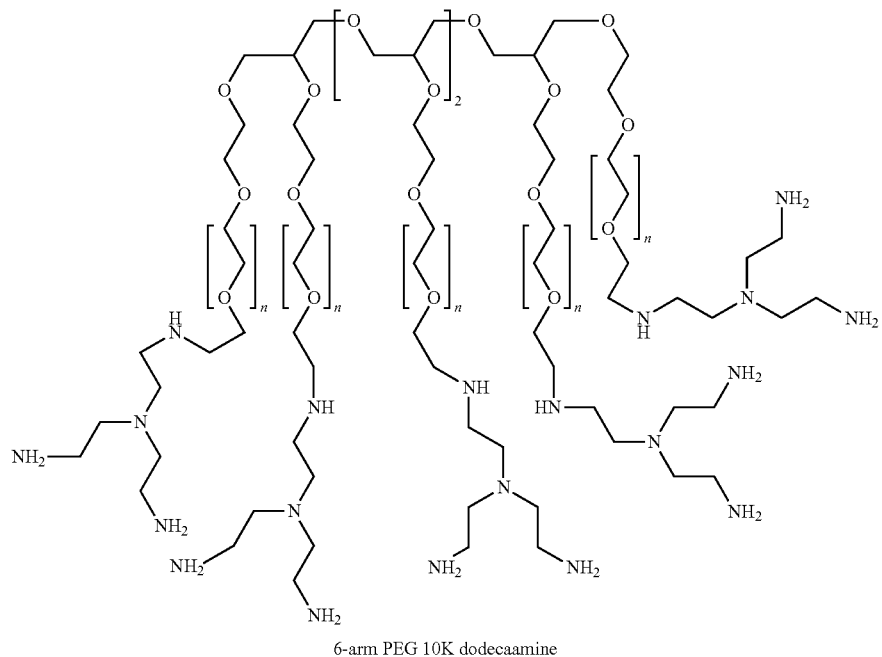

6-arm PEG 10K dodecaamine

A solution of 5.0 g (2.9 mmol OMes) of 6-arm star PEG 10K ($M_n$=10200; EW=1700) mesylate in 10 mL of water was chilled in an ice bath and stirred as 10 mL (9.8 g; 67 mmol) of tris(2-aminoethyl)amine (Aldrich #225630) was added. The opaque white mixture was stirred at room temperature under nitrogen for 5 days. Then, 5 mL of 10% sodium carbonate was added and the mixture was extracted with four 25-mL portions of dichloromethane with gentle stirring for 5 min. The dichloromethane layers were combined, dried with sodium sulfate, filtered and concentrated to about 15 mL. The concentrate was added with stirring to 250 mL of diethyl ether at room temperature. The ether was then stirred in an ice bath for 20 min and the resulting white precipitate was vacuum filtered under nitrogen. The product was dissolved on the funnel in 10 mL of dichloromethane in 3 portions and the solution was passed through into a 50-mL round bottom flask using vacuum. The solution was reprecipitated from 200 mL of more ether followed by chilling in ice and vacuum filtration under nitrogen to yield 3.9 g (78% yield) of h-arm star PEG 10K dodecaamine.

Example 9

Synthesis of 4-Arm Ethylenediamine Poly(ethylene oxide-propylene oxide) 15000 Octaamine The purpose of this Example was to prepare 4-arm ethylenediamine (EDA) poly(ethylene oxide (EO)-propylene oxide (PO)) 1500 octaamine. The octaamine was prepared using a two step procedure in which 4-arm ethylenediamine poly(ethylene oxide-propylene oxide) 15K was reacted with methanesulfonyl chloride in dichloromethane in the presence of triethylamine to produce 4-arm ethylenediamine EO/PO 15K mesylate, which was subsequently reacted with tris(2-aminoethyl)amine to give the 4-arm ethylenediamine EO/PO 1500 octaamine.

Preparation of 4-Arm Ethylenediamine EO/PO 15K Mesylate

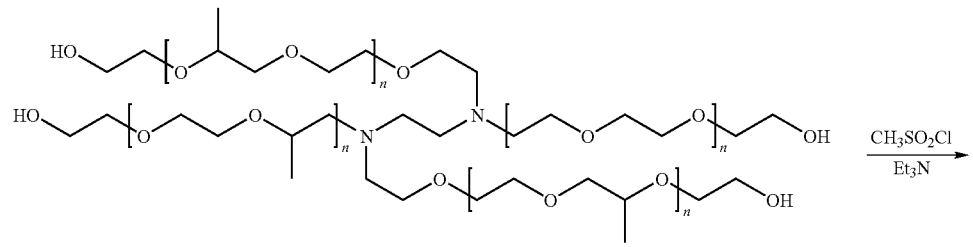

$M_n$ = 14300
77 mol % EO

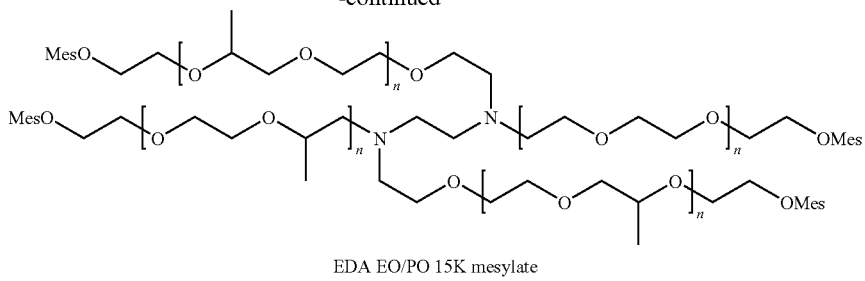

EDA EO/PO 15K mesylate

A solution of 20.2 g (5.7 mmol OH) of ethylenediamine ethylene oxide-propylene oxide copolymer ($M_n$=14300; contains 77 mol % ethylene oxide; all end groups are EO; Aldrich #435538) in 140 mL of dichloromethane was stirred under nitrogen as 6 mL (42 mmol) of triethylamine was added, followed by 4.4 g (3.0 mL; 39 mmol) of methanesulfonyl chloride. The solution was allowed to stand at room temperature for 3 days. The solution was then gently stirred with three 100-mL portions of 15 wt % monobasic potassium phosphate ($KH_2PO_4$) for 10 min each, followed by 100 mL of 50 wt % potassium carbonate. The dichloromethane was dried with magnesium sulfate, filtered through Celite® diatomaceous earth, and rotary evaporated from a 60° C. water bath until solvent stopped coming off. The concentrate was held overnight in a 60° C. water bath under high vacuum with a nitrogen bleed through a 20-gauge syringe needle to yield 19.8 g of ethylenediamine EO/PO 15K mesylate.

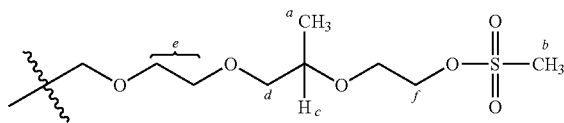

$^1$H NMR ($CDCl_3$) 1.14 ppm (t, 53H, a); 3.08 (s, 2.5H, b); 3.40 (m, 17H, c); 3.50 (m, 34H, d); 3.64 (s, 230H, e); 4.38 (d/t, 1.64H, f).

Preparation of 4-Arm Ethylenediamine EO/PO 15K Octaamine

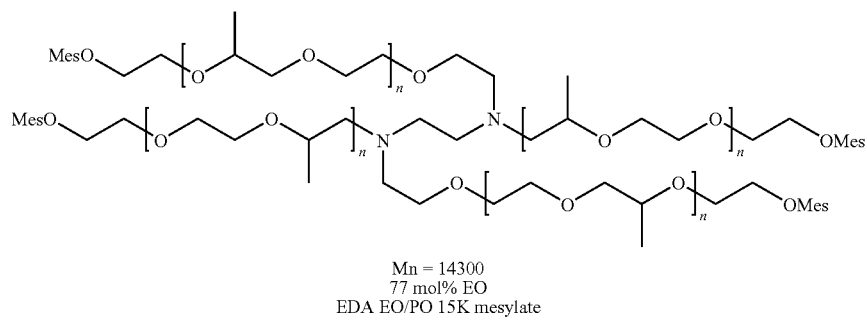

Mn = 14300
77 mol% EO
EDA EO/PO 15K mesylate

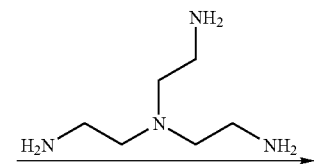

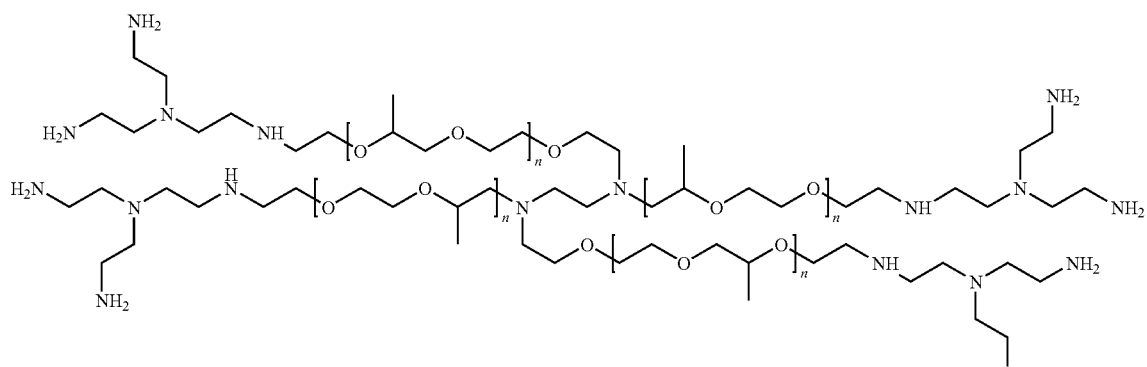

EDA EO/PO 15K octaamine

A mixture of 3.0 g (0.84 mmol mesylate) of ethylenediamine EO/PO 15K mesylate and 10 mL of water was stirred in an ice bath until a homogeneous solution resulted. Then, 7.0 mL (6.9 g; 47 mmol) of tris(2-aminoethyl)amine (Aldrich #225630) was added. The clear tan solution was stirred under nitrogen in a 100° C. oil bath for 3 h and then was diluted with 50 mL of water. An aliquot of this reaction mixture was analyzed using NMR, which revealed that the mesylate peak (3.08 ppm) was gone. The remainder of the solution was allowed to stand stoppered overnight; then 5 mL of 10% sodium carbonate was added and the solution was placed in a 3500 MWCO dialysis membrane tube and stirred under nitrogen in 2 gallons (8 L) of deionized water for 8 h. The solution in the membrane was then stored overnight in a plastic bag to protect it from carbon dioxide in the air. The solution was extracted four times with 50-mL portions of dichloromethane; the aqueous layer was saved and rotary evaporated to yield 2.1 g of aqueous residue.

$^1$H NMR (CDCl$_3$): 98.6 mol % triamine and 1.4 mol % polyether which corresponds to 41 wt % triamine and 59 wt % polyether.

The dichloromethane extracts were combined, dried with magnesium sulfate, filtered through Celite® diatomaceous earth and concentrated by rotary evaporation followed by high vacuum for 1 h with a nitrogen bleed through a syringe needle to yield 1.8 g of ethylenediamine EO/PO 15K octaamine.

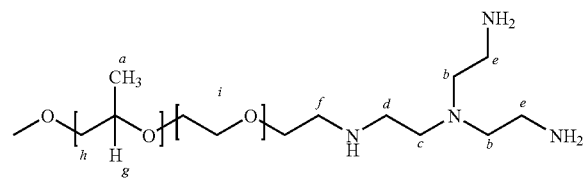

$^1$H NMR (CDCl$_3$) 1.13 ppm (t, 53H, a); integrate in groups of peaks: 2.5-2.8 ppm (b-f; 13.3H; theory 14H); 3.08 (s, mesylate gone); 3.40 (m, 18H, g); 3.50 (m, 35H, h); 3.64 (s, 223H, i). The ends were about 95% converted.

By NMR of the aqueous residue, dichloromethane extraction was shown not to be very efficient: 40% of the polyether product remained in the aqueous phase along with all the triamine starting material. However, the final product was free of triamine, as determined by NMR.

Examples 10-13

Tissue Adhesion of Dextran Aldehyde Hydrogels Crosslinked with 4-Arm and 8-Arm PEG 10K Amines and 4-Arm PEG 10K Branched-End Amine The purpose of these Examples was to compare the ability of a branched-end PEG amine-based dextran aldehyde hydrogel to seal an incision in a pig intestine with that of two dextran aldehyde hydrogels based on monoamine-ended PEGs of similar molecular weight having either the same number of arms or the same number of amines. Therefore, dextran aldehyde hydrogels were made with 4-arm PEG 10K branched-end octaamine; the comparative monoamine-ended PEGs used were 4-arm 10K tetraamine and 8-arm 10K octaamine.

Preparation of 4-Arm PEG 10K Tetraamine

The 4-Arm PEG 10K tetraamine was synthesized from the 4-arm PEG 10K octaol (M$_n$=10000; Shearwater) in a manner similar to that used for the preparation of the 4-arm PEG 2K tetraamine, as described in Examples 2-4. The PEG 10K alcohol was reacted first with thionyl chloride to make the tetrachloride, which was then reacted with aqueous ammonia at 60° C. to form the tetraamine.

Preparation of 8-Arm 10K Octaamine

The 8-Arm PEG 10K octaamine was synthesized from the 8-arm PEG 10K octaol (M$_n$=10000; NOF Corp.) in a manner similar to that used for the preparation of the 4-arm PEG 2K tetraamine, as described in Examples 2-4. The PEG10K alcohol was reacted first with thionyl chloride to make the octachloride, which was then reacted with aqueous ammonia at 60° C. to form the octaamine.

Hydrogel Compositions:

Hydrogels were prepared using the following reactant solutions:
- 2A: 17 wt % dextran aldehyde (20% oxidative conversion; M$_w$=60K; EW=390);
- 2B: 30 wt % 4-arm PEG 10K tetraamine (EW=2500);
- 2C: 30 wt % 4-arm PEG 10K branched-end octaamine (EW=1250), prepared as described in Example 6;
- 2D: 30 wt % 8-arm PEG 10K octaamine (EW=1250);
- 2E: 20 wt % 4-arm PEG 10K branched-end octaamine (EW=1250), prepared as described in Example 6.

The pairs of solutions, as indicated in Table 2, were combined in a 1:1 volume ratio using a MixPac double-barrel syringe with an 8- or 12-step static mixing tip. The ability to seal an incision in a pig intestine against internal water pressure was tested according to the method described in the General Methods section. Test data are shown in Table 2. The burst pressures are given as the mean and standard deviation of "n" measurements.

TABLE 2

Test Results of Sealing Pig Intestines with Dextran Aldehyde-Multi-Arm PEG 10K Amine Hydrogels

| Example | Dextran Aldehyde | PEG Amine | Pig Intestine Burst Pressure, |
|---|---|---|---|
| 10, Comparative | 2A | 2B | 1.10 ± 0.45 psig (n = 4) (7.58 ± 3.1 kPa) |
| 11 | 2A | 2C | 0.94 ± 0.23 (n = 5) (6.5 ± 1.6 kPa) |
| 12, Comparative | 2A | 2D | 1.28 ± 0.17 (n = 4) (8.82 ± 1.17 kPa) |
| 13 | 2A | 2E | 2.08 ± 0.51 (n = 4) (14.3 ± 3.52 kPa) |

The cure rate with 30 wt % 4-arm PEG 10K branched-end octaamine (solution 2C; Example 11) was very fast; as a result the patches were poorly applied. Dilution to 20 wt % PEG amine (solution 2E; Example 13) reduced the gelation rate such that application was improved and consequently burst pressures were much improved. The burst pressure of the branched-end PEG amine hydrogel with adequate application significantly exceeded the monoamine-end PEG hydrogels, Comparative Examples 10 and 12.

Examples 14-19

Mechanical Properties of Dextran Aldehyde Hydrogels Crosslinked with Monoamine-Ended PEG Compared with Branched-End Amine PEG Hydrogels The purpose of these Examples was to compare the mechanical properties of branched-end PEG amine-based dextran aldehyde hydrogels with dextran aldehyde hydrogels based on monoamine-ended PEG of similar molecular weight having either the same number of arms or the same number of amines. Therefore dextran aldehyde hydrogels were made with 4-arm PEG 10K branched-end octaamine; the comparative monoamine-ended PEGs used were 4-arm 10K tetraamine and 8-arm 10K octaamine.

Hydrogel Compositions:

The various PEG amines were prepared as described in Examples 10-13. Hydrogels were prepared using the following reactant solutions:

3A: 17 wt % dextran aldehyde (20% oxidative conversion; $M_w$=60K; EW=390);

3B: 20 wt % 4-arm PEG 10K tetraamine (EW=2500);

3C: 20 wt % 4-arm PEG 10K branched-end octaamine (EW=1250);

3D: 20 wt % 8-arm PEG 10K octaamine (EW=1250);

3E: 30 wt % 4-arm PEG 10K tetraamine (EW=2500);

3F: 30 wt % 4-arm PEG 10K branched-end octaamine (EW=1250);

3G: 30 wt % 8-arm PEG 10K octaamine (EW=1250).

The pairs of solutions, as indicated in Table 3, were combined in 1:1 volume ratio using a MixPac double-barrel syringe with a 12-step static mixing tip. Hydrogel strips for tensile testing were molded and tested as described in the General Methods section. The propensity of the hydrogels to swell in water was tested on the strips as described in the General Methods section. Gel times were determined by combining 0.1 mL of each reactant solution in a small vial and quickly stirring until the mixture became viscous enough to hold its shape, which was considered to be the gel time. Test data are shown in Table 3.

TABLE 3

Mechanical Properties of Dextran Aldehyde Hydrogels Crosslinked with Monoamine-Ended PEG Compared with Branched-End Amine PEG Hydrogels

| Example | Dext Ald | PEG Amine | Gel time (s) | Tensile Strength (g/cm$^2$) | Elongation to Break (%) | 1-wk 37° C. PBS % Swell |
|---|---|---|---|---|---|---|
| 14, Comparative | 3A | 3B | 18 | 650 | 150 | dissolved |
| 15 | 3A | 3C | 5 | 910 | 105 | 200 |
| 16, Comparative | 3A | 3D | 10 | 850 | 65 | 120 |
| 17, Comparative | 3A | 3E | 5 | 1160 | 200 | dissolved |
| 18 | 3A | 3F | 5 | 1440 | 120 | 330 |
| 19, comparative | 3A | 3G | 5 | 1160 | 55 | 200 |

In general, hydrogels made with a higher percent solids (i.e., 30 wt % versus 20 wt %) PEG amine solution had shorter gel times, higher tensile strengths, higher elongations-to-break and greater water swell. When compared with the hydrogels made with 4-arm monoamine-ended PEG (Comparative Examples 14 and 17), the 4-arm branched-end PEG amine hydrogels (Examples 15 and 18) had higher tensile strength and were far more resistant to hydrolysis. When compared with the hydrogels made with 8-arm monoamine-ended PEG (Comparative Examples 16 and 19), the 4-arm branched-end PEG amine hydrogels (Examples 15 and 18) had higher tensile strength and far higher elongation-to-break. These examples demonstrate the advantageous balance of properties conferred by the branched-end amines.

Example 20-24

Mechanical Properties of Dextran Aldehyde Hydrogels Crosslinked with Monoamine-Ended PEG Compared with Branched-End Amine PEG Hydrogels The purpose of these Examples was to compare the mechanical properties of branched-end PEG amine-based dextran aldehyde hydrogels with dextran aldehyde hydrogels based on monoamine-ended PEG of similar molecular weight having the same number of arms. Therefore hydrogels were made from dextran aldehyde having two different levels of oxidation with 6-arm PEG 10K branched-end dodecaamine and the comparative monoamine-ended 6-arm PEG 10K hexaamine.

Preparation of 6-Arm PEG 10K Hexaamine

The 6-Arm PEG 10K hexaamine was synthesized from the 6-arm PEG 10K hexaol ($M_n$=10000; NOF Corp.) in a manner similar to that used for the preparation of the 4-arm PEG 2K tetraamine, as described in Examples 2-4. The PEG alcohol was reacted first with thionyl chloride to make the hexachloride, which was then reacted with aqueous ammonia at 60° C. to form the hexaamine.

Hydrogel Compositions:

Hydrogels were prepared using the following reactant solutions:

4A: 17 wt % dextran aldehyde (20% oxidative conversion; $M_w$=60K; EW=390);

4B: 20 wt % dextran aldehyde (15% oxidative conversion; $M_w$=40K; EW=525);

4C: 20 wt % 6-arm PEG 10K hexaamine (EW=1670);

4D: 20 wt % 6-arm PEG 10K branched-end dodecaamine (EW=880), prepared as described in Example 8;

4E: 30 wt % 6-arm PEG 10K branched-end dodecaamine (EW=880), prepared as described in Example 8.

The pairs of solution, as indicated in Table 4, were combined in 1:1 volume ratio using a MixPac double-barrel syringe with a 12-step static mixing tip. Hydrogel strips for tensile testing were molded and tested as described in the General Methods section. The propensity of the hydrogels to swell in water was tested on the strips as described in the General Methods section. Gel times were determined by combining 0.1 mL of each reactant solution in a small vial and quickly stirring until the mixture became viscous enough to hold its shape, which was considered to be the gel time. Test data are shown in Table 4.

TABLE 4

Mechanical Properties of Dextran Aldehyde Hydrogels Crosslinked with Monoamine-Ended PEG Compared with Branched-End Amine PEG Hydrogels

| Example | Dext Ald | PEG Amine | Gel time (s) | Tensile Strength (g/cm$^2$) | Elongation to Break (%) | 1-wk 37° C. PBS % Swell |
|---|---|---|---|---|---|---|
| 20, Comparative | 4A | 4C | 15 | 830 | 90 | 350 |
| 21 | 4A | 4D | 4 | 990 | 45 | 90 |
| 22, Comparative | 4B | 4C | 34 | 470 | 95 | dissolved in 3 days |
| 23 | 4B | 4D | 4 | 870 | 70 | 220 |
| 24 | 4B | 4E | 4 | 1050 | 70 | 300 |

When compared with the dextran aldehyde (solution 4A) hydrogel made with 6-arm monoamine-ended PEG 10K (Comparative Example 20), the 6-arm branched-end PEG 10K amine hydrogel (Example 21) had higher tensile strength and was far more resistant to swelling. The gel time was much quicker as well for the branched-end PEG amine. With lower-oxidation level dextran aldehyde (solution 4B), the hydrogel made with 6-arm monoamine-ended PEG 10K (Comparative Example 22), the h-arm branched-end PEG 10K amine hydrogel (Example 23) again had higher tensile strength and was far more resistant to swelling and hydrolytic degradation. The gel time was much quicker as well. Furthermore, elongation-to-break was only modestly reduced with the branched-end PEG amine as compared with the monoamine-ended PEG. These examples demonstrate the advantageous balance of properties conferred by the branched-end amine.

Examples 25-29

Mechanical Properties of Dextran Aldehyde Hydrogels Crosslinked with Monoamine-Ended PEG Compared with Branched-End Amine PEG Hydrogels The purpose of these Examples was to compare the mechanical properties of branched-end PEG amine-based dextran aldehyde hydrogels with a dextran aldehyde hydrogel based on monoamine-ended PEG of similar molecular weight having the same number of arms. Therefore dextran aldehyde hydrogels were made with 8-arm PEG 40K branched-end hexadecaamine and the comparative monoamine-ended 8-arm PEG 40K octaamine.

Preparation of 8-Arm PEG 40K Octaamine

The 8-Arm PEG 40K octaamine was synthesized from the 8-arm PEG 40K octaol ($M_n$=40000; NOF Corp.) in a manner similar to that used for the preparation of the 4-arm PEG 2K tetraamine, as described in Examples 2-4. The PEG alcohol was reacted first with thionyl chloride to make the octachloride, which was then reacted with aqueous ammonia at 60° C. to form the octaamine.
Hydrogel Compositions:
Hydrogels were prepared using the following reactant solutions:
5A: 17 wt % dextran aldehyde (20% oxidative conversion; $M_w$=60K; EW=390);
5B: 30 wt % 8-arm PEG 40K octaaamine (EW=5000);
5C: 20 wt % 8-arm PEG 40K branched-end hexadecaamine (EW=2500), prepared as described in Example 5;
5D: 25 wt % 8-arm PEG 40K branched-end hexadecaamine (EW=2500), prepared as described in Example 5;
5E: 30 wt % 8-arm PEG 40K branched-end hexadecaamine (EW=2500), prepared as described in Example 5;
5F: 35 wt % 8-arm PEG 40K branched-end hexadecaamine (EW=2500), prepared as described in Example 5.

The pairs of solutions, as indicated in Table 5, were combined in 1:1 volume ratio using a MixPac double-barrel syringe with a 12-step static mixing tip. Hydrogel strips for tensile testing were molded and tested as described in the General Methods section. The propensity of the hydrogels to swell in water was tested on the strips as described in the General Methods section. Gel times were determined by combining 0.1 mL of each reactant solution in a small vial and quickly stirring until the mixture became viscous enough to hold its shape, which was considered to be the gel time. Test data are shown in Table 5.

TABLE 5

Mechanical Properties of Dextran Aldehyde Hydrogels Crosslinked with Monoamine-ended PEG Compared with Branched-End Amine PEG Hydrogels

| Example | Dext Ald | PEG Amine | Gel time (s) | Tensile Strength (g/cm$^2$) | Elongation to Break (%) | 1-wk 37° C. PBS % Swell |
|---|---|---|---|---|---|---|
| 25, Comparative | 5A | 5B | 15 | 1380 | 440 | 1250 |
| 26 | 5A | 5C | 8 | 1050 | 195 | 360 |
| 27 | 5A | 5D | 6 | 1450 | 260 | 300 |
| 28 | 5A | 5E | 4 | 1390 | 210 | 340 |
| 29 | 5A | 5F | 4 | 1660 | 225 | 450 |

When compared with the dextran aldehyde hydrogel made with 8-arm monoamine-ended PEG 40K (Comparative Example 25), the 8-arm branched-end PEG 40K amine hydrogel made with the same PEG solution concentration (30 wt %; Example 28) was far more resistant to swelling; the gel time was much quicker as well. Increasing branched-end PEG 40K amine concentration gave higher tensile strength and elongation-to-break; swelling was also somewhat higher. These examples demonstrate the advantageous balance of properties conferred by the branched-end amine.

Examples 30-33

Mechanical Properties of Dextran Aldehyde Hydrogels Crosslinked with Monoamine-Ended 4-Arm Ethylene Oxide-Propylene Oxide Copolymers Compared with the Analogous 4-Arm EO-PO Branched-End Amine Hydrogels The purpose of these Examples was to compare the mechanical properties of 4-arm ethylene oxide-propylene oxide copolymer branched-end amine-based dextran aldehyde hydrogels with a dextran aldehyde hydrogel based on a monoamine-ended 4-arm ethylene oxide-propylene oxide copolymer of similar molecular weight, having the same number of arms. Therefore, dextran aldehyde hydrogels were made with 4-arm ethylenediamine EO/PO 15K branched-end octaamine and the comparative monoamine-ended 4-arm ethylenediamine EO/PO 15K tetraamine.

Preparation of 4-Arm Ethylenediamine EO/PO 15K Tetraamine

First, ethylenediamine ethylene oxide-propylene oxide copolymer ($M_n$=14300; contains 77 mol % ethylene oxide; all end groups are EO; Aldrich #435538) was converted to the mesylate by reaction with methanesulfonyl chloride, as described in Example 9. Then, the mesylate derivative was reacted with concentrated aqueous ammonia in a manner similar to that used in the preparation of the 4-arm PEG 2K tetraamine, as described in Examples 2-4.
Hydrogel Compositions:
Hydrogels were prepared using the following reactant solutions:
6A: 17 wt % dextran aldehyde (20% oxidative conversion; $M_w$=60K; EW=390);
6B: 20 wt % 4-arm EO-PO 15K tetraamine (EW=3600);

6C: 20 wt % 4-arm EO-PO 15K branched-end octaamine (EW=1800), prepared as described in Example 9;
6D: 30 wt % 4-arm EO-PO 15K tetraamine (EW=3600);
6E: 30 wt % 4-arm EO-PO 15K branched-end octaamine (EW=1800), prepared as described in Example 9.

The 30 wt % solution of the 4-arm EO-PO 15K branched-end octaamine had to be cooled in ice water to reduce its viscosity just before loading into the mixing syringe. EO-PO copolymers of certain compositions can possess lower critical solution temperatures close to or even below room temperature, above which they associate and precipitate.

The pairs of solutions, as indicated in Table 6, were combined in 1:1 volume ratio using a MixPac double-barrel syringe with a 12-step static mixing tip. Hydrogel strips for tensile testing were molded and tested as described in the General Methods section. The propensity of the hydrogels to swell in water was tested on the strips as described in the General Methods section. Gel times were determined by combining 0.1 mL of each reactant solution in a small vial and quickly stirring until the mixture became viscous enough to hold its shape, which was considered to be the gel time. Test data are shown in Table 6.

TABLE 6

Mechanical Properties of Dextran Aldehyde Hydrogels Crosslinked with Monoamine-Ended PEG Compared with Branched-End Amine PEG Hydrogels

| Example | Dext Ald | PEG Amine | Gel time (s) | Tensile Strength (g/cm$^2$) | Elongation to Break (%) | 1-wk 37° C. PBS % Swell |
|---|---|---|---|---|---|---|
| 30, Comparative | 6A | 6B | 35 | 410 | 230 | 170 |
| 31 | 6A | 6C | 12 | 640 | 110 | 70 |
| 32, Comparative | 6A | 6D | 17 | 950 | 250 | 240 |
| 33 | 6A | 6E | 10 | 1160 | 110 | 140 |

When compared with the dextran aldehyde hydrogels made with 4-arm monoamine-ended ethylenediamine EO/PO 15K (Comparative Examples 30 and 32), the 4-arm branched-end EO-PO 15K amine hydrogels (Examples 31 and 33) had higher tensile strength and were more resistant to swelling; the gel times were quicker as well. Increasing polyether amine concentration gave higher tensile strength and swelling. These examples demonstrate the advantageous balance of properties conferred by the branched-end amine.

Examples 34-37

Tissue Adhesion of Dextran Aldehyde Hydrogels Crosslinked with a Combination of 4-Arm PEG 2K Amine and 8-Arm PEG 40K Branched-End Amine The purpose of these Examples was to demonstrate the ability of a hydrogel composed of a mixture of a branched-end multi-arm PEG amine and a monoamine-ended multi-arm PEG with dextran aldehyde to seal an incision in a pig intestine.

Hydrogel Compositions:

Hydrogels were prepared using the following reactant solutions:
7A: 25 wt % dextran aldehyde (50% oxidative conversion; $M_w$=10K; EW=140);
7B: 25 wt % dextran aldehyde (20% oxidative conversion; $M_w$=60K; EW=390);
7C: 60 wt % 8-arm PEG 40K branched-end hexadecaamine (EW=2500), prepared as described in Example 5;
7D: 60 wt % 4-arm PEG 2K tetraamine (EW=500); prepared as described in Examples 2-4.

For the compositions containing two dextran aldehydes and two PEG amines, the two dextran aldehyde solutions were combined with one another and the two PEG solutions were combined with one another. These combined solutions, as indicated in Table 7, were then combined and reacted in a 1:1 volume ratio using a MixPac double-barrel syringe with an 8- or 12-step static mixing tip. The ability to seal an incision in a pig intestine against internal water pressure was tested according to the method described in the General Methods section. Test data are shown in Table 7. The burst pressures are given as the mean and standard deviation; typically for three determinations.

TABLE 7

Test Results of Sealing Pig Intestines with Dextran Aldehyde-Mixed PEG Amine Hydrogels

| Example | Dextran Aldehyde 10K | Dextran Aldehyde 60K | Dextran Aldehyde Ratio | PEG Branch-End Amine | PEG Mono-End Amine | PEG Amine Ratio | Intestine Burst Pressure psig |
|---|---|---|---|---|---|---|---|
| 34 | 7A | — | — | 7C | 7D | 1:1 | 4.55 ± 2.11 (31.4 ± 14.5 kPa) |
| 35 | 7A | 7B | 1:1 | 7C | 7D | 1:2 | 5.29 ± 1.55 (36.5 ± 10.7 kPa) |
| 36 | 7A | 7B | 3:1 | 7C | 7D | 1:6 | 5.53 ± 1.53 (38.1 ± 10.5 kPa) |
| 37 Comparative | 7A | — | — | — | 7D | — | 4.05 ± 1.57 (27.9 ± 10.8 kPa) |

These results show that dextran aldehyde hydrogels crosslinked with mixed systems containing both branched-end multi-arm PEG amines and monoamine-ended multi-arm PEGs are capable of quite high sealing pressures in intestinal incisions, even when the branched-end species is a minor component (e.g., Example 36 compared with Example 37).

The invention claimed is:

1. A composition of matter comprising at least one compound of the formula:

$$Q[(PA)X(RY)_z]_m;$$

wherein:
   (i) X is selected from the group consisting of: $CH_{3-z}$, N, N(acetoacetamide)-$CH_{3-z}$, S—$R_2$—$CH_{3-z}$, NH—$CH_{3-z}$, and NH—$R_2$—N, wherein $R_2$ is an alkylene group having from 1 to 5 carbon atoms;
   (ii) R is selected from the group consisting of: a direct bond, an alkylene group having from 1 to 5 carbon atoms, an alkylene ether group having up to a total of 6 backbone atoms, an alkyleneoxy urethane group of the formula $R_4O(CO)NHCH_2$ wherein $R_4$ is a linear or branched alkylene group having 2 to 6 carbon atoms and $R_4$ is the group that is adjacent to X, and a C3 to C8 cycloalkylene group;
   (iii) Y is a functional group selected from the group consisting of: —$NH_2$, —SH, —$CONHNH_2$, acetoacetate, and —$COR_1$, wherein $R_1$ is OH or —N-hydroxysuccinimidyl;
   (iv) Q is a core atom or molecule selected from the group consisting of: N, a polyol with the hydrogens removed from 3 or more of its OH groups, and N—$R_3$—N, wherein $R_3$ is an alkylene group having 2-12 carbon atoms or a C3 to C8 cycloalkylene group;
   (v) PA is a linear polymeric arm terminating with a methylene group at both ends of said arm, wherein said arm is a polymer selected from the group consisting of: polyethylene oxide, poly(trimethyleneoxide), block or random copolymers of polyethylene oxide and polypropylene oxide, and triblock copolymers of polyethylene oxide and polypropylene oxide;
   (vi) z is 2 or 3 where X=$CH_{3-z}$, S—$R_2$—$CH_{3-z}$, N(acetoacetamide)-$CH_{3-z}$ or NH—$CH_{3-z}$ and z is 2 where X=N, NH—$R_2$—N, or S—$R_2$—N; and
   (vii) m is 3 where Q is N, m is 4 where Q is N—$R_3$—N, and m is 3 to 16 where Q is said polyol;
   provided that if Y is acetoacetate or $COR_1$, wherein $R_1$ is N-hydroxysuccinimidyl, then X is not NH—$CH_{3-z}$, or NH—$R_2$—N.

2. The composition of matter according to claim 1 wherein the at least one compound is selected from the group consisting of:
   (i) an 8-arm poly(ethylene glycol) hexadecaamine, wherein Q is hexaglycerol with the hydrogens removed from 8 of its OH groups, PA is polyethylene oxide, X is $NHCH_2CH_2N$, R is $CH_2CH_2$, Y is $NH_2$, z=2, and m=8;
   (ii) a 4-arm poly(ethylene glycol) octaamine, wherein Q is pentaerythritol with the hydrogens removed from 4 of its OH groups, PA is polyethylene oxide, X is $NHCH_2CH_2N$, R is $CH_2CH_2$, Y=$NH_2$, z=2, and m=4;
   (iii) a 6-arm poly(ethylene glycol) dodecaamine, wherein Q is tetraglycerol with the hydrogens removed from 6 of its OH groups, PA is polyethylene oxide, X is $NHCH_2CH_2N$, R is $CH_2CH_2$, Y is $NH_2$, z=2, and m=6;
   (iv) a 4-arm ethylenediamine poly(ethylene oxide-propylene oxide) octaamine, wherein Q is $NCH_2CH_2N$, PA is poly(ethylene oxide-propylene oxide), X is $NHCH_2CH_2N$, R is $CH_2CH_2$, Y is $NH_2$, z=2, and m=4;
   (v) a 4-arm poly(ethylene glycol) octaamine, wherein Q is pentaerythritol with the hydrogens removed from 4 of its OH groups, PA is polyethylene oxide, X is $NHCH_2CH_2CH_2N$, R is $CH_2CH_2CH_2$, Y=$NH_2$, z=2, and m=4;
   (vi) a 6-arm poly(ethylene glycol) dodecaamine, wherein Q is tetraglycerol with the hydrogens removed from 6 of its OH groups, PA is polyethylene oxide, X is $NHCH_2CH_2CH_2N$, R is $CH_2CH_2CH_2$, Y is $NH_2$, z=2, and m=6;
   (vii) an 8-arm poly(ethylene glycol) hexadecaamine, wherein Q is hexaglycerol with the hydrogens removed from 8 of its OH groups, PA is polyethylene oxide, X is $NHCH_2CH_2CH_2N$, R is $CH_2CH_2CH_2$, Y is $NH_2$, z=2, and m=8; and
   (viii) a 4-arm ethylenediamine poly(ethylene oxide-propylene oxide) octaamine, wherein Q is $NCH_2CH_2N$, PA is poly(ethylene oxide-propylene oxide), X is $NHCH_2CH_2CH_2N$, R is $CH_2CH_2CH_2$, Y is $NH_2$, z=2, and m=4.

3. A kit comprising:
a) at least one compound of the formula:

$$(YR)_zX(PS)X(RY)_z; \text{ or} \tag{i}$$

$$Q[(PA)X(RY)_z]_m; \tag{ii}$$

wherein:
   (A) PS is a linear polymeric segment terminating with a methylene group at both ends of said segment, wherein said segment is a polymer selected from the group consisting of: polyethylene oxide, poly(trimethyleneoxide), block or random copolymers of polyethylene oxide and polypropylene oxide, and triblock copolymers of polyethylene oxide and polypropylene oxide;
   (B) X is selected from the group consisting of: $CH_{3-z}$, N, N(acetoacetamide)-$CH_{3-z}$, S—$R_2$—N, S—$R_2$—$CH_{3-z}$, NH—$CH_{3-z}$, and NH—$R_2$—N, wherein $R_2$ is an alkylene group having from 1 to 5 carbon atoms;
   (C) R is selected from the group consisting of: a direct bond, an alkylene group having from 1 to 5 carbon atoms, an alkylene ether group having up to a total of 6 backbone atoms, an alkyleneoxy urethane group of the formula $R_4O(CO)NHCH_2$ wherein $R_4$ is a linear or branched alkylene group having 2 to 6 carbon atoms and $R_4$ is the group that is adjacent to X, and a C3 to C8 cycloalkylene group;
   (D) Y is a functional group selected from the group consisting of: —$NH_2$, —SH, —$CONHNH_2$, acetoacetate, and —$COR_1$, wherein $R_1$ is OH or —N-hydroxysuccinimidyl;
   (E) Q is a core atom or molecule selected from the group consisting of: N, a polyol with the hydrogens removed from 3 or more of its OH groups, and N—$R_3$—N, wherein $R_3$ is an alkylene group having 2-12 carbon atoms or a C3 to C8 cycloalkylene group;
   (F) PA is a linear polymeric arm terminating with a methylene group at both ends of said arm, wherein said arm is a polymer selected from the group consisting of: polyethylene oxide, poly(trimethyleneoxide), block or random copolymers of polyethylene oxide and polypropylene oxide, and triblock copolymers of polyethylene oxide and polypropylene oxide;
   (G) z is 2 or 3 where X=$CH_{3-z}$, S—$R_2$—$CH_{3-z}$, N(acetoacetamide)-$CH_{3-z}$, or NH—$CH_{3-z}$ and z is 2 where X=N, NH—$R_2$—N, or S—$R_2$—N;

(H) m is 3 where Q is N, m is 4 where Q is N—R$_3$—N, and m is 3 to 16 where Q is said polyol; and b) at least one water-dispersible polymer;
provided that:
(1) if Y is acetoacetate or COR$_1$, wherein R$_1$ is N-hydroxysuccinimidyl, then X is not NH—CH$_{3-z}$, or NH—R$_2$—N;
(2) if the functional group Y is NH$_2$, SH, or CONHNH$_2$, then the at least one water-dispersible polymer is a water-dispersible polymer having 3 or more electrophilic groups which are capable of reacting with Y;
(3) if the functional group Y is SH and the at least one water-dispersible polymer is a water-dispersible polymer having 3 or more thiol groups, then the kit further comprises an oxidizer which is capable of oxidizing the SH groups to disulfide groups;
(4) if the functional group Y is acetoacetate or COR$_1$, wherein R$_1$ is OH or N-hydroxysuccinimidyl, then the at least one water-dispersible polymer is a water-dispersible polymer having 3 or more nucleophilic groups which are capable of reacting with Y;
(5) if the functional group Y is COR$_1$, wherein R$_1$ is OH, then optionally the kit further comprises: (c) a water-soluble carbodiimide.

4. The kit according to claim 3 wherein the water-dispersible polymer having 3 or more electrophilic groups is selected from the group consisting of: an oxidized polysaccharide containing aldehyde groups, a poly(vinyl alcohol) comprising acetoacetate groups, a poly(vinyl alcohol) copolymer comprising vinyl alcohol units and comonomer units, said poly(vinyl alcohol) copolymer being comprising acetoacetate groups, and a linear or branched poly(ether) that is comprising acetoacetate groups, aldehyde groups, or N-hydroxysuccinimidyl ester groups.

5. The kit according to claim 3 wherein the at least one compound of formula (i) or (ii) is selected from the group consisting of:
a) a linear poly(ethylene glycol) tetraamine according to formula (i), wherein PS is polyethylene oxide, X is NHCH$_2$CH$_2$N, R is CH$_2$CH$_2$, Y is NH$_2$, and z=2;
b) an 8-arm poly(ethylene glycol) hexadecaamine according to formula (ii), wherein Q is hexaglycerol with the hydrogens removed from 8 of its OH groups, PA is polyethylene oxide, X is NHCH$_2$CH$_2$N, R is CH$_2$CH$_2$, Y is NH$_2$, z=2, and m=8;
c) a 4-arm poly(ethylene glycol) octaamine according to formula (ii), wherein Q is pentaerythritol with the hydrogens removed from 4 of its OH groups, PA is polyethylene oxide, X is NHCH$_2$CH$_2$N, R is CH$_2$CH$_2$, Y is NH$_2$, z=2, and m=4,
d) a 6-arm poly(ethylene glycol) dodecaamine according to formula (ii), wherein Q is tetraglycerol with the hydrogens removed from 6 of its OH groups, PA is derived from polyethylene oxide, X is NHCH$_2$CH$_2$N, R is CH$_2$CH$_2$, Y is NH$_2$, z=2, and m=6;
e) a 4-arm ethylenediamine poly(ethylene oxide-propylene oxide) octaamine according to formula (ii), wherein Q is NCH$_2$CH$_2$N, PA is poly(ethylene oxide-propylene oxide), X is NHCH$_2$CH$_2$N, R is CH$_2$CH$_2$, Y is NH$_2$, z=2, and m=4;
f) a linear poly(ethylene glycol) tetraamine according to formula (i), wherein PS is polyethylene oxide, X is NHCH$_2$CH$_2$CH$_2$N, R is CH$_2$CH$_2$CH$_2$, Y is NH$_2$, and z=2;
g) an 8-arm poly(ethylene glycol) hexadecaamine according to formula (ii), wherein Q is hexaglycerol with the hydrogens removed from 8 of its OH groups, PA is polyethylene oxide, X is NHCH$_2$CH$_2$CH$_2$N, R is CH$_2$CH$_2$CH$_2$, Y is NH$_2$, z=2, and m=8;
h) a 4-arm poly(ethylene glycol) octaamine according to formula (ii), wherein Q is pentaerythritol with the hydrogens removed from 4 of its OH groups, PA is derived from polyethylene oxide, X is NHCH$_2$CH$_2$CH$_2$N, R is CH$_2$CH$_2$CH$_2$, Y is NH$_2$, z=2, and m=4;
i) a 6-arm poly(ethylene glycol) dodecaamine according to formula (ii), wherein Q is tetraglycerol with the hydrogens removed from 6 of its OH groups, PA is polyethylene oxide, X is NHCH$_2$CH$_2$CH$_2$N, R is CH$_2$CH$_2$CH$_2$, Y is NH$_2$, z=2, and m=6; and
j) a 4-arm ethylenediamine poly(ethylene oxide-propylene oxide) octaamine according to formula (ii), wherein Q is NCH$_2$CH$_2$N, PA is poly(ethylene oxide-propylene oxide), X is NHCH$_2$CH$_2$CH$_2$N, R is CH$_2$CH$_2$CH$_2$, Y is NH$_2$, z=2, and m=4.

6. The kit according to claim 3 wherein:
a) the at least one compound of formula (i) or (ii) is selected from the group consisting of:
a linear poly(ethylene glycol) tetraamine according to formula (i), wherein PS is polyethylene oxide, X is NHCH$_2$CH$_2$N, R is CH$_2$CH$_2$, Y is NH$_2$, and z=2;
a linear poly(ethylene glycol) tetraamine according to formula (i), wherein PS is polyethylene oxide, X is NHCH$_2$CH$_2$CH$_2$N, R is CH$_2$CH$_2$CH$_2$, Y is NH$_2$, and z=2;
an 8-arm poly(ethylene glycol) hexadecaamine according to formula (ii) wherein Q is hexaglycerol with the hydrogens removed from 8 of its OH groups, PA is polyethylene oxide, X is NHCH$_2$CH$_2$N, R is CH$_2$CH$_2$, Y is NH$_2$, z=2, and m=8;
an 8-arm poly(ethylene glycol) hexadecaamine according to formula (ii) wherein Q is hexaglycerol with the hydrogens removed from 8 of its OH groups, PA is polyethylene oxide, X is NHCH$_2$CH$_2$CH$_2$N, R is CH$_2$CH$_2$CH$_2$, Y is NH$_2$, z=2, and m=8;
a 4-arm poly(ethylene glycol) octaamine according to formula (ii), wherein Q is pentaerythritol with the hydrogens removed from 4 of its OH groups, PA is polyethylene oxide, X is NHCH$_2$CH$_2$N, R is CH$_2$CH$_2$, Y=NH$_2$, z=2, and m=4;
a 4-arm poly(ethylene glycol) octaamine according to formula (ii), wherein Q is pentaerythritol with the hydrogens removed from 4 of its OH groups, PA is polyethylene oxide, X is NHCH$_2$CH$_2$CH$_2$N, R is CH$_2$CH$_2$CH$_2$, Y=NH$_2$, z=2, and m=4;
a 6-arm poly(ethylene glycol) dodecaamine according to formula (ii), wherein Q is tetraglycerol with the hydrogens removed from 6 of its OH groups, PA is polyethylene oxide, X is NHCH$_2$CH$_2$N, R is CH$_2$CH$_2$, Y is NH$_2$, z=2, and m=6;
a 6-arm poly(ethylene glycol) dodecaamine according to formula (ii), wherein Q is tetraglycerol with the hydrogens removed from 6 of its OH groups, PA is polyethylene oxide, X is NHCH$_2$CH$_2$CH$_2$N, R is CH$_2$CH$_2$CH$_2$, Y is NH$_2$, z=2, and m=6;
a 4-arm ethylenediamine poly(ethylene oxide-propylene oxide) octaamine according to formula (ii), wherein Q is NCH$_2$CH$_2$N, PA is poly(ethylene oxide-propylene oxide), X is NHCH$_2$CH$_2$N, R is CH$_2$CH$_2$, Y is NH$_2$, z=2, and m=4; and
a 4-arm ethylenediamine poly(ethylene oxide-propylene oxide) octaamine according to formula (ii), wherein Q is NCH$_2$CH$_2$N, PA is poly(ethylene oxide-propylene oxide), X is NHCH$_2$CH$_2$CH$_2$N, R is CH$_2$CH$_2$CH$_2$, Y is NH$_2$, z=2, and m=4; and b) the at least one water-dispersible polymer having 3 or more electrophilic groups is an oxidized dextran containing aldehyde groups.

7. The kit according to claim 3 wherein the water-dispersible polymer having 3 or more nucleophilic groups is a linear or branched poly(ether) comprising amine groups, thiol groups, or carboxyhydrazide groups.

8. The kit according to claim 3 wherein the at least one water-dispersible polymer is a mixture of two different oxidized dextrans having different weight-average molecular weights, different degrees of oxidation, or different weight-average molecular weights and different degrees of oxidation.

9. The kit according to claim 3 wherein the at least one compound of formula (i) or (ii) is in the form of a first aqueous solution or dispersion and the at least one water-dispersible polymer is in the form of a second aqueous solution or dispersion.

10. The kit according to claim 9, wherein the first aqueous solution or dispersion comprises at least one compound of formula (i) or (ii) wherein Y is $NH_2$, SH, or $CONHNH_2$, and further comprises at least one multi-functional amine having one or more primary amine groups, said multi-functional amine being present at a concentration of about 5% to about 1000% by weight relative to the amount of the at least one compound of formula (i) or (ii) in the solution or dispersion.

11. The kit according to claim 9 wherein the second aqueous solution or dispersion comprises at least one water dispersible polymer having 3 or more nucleophilic groups, and further comprises at least one multi-functional amine having one or more primary amine groups, said multi-functional amine being present at a concentration of about 5% to about 1000% by weight relative to the amount of the at least one water dispersible polymer in the solution or dispersion.

12. The kit according to claim 9 further comprising a third solution or dispersion comprising a multi-functional amine having one or more primary amine groups, said solution or dispersion containing about 5% to about 100% by weight of the multi-functional amine relative to the total weight of the solution or dispersion.

13. The kit according to claim 9 wherein the at least one water-dispersible polymer in the second aqueous solution or dispersion is a compound of formula (i) or (ii) wherein the functional groups on said compound are the same as or different from, but capable of reacting with the functional groups on the compound of formula (i) or (ii) in the first aqueous solution or dispersion.

14. A hydrogel made by a process comprising reacting:
a) at least one compound of the formula:

$$(YR)_zX(PS)X(RY)_z; \text{ or} \quad (i)$$

$$Q[(PA)X(RY)_z]_m; \quad (ii)$$

wherein:
(A) PS is a linear polymeric segment terminating with a methylene group at both ends of said segment, wherein said segment is a polymer selected from the group consisting of: polyethylene oxide, poly(trimethyleneoxide), block or random copolymers of polyethylene oxide and polypropylene oxide, and triblock copolymers of polyethylene oxide and polypropylene oxide;
(B) X is selected from the group consisting of: $CH_{3-z}$, N, N(acetoacetamide)-$CH_{3-z}$, S—$R_2$—N, S—$R_2$—$CH_{3-z}$, NH—$CH_{3-z}$, and NH—$R_2$—N, wherein $R_2$ is an alkylene group having from 1 to 5 carbon atoms;
(C) R is selected from the group consisting of: a direct bond, an alkylene group having from 1 to 5 carbon atoms, an alkylene ether group having up to a total of 6 backbone atoms, an alkyleneoxy urethane group of the formula $R_4O(CO)NHCH_2$ wherein $R_4$ is a linear or branched alkylene group having 2 to 6 carbon atoms and $R_4$ is the group that is adjacent to X, and a C3 to C8 cycloalkylene group;
(D) Y is a functional group selected from the group consisting of: —$NH_2$, —SH, —$CONHNH_2$, acetoacetate, and —$COR_1$, wherein $R_1$ is OH or —N-hydroxysuccinimidyl;
(E) Q is a core atom or molecule selected from the group consisting of: N, a polyol with the hydrogens removed from 3 or more of its OH groups, and N—$R_3$—N, wherein $R_3$ is an alkylene group having 2-12 carbon atoms or a C3 to C8 cycloalkylene group;
(F) PA is a linear polymeric arm terminating with a methylene group at both ends of said arm, wherein said arm is a polymer selected from the group consisting of: polyethylene oxide, poly(trimethyleneoxide), block or random copolymers of polyethylene oxide and polypropylene oxide, and triblock copolymers of polyethylene oxide and polypropylene oxide;
(G) z is 2 or 3 where X=$CH_{3-z}$, S—$R_2$—$CH_{3-z}$, N(acetoacetamide)-$CH_{3-z}$, or NH—$CH_{3-z}$ and z is 2 where X=N, NH—$R_2$—N, or S—$R_2$—N;
(H) m is 3 where Q is N, m is 4 where Q is N—$R_3$—N, and m is 3 to 16 where Q is said polyol; with
b) at least one water-dispersible polymer having three or more electrophilic or nucleophilic groups in the presence of water; wherein the ratio of electrophilic or nucleophilic groups to functional groups of (i) or (ii) is about 1:10 to about 10:1 provided that:
(1) if Y is acetoacetate or $COR_1$, wherein $R_1$ is N-hydroxysuccinimidyl, then X is not NH—$CH_{3-z}$, or NH—$R_2$—N;
(2) if the functional group Y is $NH_2$, SH, or $CONHNH_2$, then the at least one water-dispersible polymer is a water-dispersible polymer having 3 or more electrophilic groups which are capable of reacting with Y;
(3) if the functional group Y is SH and the at least one water-dispersible polymer is a water-dispersible polymer having 3 or more thiol groups, then the reacting is done in the presence of an oxidizer which is capable of oxidizing the SH groups to disulfide groups;
(4) if the functional group Y is acetoacetate or $COR_1$, wherein $R_1$ is OH or N-hydroxysuccinimidyl, then the at least one water-dispersible polymer is a water-dispersible polymer having 3 or more nucleophilic groups which are capable of reacting with Y;
(5) if the functional group Y is $COR_1$, wherein $R_1$ is OH, then optionally said functional group is activated by reaction with a water-soluble carbodiimide to form an activated functional group and the at least one water-dispersible polymer is a water-dispersible polymer having 3 or more nucleophilic groups which are capable of reacting with said activated functional group.

15. The composition according to claim 14 wherein the at least one water-dispersible polymer having 3 or more electrophilic groups is selected from the group consisting of: an oxidized polysaccharide containing aldehyde groups, a poly(vinyl alcohol) comprising acetoacetate groups, a poly(vinyl alcohol) copolymer comprising vinyl alcohol units and comonomer units, said poly(vinyl alcohol) copolymer comprising acetoacetate groups, and a linear or branched poly(ether) comprising acetoacetate groups, aldehyde groups, or N-hydroxysuccinimidyl ester groups.

16. The composition according to claim 14 wherein the at least one compound of formula (i) or (ii) is selected from the group consisting of:
a) a linear poly(ethylene glycol) tetraamine according to formula (i), wherein PS is polyethylene oxide, X is $NHCH_2CH_2N$, R is $CH_2CH_2$, Y is $NH_2$, and z=2;
b) an 8-arm poly(ethylene glycol) hexadecaamine according to formula (ii), wherein Q is hexaglycerol with the hydrogens removed from 8 of its OH groups, PA is polyethylene oxide, X is $NHCH_2CH_2N$, R is $CH_2CH_2$, Y is $NH_2$, z=2, and m=8;
c) a 4-arm poly(ethylene glycol) octaamine according to formula (ii), wherein Q is pentaerythritol with the hydrogens removed from 4 of its OH groups, PA is polyethylene oxide, X is $NHCH_2CH_2N$, R is $CH_2CH_2$, Y is $NH_2$, z=2, and m=4,
d) a 6-arm poly(ethylene glycol) dodecaamine according to formula (ii), wherein Q is tetraglycerol with the hydrogens removed from 6 of its OH groups, PA is polyethylene oxide, X is $NHCH_2CH_2N$, R is $CH_2CH_2$, Y is $NH_2$, z=2, and m=6;
e) a 4-arm ethylenediamine poly(ethylene oxide-propylene oxide) octaamine according to formula (ii), wherein Q is $NCH_2CH_2N$, PA is poly(ethylene oxide-propylene oxide), X is $NHCH_2CH_2N$, R is $CH_2CH_2$, Y is $NH_2$, z=2, and m=4;
f) a linear poly(ethylene glycol) tetraamine according to formula (i), wherein PS is derived from polyethylene oxide, X is $NHCH_2CH_2CH_2N$, R is $CH_2CH_2CH_2$, Y is $NH_2$, and z=2;
g) an 8-arm poly(ethylene glycol) hexadecaamine according to formula (ii), wherein Q is hexaglycerol with the hydrogens removed from 8 of its OH groups, PA is polyethylene oxide, X is $NHCH_2CH_2CH_2N$, R is $CH_2CH_2CH_2$, Y is $NH_2$, z=2, and m=8;
h) a 4-arm poly(ethylene glycol) octaamine according to formula (ii), wherein Q is pentaerythritol with the hydrogens removed from 4 of its OH groups, PA is polyethylene oxide, X is $NHCH_2CH_2CH_2N$, R is $CH_2CH_2CH_2$, Y is $NH_2$, z=2, and m=4;
i) a 6-arm poly(ethylene glycol) dodecaamine according to formula (ii), wherein Q is tetraglycerol with the hydrogens removed from 6 of its OH groups, PA is polyethylene oxide, X is $NHCH_2CH_2CH_2N$, R is $CH_2CH_2CH_2$, Y is $NH_2$, z=2, and m=6; and
j) a 4-arm ethylenediamine poly(ethylene oxide-propylene oxide) octaamine according to formula (ii), wherein Q is $NCH_2CH_2N$, PA is poly(ethylene oxide-propylene oxide), X is $NHCH_2CH_2CH_2N$, R is $CH_2CH_2CH_2$, Y is $NH_2$, z=2, and m=4.

17. The composition according to claim 14 wherein
a) the at least one compound of formula (i) or (ii) is selected from the group consisting of:
a linear poly(ethylene glycol) tetraamine according to formula (i), wherein PS is polyethylene oxide, X is $NHCH_2CH_2N$, R is $CH_2CH_2$, Y is $NH_2$, and z=2;
a linear poly(ethylene glycol) tetraamine according to formula (i), wherein PS is polyethylene oxide, X is $NHCH_2CH_2CH_2N$, R is $CH_2CH_2CH_2$, Y is $NH_2$, and z=2;
an 8-arm poly(ethylene glycol) hexadecaamine according to formula (ii) wherein Q is hexaglycerol with the hydrogens removed from 8 of its OH groups, PA is polyethylene oxide, X is $NHCH_2CH_2N$, R is $CH_2CH_2$, Y is $NH_2$, z=2, and m=8;
an 8-arm poly(ethylene glycol) hexadecaamine according to formula (ii) wherein Q is hexaglycerol with the hydrogens removed from 8 of its OH groups, PA is polyethylene oxide, X is $NHCH_2CH_2CH_2N$, R is $CH_2CH_2CH_2$, Y is $NH_2$, z=2, and m=8;
a 4-arm poly(ethylene glycol) octaamine according to formula (ii), wherein Q is pentaerythritol with the hydrogens removed from 4 of its OH groups, PA is polyethylene oxide, X is $NHCH_2CH_2N$, R is $CH_2CH_2$, Y=$NH_2$, z=2, and m=4;
a 4-arm poly(ethylene glycol) octaamine according to formula (ii), wherein Q is pentaerythritol with the hydrogens removed from 4 of its OH groups, PA is polyethylene oxide, X is $NHCH_2CH_2CH_2N$, R is $CH_2CH_2CH_2$, Y=$NH_2$, z=2, and m=4;
a 6-arm poly(ethylene glycol) dodecaamine according to formula (ii), wherein Q is tetraglycerol with the hydrogens removed from 6 of its OH groups, PA is derived from polyethylene oxide, X is $NHCH_2CH_2N$, R is $CH_2CH_2$, Y is $NH_2$, z=2, and m=6;
a 6-arm poly(ethylene glycol) dodecaamine according to formula (ii), wherein Q is tetraglycerol with the hydrogens removed from 6 of its OH groups, PA is polyethylene oxide, X is $NHCH_2CH_2CH_2N$, R is $CH_2CH_2CH_2$, Y is $NH_2$, z=2, and m=6;
a 4-arm ethylenediamine poly(ethylene oxide-propylene oxide) octaamine according to formula (ii), wherein Q is $NCH_2CH_2N$, PA is poly(ethylene oxide-propylene oxide), X is $NHCH_2CH_2N$, R is $CH_2CH_2$, Y is $NH_2$, z=2, and m=4; and
a 4-arm ethylenediamine poly(ethylene oxide-propylene oxide) octaamine according to formula (ii), wherein Q is $NCH_2CH_2N$, PA is poly(ethylene oxide-propylene oxide), X is $NHCH_2CH_2CH_2N$, R is $CH_2CH_2CH_2$, Y is $NH_2$, z=2, and m=4; and
b) the at least one water-dispersible polymer having 3 or more electrophilic groups is an oxidized dextran containing aldehyde groups.

18. The composition according to claim 14 wherein the water-dispersible polymer having 3 or more nucleophilic groups is a linear or branched poly(ether) comprising amine groups, thiol groups, or carboxyhydrazide groups.

19. The composition according to claim 14 wherein the at least one water-dispersible polymer is a mixture of two different oxidized dextrans having different weight-average molecular weights, different degrees of oxidation, or different weight-average molecular weights and different degrees of oxidation.

20. A method for applying a coating to an anatomical site on tissue of a living organism comprising:
applying to the site
a) a first aqueous solution or dispersion comprising at least one compound of the formula:

$(YR)_zX(PS)X(RY)_z$; or (i)

$Q[(PA)X(RY)_z]_m$; (ii)

wherein:
(A) PS is a linear polymeric segment terminating with a methylene group at both ends of said segment, wherein said segment is a polymer selected from the group consisting of: polyethylene oxide, poly(trimethyleneoxide), block or random copolymers of polyethylene oxide and polypropylene oxide, and triblock copolymers of polyethylene oxide and polypropylene oxide;
(B) X is selected from the group consisting of: $CH_{3-z}$, N, N(acetoacetamide)-$CH_{3-z}$, S—$R_2$—N, S—R$_2$—CH$_{3-z}$, NH—CH$_{3-z}$, and NH—R$_2$—N, wherein R$_2$ is an alkylene group having from 1 to 5 carbon atoms;
(C) R is selected from the group consisting of: a direct bond, an alkylene group having from 1 to 5 carbon atoms, an alkylene ether group having up to a total of 6 backbone atoms, an alkyleneoxy urethane group of the formula R$_4$O(CO)NHCH$_2$ wherein R$_4$ is a linear or branched alkylene group having 2 to 6 carbon atoms and R$_4$ is the group that is adjacent to X, and a C3 to C8 cycloalkylene group;
(D) Y is a functional group selected from the group consisting of: —NH$_2$, —SH, —CONHNH$_2$, acetoacetate, and —COR$_1$, wherein R$_1$ is OH or —N-hydroxysuccinimidyl;
(E) Q is a core atom or molecule selected from the group consisting of: N, a polyol with the hydrogens removed from 3 or more of its OH groups, and N—R$_3$—N, wherein R$_3$ is an alkylene group having 2-12 carbon atoms or a C3 to C8 cycloalkylene group;
(F) PA is a linear polymeric arm terminating with a methylene group at both ends of said arm, wherein said arm is a polymer selected from the group consisting of: polyethylene oxide, poly(trimethyleneoxide), block or random copolymers of polyethylene oxide and polypropylene oxide, and tri block copolymers of polyethylene oxide and polypropylene oxide;
(G) z is 2 or 3 where X=CH$_{3-z}$, S—R$_2$—CH$_{3-z}$, N(acetoacetamide)-CH$_{3-z}$, or NH—CH$_{3-z}$ and z is 2 where X=N, NH—R$_2$—N, or S—R$_2$—N;
(H) m is 3 where Q is N, m is 4 where Q is N—R$_3$—N, and m is 3 to 16 where Q is said polyol;
(I) said first aqueous solution or dispersion contains from about 5% to about 70% by weight of said compound relative to the total weight of the solution or dispersion;
followed by
b) a second aqueous solution or dispersion comprising at least one water-dispersible polymer having three or more electrophilic or nucleophilic groups, said solution or dispersion containing from about 5% to about 70% by weight of said water-dispersible polymer relative to the total weight of the solution or dispersion, or
applying the second aqueous solution or dispersion followed by the first aqueous solution or dispersion and mixing the first and second aqueous solutions or dispersions on the site,
or
premixing the first and second aqueous solutions or dispersions and applying the resulting mixture to the site before the resulting mixture completely cures; wherein the ratio of electrophilic or nucleophilic groups to functional groups of (i) or (ii) is about 1:10 to about 10:1; provided that
(1) if Y is acetoacetate or COR$_1$, wherein R$_1$ is N-hydroxysuccinimidyl, then X is not NH—CH$_{3-z}$, or NH—R$_2$—N;
(2) if the functional group Y is NH$_2$, SH, or CONHNH$_2$, then the at least one water-dispersible polymer in the second aqueous solution or dispersion is a water-dispersible polymer having 3 or more electrophilic groups which are capable of reacting with Y;
(3) if the functional group Y is SH and the at least one water-dispersible polymer in the second aqueous solution or dispersion is a water-dispersible polymer having 3 or more thiol groups, then at least one of the first or second aqueous solution or dispersion further comprises an oxidizer which is capable of oxidizing the SH groups to disulfide groups;
(4) if the functional group Y is acetoacetate or COR$_1$, wherein R$_1$ is OH or N-hydroxysuccinimidyl, then the at least one water-dispersible polymer in the second aqueous solution or dispersion is a water-dispersible polymer having 3 or more nucleophilic groups which are capable of reacting with Y;
(5) if the functional group Y is COR$_1$, wherein R$_1$ is OH, then optionally said functional group is activated by reaction with a water-soluble carbodiimide to form an activated functional group and the at least one water-dispersible polymer in the second aqueous solution or dispersion is a water-dispersible polymer having 3 or more nucleophilic groups which are capable of reacting with said activated functional group.

21. The method according to claim 20 wherein the water-dispersible polymer having 3 or more electrophilic groups is selected from the group consisting of: an oxidized polysaccharide containing aldehyde groups, a poly(vinyl alcohol) comprising acetoacetate groups, a poly(vinyl alcohol) copolymer comprising vinyl alcohol units and comonomer units, said poly(vinyl alcohol) copolymer comprising acetoacetate groups, and a linear or branched poly(ether) comprising acetoacetate groups, aldehyde groups, or N-hydroxysuccinimidyl ester groups.

22. The method according to claim 20 wherein the at least one compound of formula (i) or (ii) is selected from the group consisting of:
a) a linear poly(ethylene glycol) tetraamine according to formula (i), wherein PS is polyethylene oxide, X is NHCH$_2$CH$_2$N, R is CH$_2$CH$_2$, Y is NH$_2$, and z=2;
b) an 8-arm poly(ethylene glycol) hexadecaamine according to formula (ii), wherein Q is hexaglycerol with the hydrogens removed from 8 of its OH groups, PA is polyethylene oxide, X is NHCH$_2$CH$_2$N, R is CH$_2$CH$_2$, Y is NH$_2$, z=2, and m=8;
c) a 4-arm poly(ethylene glycol) octaamine according to formula (ii), wherein Q is pentaerythritol with the hydrogens removed from 4 of its OH groups, PA is polyethylene oxide, X is NHCH$_2$CH$_2$N, R is CH$_2$CH$_2$, Y is NH$_2$, z=2, and m=4,
d) a 6-arm poly(ethylene glycol) dodecaamine according to formula (ii), wherein Q is tetraglycerol with the hydrogens removed from 6 of its OH groups, PA is polyethylene oxide, X is NHCH$_2$CH$_2$N, R is CH$_2$CH$_2$, Y is NH$_2$, z=2, and m=6;
e) a 4-arm ethylenediamine poly(ethylene oxide-propylene oxide) octaamine according to formula (ii), wherein Q is NCH$_2$CH$_2$N, PA is poly(ethylene oxide-propylene oxide), X is NHCH$_2$CH$_2$N, R is CH$_2$CH$_2$, Y is NH$_2$, z=2, and m=4;
f) a linear poly(ethylene glycol) tetraamine according to formula (i), wherein PS is polyethylene oxide, X is NHCH$_2$CH$_2$CH$_2$N, R is CH$_2$CH$_2$CH$_2$, Y is NH$_2$, and z=2;
g) an 8-arm poly(ethylene glycol) hexadecaamine according to formula (ii), wherein Q is hexaglycerol with the hydrogens removed from 8 of its OH groups, PA is polyethylene oxide, X is NHCH$_2$CH$_2$CH$_2$N, R is CH$_2$CH$_2$CH$_2$, Y is NH$_2$, z=2, and m=8;
h) a 4-arm poly(ethylene glycol) octaamine according to formula (ii), wherein Q is pentaerythritol with the hydrogens removed from 4 of its OH groups, PA is polyethylene oxide, X is $NHCH_2CH_2CH_2N$, R is $CH_2CH_2CH_2$, Y is $NH_2$, z=2, and m=4;

i) a 6-arm poly(ethylene glycol) dodecaamine according to formula (ii), wherein Q is tetraglycerol with the hydrogens removed from 6 of its OH groups, PA is polyethylene oxide, X is $NHCH_2CH_2CH_2N$, R is $CH_2CH_2CH_2$, Y is $NH_2$, z=2, and m=6; and j) a 4-arm ethylenediamine poly(ethylene oxide-propylene oxide) octaamine according to formula (ii), wherein Q is $NCH_2CH_2N$, PA is poly(ethylene oxide-propylene oxide), X is $NHCH_2CH_2CH_2N$, R is $CH_2CH_2CH_2$, Y is $NH_2$, z=2, and m=4.

23. The method according to claim 20 wherein:

a) the at least one compound in the first aqueous solution or dispersion is selected from the group consisting of:

a linear poly(ethylene glycol) tetraamine according to formula (i), wherein PS is polyethylene oxide, X is $NHCH_2CH_2N$, R is $CH_2CH_2$, Y is $NH_2$, and z=2;

a linear poly(ethylene glycol) tetraamine according to formula (i), wherein PS is polyethylene oxide, X is $NHCH_2CH_2CH_2N$, R is $CH_2CH_2CH_2$, Y is $NH_2$, and z=2;

an 8-arm poly(ethylene glycol) hexadecaamine according to formula (ii) wherein Q is hexaglycerol with the hydrogens removed from 8 of its OH groups, PA is polyethylene oxide, X is $NHCH_2CH_2N$, R is $CH_2CH_2$, Y is $NH_2$, z=2, and m=8;

an 8-arm poly(ethylene glycol) hexadecaamine according to formula (ii) wherein Q is hexaglycerol with the hydrogens removed from 8 of its OH groups, PA is polyethylene oxide, X is $NHCH_2CH_2CH_2N$, R is $CH_2CH_2CH_2$, Y is $NH_2$, z=2, and m=8;

a 4-arm poly(ethylene glycol) octaamine according to formula (ii), wherein Q is pentaerythritol with the hydrogens removed from 4 of its OH groups, PA is polyethylene oxide, X is $NHCH_2CH_2N$, R is $CH_2CH_2$, Y=$NH_2$, z=2, and m=4;

a 4-arm poly(ethylene glycol) octaamine according to formula (ii), wherein Q is pentaerythritol with the hydrogens removed from 4 of its OH groups, PA is polyethylene oxide, X is $NHCH_2CH_2CH_2N$, R is $CH_2CH_2CH_2$, Y=$NH_2$, z=2, and m=4;

a 6-arm poly(ethylene glycol) dodecaamine according to formula (ii), wherein Q is tetraglycerol with the hydrogens removed from 6 of its OH groups, PA is polyethylene oxide, X is $NHCH_2CH_2N$, R is $CH_2CH_2$, Y is $NH_2$, z=2, and m=6;

a 6-arm poly(ethylene glycol) dodecaamine according to formula (ii), wherein Q is tetraglycerol with the hydrogens removed from 6 of its OH groups, PA is polyethylene oxide, X is $NHCH_2CH_2CH_2N$, R is $CH_2CH_2CH_2$, Y is $NH_2$, z=2, and m=6;

a 4-arm ethylenediamine poly(ethylene oxide-propylene oxide) octaamine according to formula (ii), wherein Q is $NCH_2CH_2N$, PA is poly(ethylene oxide-propylene oxide), X is $NHCH_2CH_2N$, R is $CH_2CH_2$, Y is $NH_2$, z=2, and m=4; and a 4-arm ethylenediamine poly(ethylene oxide-propylene oxide) octaamine according to formula (ii), wherein Q is $NCH_2CH_2N$, PA is poly(ethylene oxide-propylene oxide), X is $NHCH_2CH_2CH_2N$, R is $CH_2CH_2CH_2$, Y is $NH_2$, z=2, and m=4; and b) the at least one water-dispersible polymer having 3 or more electrophilic groups in the second aqueous solution or dispersion is an oxidized dextran containing aldehyde groups.

24. The method according to claim 20 wherein the water-dispersible polymer having 3 or more nucleophilic groups is a linear or branched poly(ether) derivatized with amine groups, thiol groups, or carboxyhydrazide groups.

25. The method according to claim 20 wherein the at least one water-dispersible polymer in the second aqueous solution or dispersion is a mixture of two different oxidized dextrans having different weight-average molecular weights, different degrees of oxidation, or different weight-average molecular weights and different degrees of oxidation.

* * * * *